United States Patent
Cao et al.

(10) Patent No.: US 6,343,866 B1
(45) Date of Patent: Feb. 5, 2002

(54) OPTICAL APPARATUS WHICH USES A VIRTUALLY IMAGED PHASED ARRAY TO PRODUCE CHROMATIC DISPERSION

(75) Inventors: Simon Xiaofan Cao, Fremont, CA (US); Masataka Shirasaki, Winchester, MA (US)

(73) Assignees: Fujitsu Limited, Kawasaki (JP); Avanex Corporation, Fremont, CA (US)

( * ) Notice: Subject to any disclaimer, the term of this patent is extended or adjusted under 35 U.S.C. 154(b) by 0 days.

(21) Appl. No.: 09/727,450

(22) Filed: Dec. 4, 2000

Related U.S. Application Data

(63) Continuation-in-part of application No. 09/576,541, filed on May 23, 2000.

(51) Int. Cl.$^7$ .................................................. G02B 5/10
(52) U.S. Cl. ........................ 359/868; 359/869; 359/871; 359/872
(58) Field of Search ................................ 359/868, 869, 359/577, 578, 579, 615, 618, 629, 634, 839, 856, 857, 871, 872, 873

(56) References Cited

U.S. PATENT DOCUMENTS

| | | | |
|---|---|---|---|
| 3,832,030 A | 8/1974 | Gloge | 385/33 |
| 4,362,361 A | 12/1982 | Campbell et al. | 359/629 |

(List continued on next page.)

FOREIGN PATENT DOCUMENTS

AU  26669/30  5/1930 ................. 359/578

OTHER PUBLICATIONS

Shirasaki, M., "Large Angular–Dispersion by Virtually–Imaged Phased–Array (VIPA) and its Application Wavelength Demultiplexing," MOC '95, Hiroshima, Oct. 1995.

(List continued on next page.)

Primary Examiner—Mohammad Sikder
(74) Attorney, Agent, or Firm—Staas & Halsey LLP

(57) ABSTRACT

Various configurations of a virtually imaged phased array (VIPA) generator in combination with a mirror to compensate for chromatic dispersion. A VIPA generator produces a light traveling from the VIPA generator. In some embodiments, a variable curvature mirror is positioned to reflect the light back to the VIPA generator. A rotation axis around which the mirror is rotated and a translation path for the rotation axis are provided, to change the curvature of the mirror where the output light is reflected. In other embodiments, a plurality of mirrors have different surface curvatures. A holder has a rotation axis and holds the plurality of mirrors equidistantly from the rotation axis. The holder is rotatable around the rotation axis to bring a different, respective mirror in position to reflect light produced by a VIPA generator back to the VIPA generator. In other embodiments, a rotating mirror is rotatable about a rotation axis to reflect light produced by a VIPA generator to a respective fixed mirror. In still other embodiments, an off-axis parabolic mirror is rotatable about a rotation axis to reflect light produced by a VIPA generator to a respective fixed mirror.

46 Claims, 43 Drawing Sheets

U.S. PATENT DOCUMENTS

| | | | | |
|---|---|---|---|---|
| 4,655,547 A | | 4/1987 | Heritage et al. | 359/563 |
| 4,820,019 A | | 4/1989 | Yoshida et al. | 359/578 |
| 5,071,225 A | | 12/1991 | Inoue | 359/589 |
| 5,119,454 A | | 6/1992 | McMahon | 385/49 |
| 5,166,818 A | | 11/1992 | Chase et al. | 359/615 |
| 5,309,456 A | | 5/1994 | Horton | 372/25 |
| 5,583,683 A | | 12/1996 | Scobey | 359/127 |
| 5,715,095 A | | 2/1998 | Hiratsuka et al. | 359/634 |
| 5,788,915 A | | 8/1998 | Blount | 359/127 |
| 5,969,866 A | * | 10/1999 | Shirasaki | 359/577 |
| 6,008,920 A | * | 12/1999 | Hendrix | 359/127 |
| 6,028,706 A | * | 2/2000 | Shirasaki et al. | 359/577 |
| 6,084,842 A | * | 7/2000 | Miura | 369/112 |
| 6,101,037 A | * | 8/2000 | Park et al. | 359/618 |
| 6,115,178 A | * | 9/2000 | Naganuma et al. | 359/495 |
| 6,201,908 B1 | * | 3/2001 | Grann | 385/24 |

OTHER PUBLICATIONS

Shirasaki, M., "Large Angular Dispersion by a Virtually–Imaged Phase Array and its Application to a Wavelength Demultiplexing," Optics Letters, vol. 21, No. 5, Mar. 1996.

Shirasaki, M., "Temperature Independent Interferometer for WDM Filters," Paper WeD.1.6 ECOC '96 (European Conference on Optical Communication), Sep. 18, 1996.

Shirasaki, M., "Filtering Characteristics of Virtually–Imaged Phased Array," Presented at IPR (Integrated Photonics Research) Topical Meeting Paper IMC3, Apr. 29, 1996, Boston, MA.

W.H. Fincham and M.H. Freeman, Optics, Ninth ed., Butterworth (Publishers) Inc., Boston, §§ 14.7 and 14.14 (Jan. 1980).

* cited by examiner

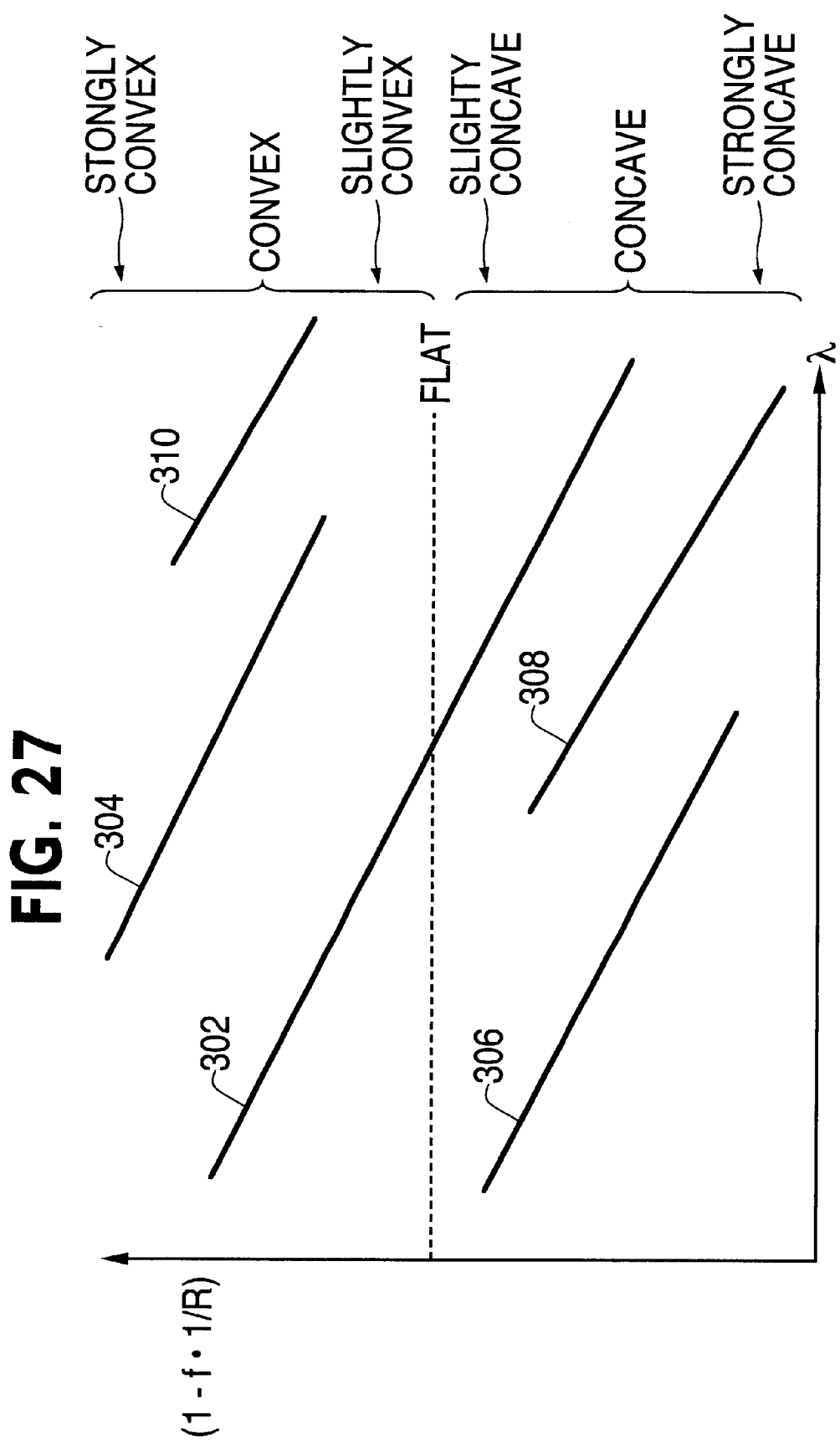

FIG. 28(A)
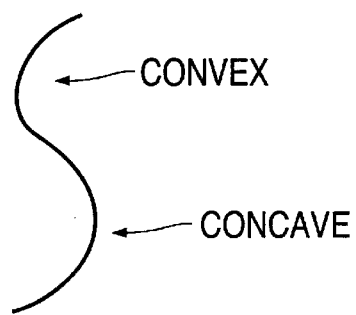
FIG. 28(B)
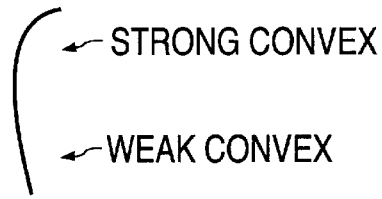
FIG. 28(C)    FIG. 28(D)    FIG. 28(E)
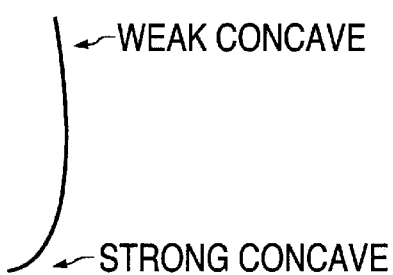  
FIG. 28(F)

SAME CURVATURE

ALONG A

ALONG B

ALONG C

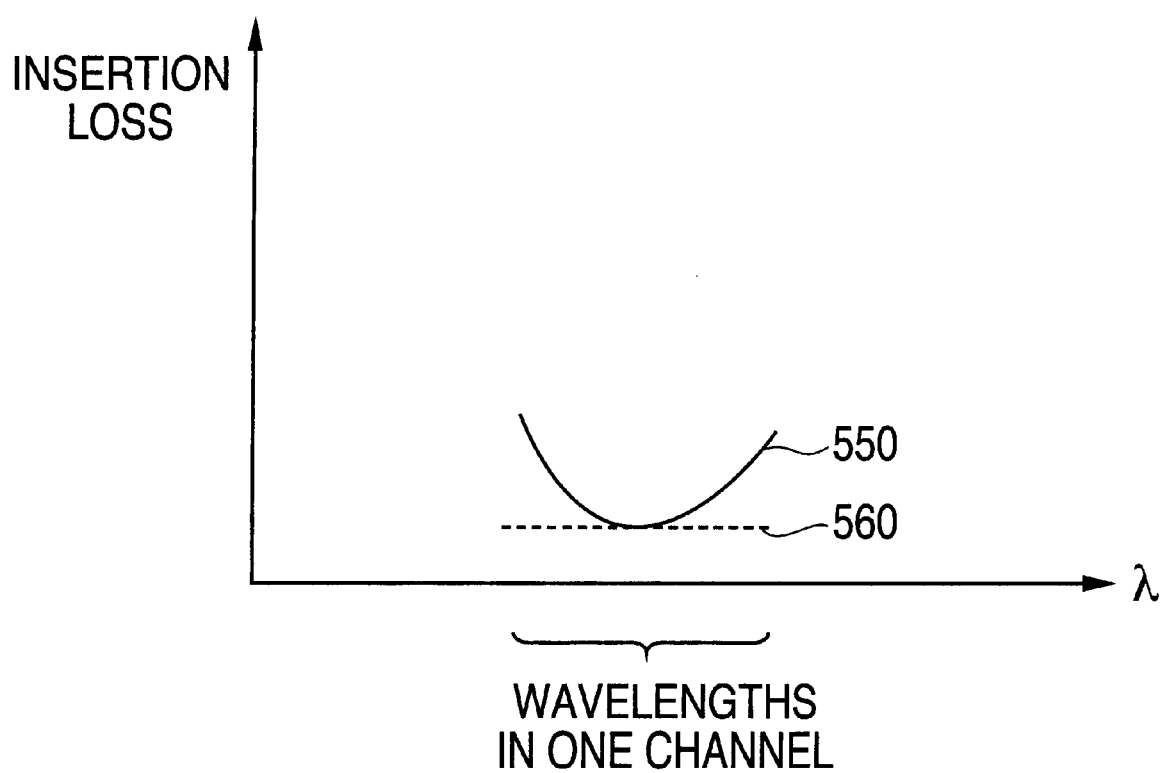

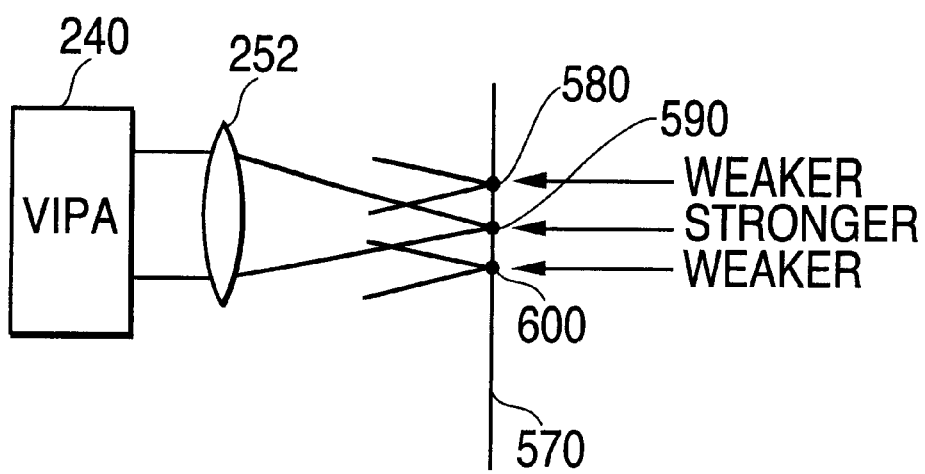
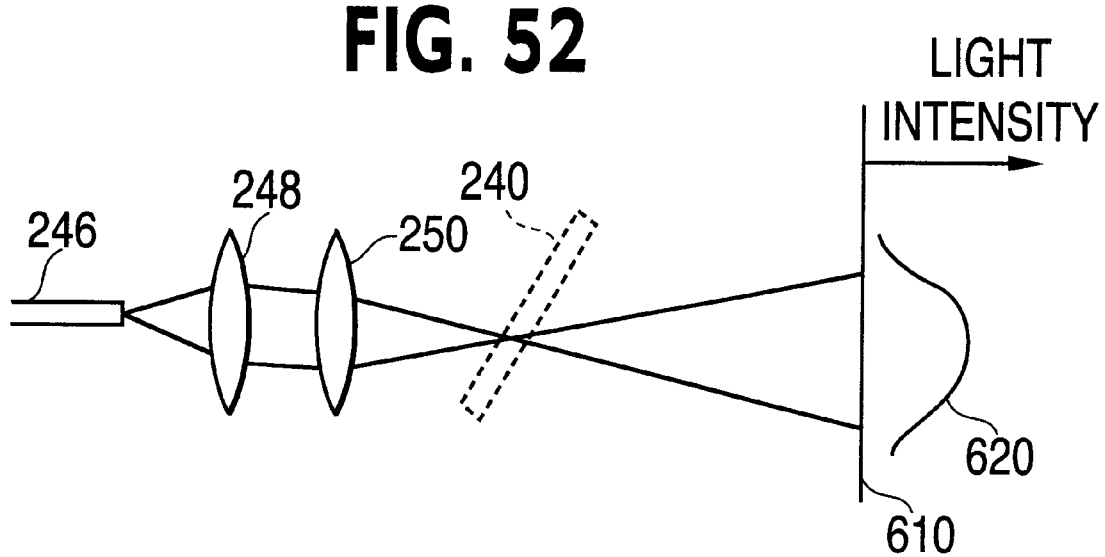

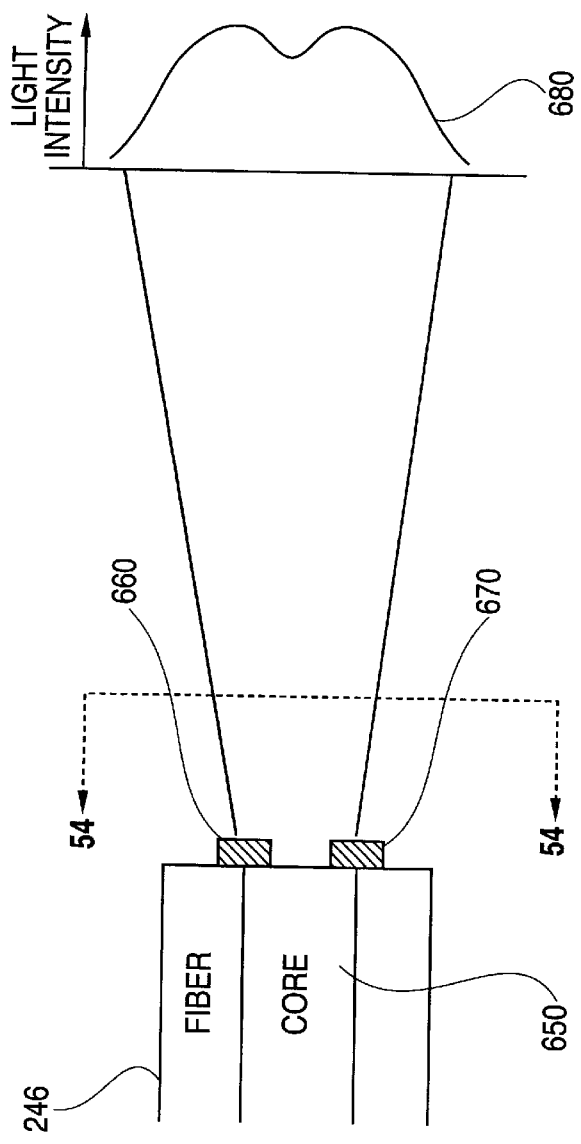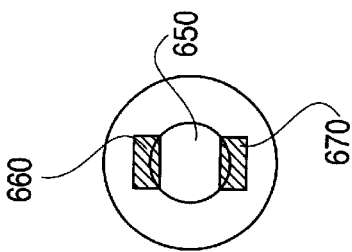

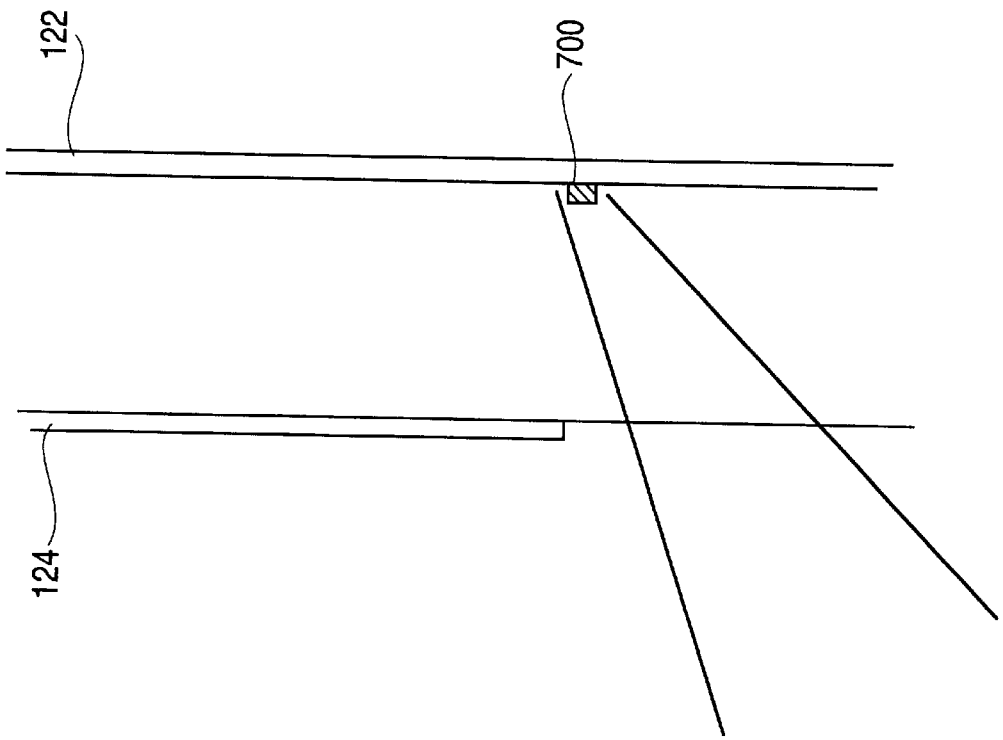
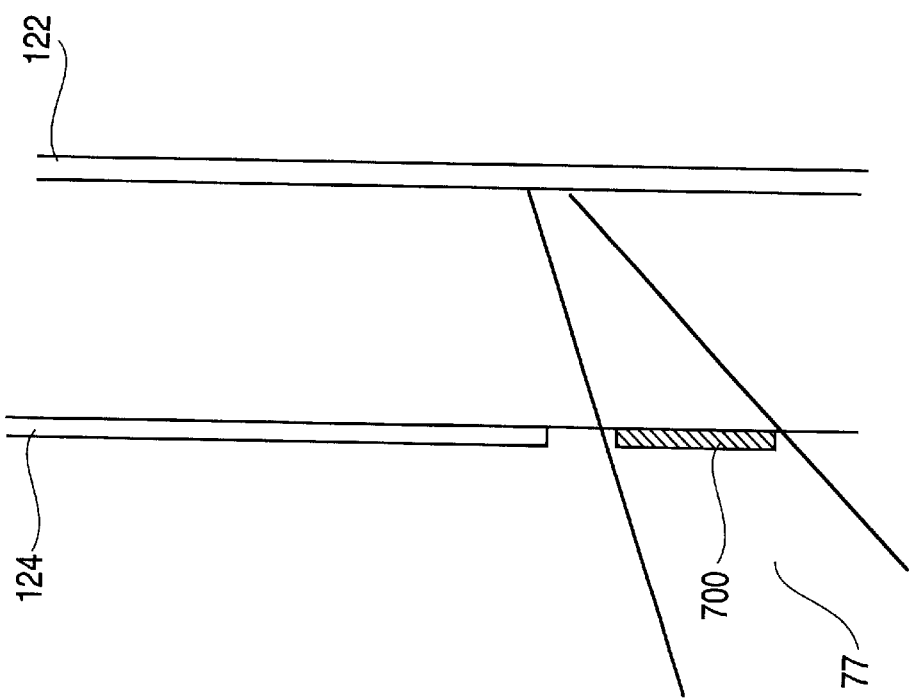

TRANSMISSION LOSS OF THE DISPERSION
COMPENSATOR WITHIN ONE WDM CHANNEL

CASCADED EXCESS LOSS

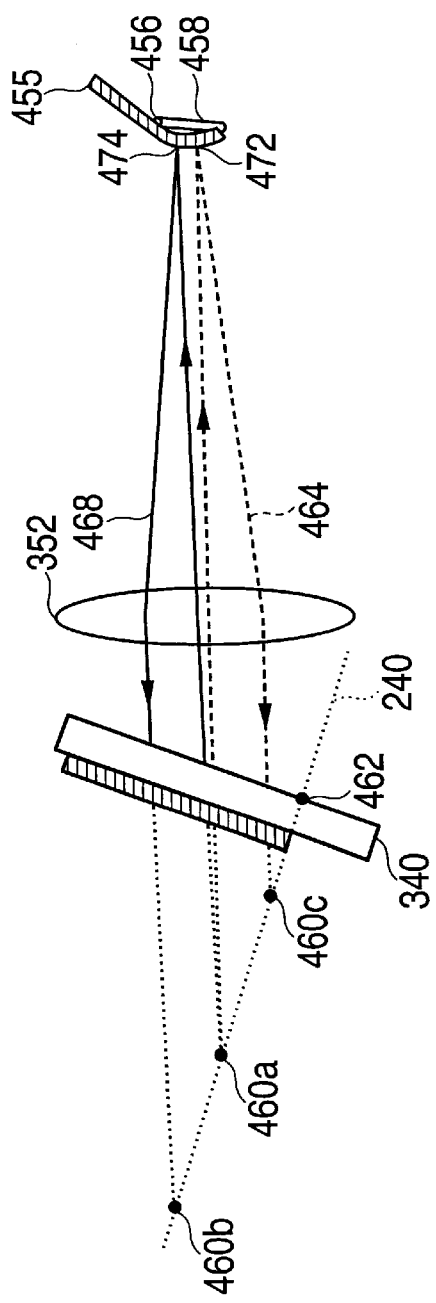
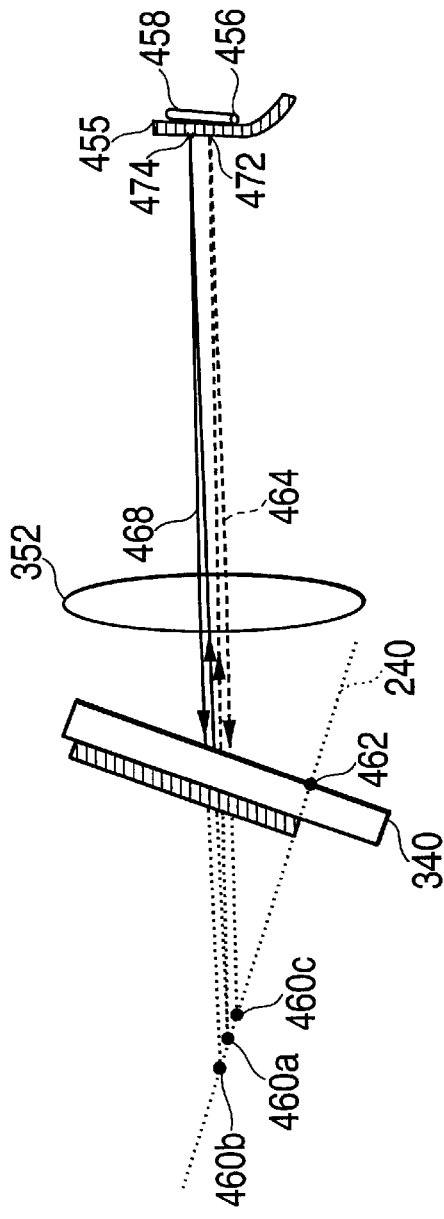

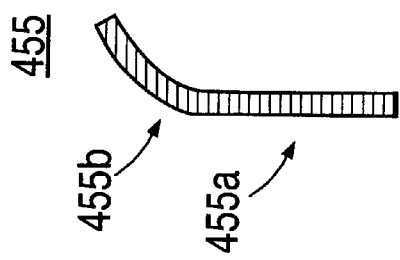
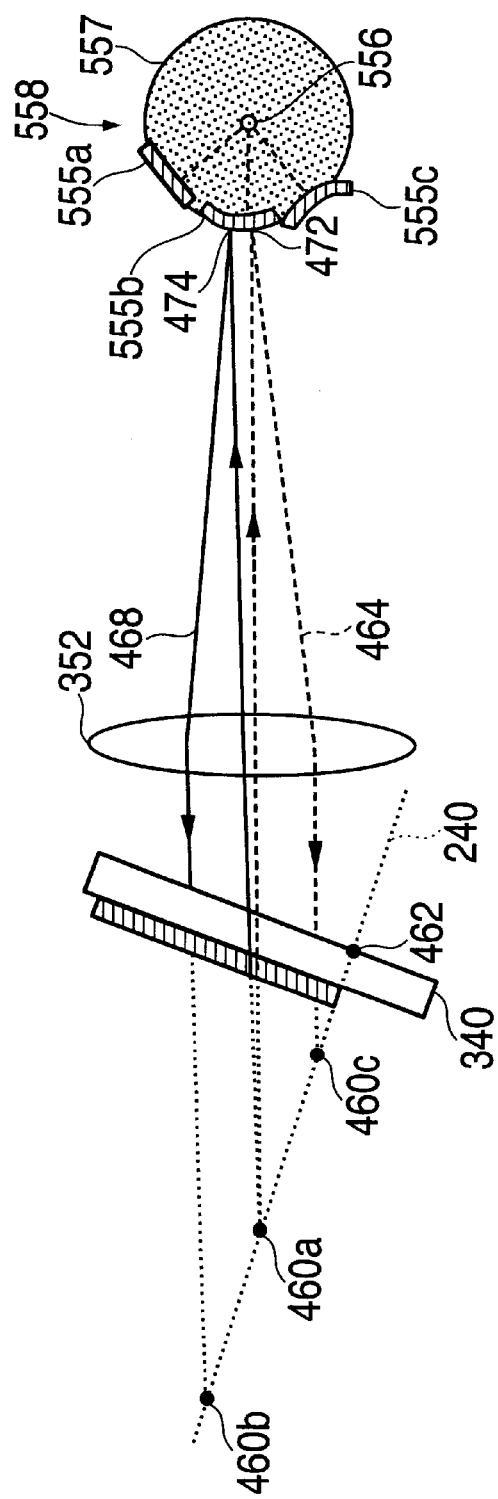

OPTICAL APPARATUS WHICH USES A VIRTUALLY IMAGED PHASED ARRAY TO PRODUCE CHROMATIC DISPERSION

CROSS-REFERENCE TO RELATED APPLICATIONS

This application is a continuation-in-part (CIP) of U.S. application Ser. No. 09/576,541, filed May 23, 2000, which is incorporated herein by reference.

The subject matter of the present application is related to U.S. application Ser. No. 09/461,277, filed Dec. 14, 1999, now U.S. Pat. No. 6,296,361; U.S. application Ser. No. 08/796,842, filed Feb. 7, 1997, U.S. Pat. No. 5,930,045; U.S. application Ser. No. 08/685,362, filed Jul. 24, 1996, U.S. Pat. No. 5,999,320; and U.S. application Ser. No. 08/910,251, filed Aug. 13, 1997, U.S. Pat. No. 5,969,865; which are incorporated herein by reference.

BACKGROUND OF THE INVENTION

1. Field of the Invention

The present invention relates to an apparatus producing chromatic dispersion, and which can be used to compensate for chromatic dispersion accumulated in an optical fiber transmission line. More specifically, the present invention relates to an apparatus which uses a virtually imaged phased array to produce chromatic dispersion.

2. Description of the Related Art

FIG. 1(A) is a diagram illustrating a conventional fiber optic communication system, for transmitting information via light. Referring now to FIG. 1(A), a transmitter 30 transmits pulses 32 through an optical fiber 34 to a receiver 36. Unfortunately, chromatic dispersion, also referred to as "wavelength dispersion", of optical fiber 34 degrades the signal quality of the system.

More specifically, as a result of chromatic dispersion, the propagating speed of a signal in an optical fiber depends on the wavelength of the signal. For example, when a pulse with a longer wavelength (for example, a pulse with wavelengths representing a "red" color pulse) travels faster than a pulse with a shorter wavelength (for example, a pulse with wavelengths representing a "blue" color pulse), the dispersion is typically referred to as "normal" dispersion. By contrast, when a pulse with a shorter wavelength (such as a blue color pulse) is faster than a pulse with a longer wavelength (such as a red color pulse), the dispersion is typically referred to as "anomalous" dispersion.

Therefore, if pulse 32 consists of red and blue color pulses when emitted from transmitter 30, pulse 32 will be split as it travels through optical fiber 34 so that a separate red color pulse 38 and a blue color pulse 40 are received by receiver 36 at different times. FIG. 1(A) illustrates a case of "normal" dispersion, where a red color pulse travels faster than a blue color pulse.

As another example of pulse transmission, FIG. 1(B) is a diagram illustrating a pulse 42 having wavelength components continuously from blue to red, and transmitted by transmitter 30. FIG. 1(C) is a diagram illustrating pulse 42 when arrived at receiver 36. Since the red component and the blue component travel at different speeds, pulse 42 is broadened in optical fiber 34 and, as illustrated by FIG. 1(C), is distorted by chromatic dispersion. Such chromatic dispersion is very common in fiber optic communication systems, since all pulses include a finite range of wavelengths.

Therefore, for a fiber optic communication system to provide a high transmission capacity, the fiber optic communication system must compensate for chromatic dispersion.

FIG. 2 is a diagram illustrating a fiber optic communication system having an opposite dispersion component to compensate for chromatic dispersion. Referring now to FIG. 2, generally, an opposite dispersion component 44 adds an "opposite" dispersion to a pulse to cancel dispersion caused by traveling through optical fiber 34.

There are conventional devices which can be used as opposite dispersion component 44. For example, FIG. 3 is a diagram illustrating a fiber optic communication system having a dispersion compensation fiber which has a special cross-section index profile and thereby acts as an opposite dispersion component, to compensate for chromatic dispersion. Referring now to FIG. 3, a dispersion compensation fiber 46 provides an opposite dispersion to cancel dispersion caused by optical fiber 34. However, a dispersion compensation fiber is expensive to manufacture, and must be relatively long to sufficiently compensate for chromatic dispersion. For example, if optical fiber 34 is 100 km in length, then dispersion compensation fiber 46 should be approximately 20 to 30 km in length.

FIG. 4 is a diagram illustrating a chirped grating for use as an opposite dispersion component, to compensate for chromatic dispersion. Referring now to FIG. 4, light traveling through an optical fiber and experiencing chromatic dispersion is provided to an input port 48 of an optical circulator 50. Circulator 50 provides the light to chirped grating 52. Chirped grating 52 reflects the light back towards circulator 50, with different wavelength components reflected at different distances along chirped grating 52 so that different wavelength components travel different distances to thereby compensate for chromatic dispersion. For example, chirped grating 52 can be designed so that longer wavelength components are reflected at a farther distance along chirped grating 52, and thereby travel a farther distance than shorter wavelength components. Circulator 50 then provides the light reflected from chirped grating 52 to an output port 54. Therefore, chirped grating 52 can add opposite dispersion to a pulse.

Unfortunately, a chirped grating has a very narrow bandwidth for reflecting pulses, and therefore cannot provide a wavelength band sufficient to compensate for light including many wavelengths, such as a wavelength division multiplexed light. A number of chirped gratings may be cascaded for wavelength multiplexed signals, but this results in an expensive system. Instead, a chirped grating with a circulator, as in FIG. 4, is more suitable for use when a single channel is transmitted through a fiber optic communication system.

FIG. 5 is a diagram illustrating a conventional diffraction grating, which can be used in producing chromatic dispersion. Referring now to FIG. 5, a diffraction grating 56 has a grating surface 58. Parallel lights 60 having different wavelengths are incident on grating surface 58. Lights are reflected at each step of grating surface 58 and interfere with each other. As a result, lights 62, 64 and 66 having different wavelengths are output from diffraction grating 56 at different angles. A diffraction grating can be used in a spatial grating pair arrangement, as discussed in more detail below, to compensate for chromatic dispersion.

More specifically, FIG. 6(A) is a diagram illustrating a spatial grating pair arrangement for use as an opposite dispersion component, to compensate for chromatic dispersion. Referring now to FIG. 6(A), light 67 is diffracted from a first diffraction grating 68 into a light 69 for shorter wavelength and a light 70 for longer wavelength. These lights 69 and 70 are then diffracted by a second diffraction grating 71 into lights propagating in the same direction. As can be seen from FIG. 6(A), wavelength components having different wavelengths travel different distances, to add opposite dispersion and thereby compensate for chromatic dispersion. Since longer wavelengths (such as lights 70) travel longer distance than shorter wavelengths (such as lights 69), a spatial grating pair arrangement as illustrated in FIG. 6(A) has anomalous dispersion.

FIG. 6(B) is a diagram illustrating an additional spatial grating pair arrangement for use as an opposite dispersion component, to compensate for chromatic dispersion. As illustrated in FIG. 6(B), lenses 72 and 74 are positioned between first and second diffraction gratings 68 and 71 so that they share one of the focal points. Since longer wavelengths (such as lights 70) travel shorter distance than shorter wavelengths (such as lights 69), a spatial grating pair arrangement as illustrated in FIG. 6(B) has normal dispersion.

A spatial grating pair arrangement as illustrated in FIGS. 6(A) and 6(B) is typically used to control dispersion in a laser resonator. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, first and second gratings 68 and 71 would have to be separated by very large distances, thereby making such a spatial grating pair arrangement impractical.

SUMMARY OF THE INVENTION

Therefore, it is an object of the present invention to provide an apparatus which produces chromatic dispersion, and which is practical for compensating for chromatic dispersion accumulated in an optical fiber.

Objects of the present invention are achieved by providing an apparatus which includes a device described herein and which can be referred to as a "virtually imaged phased array", "VIPA" or "VIPA generator".

More specifically, objects of the present invention are achieved by providing an apparatus which includes (a) a variable curvature mirror positioned to reflect light produced by a virtually imaged phased array (VIPA) generator back to the VIPA generator; and (b) a rotation axis around which the mirror is rotated to change the curvature of the mirror where the output light is reflected.

Objects of the present invention are also achieved by providing an apparatus which includes (a) a virtually imaged phased array (VIPA) generator producing a light traveling from the VIPA generator; (b) a variable curvature mirror positioned to reflect the light back to the VIPA generator; and (c) a rotation axis around which the mirror is rotated to change the curvature of the mirror where the output light is reflected.

Objects of the present invention are further achieved by providing an apparatus which includes (a) a virtually imaged phased array (VIPA) generator receiving an input light at a respective wavelength and producing a corresponding output light traveling from the VIPA generator in a direction determined by the wavelength of the input light; (b) a variable curvature mirror positioned to reflect the output light back to the VIPA generator so that the reflected output light travels through the VIPA generator, to thereby provide dispersion compensation to the input light; and (c) a rotation axis around which the mirror is rotated to change the curvature of the mirror where the output light is reflected, to thereby vary an amount of dispersion compensation provided to the input light.

Moreover, objects of the present invention are achieved by providing an apparatus which includes (a) a radiation window; (b) first and second reflecting surfaces in parallel with each other, the first reflecting surface allowing substantially no light to be transmitted therethrough and being in the same plane as the radiation window, the second reflecting surface having a reflectivity which causes a portion of light incident thereon to be transmitted therethrough, where an input light at a respective wavelength travels through the radiation window and is focused into a line, and the first and second reflecting surfaces are positioned so that the input light radiates from the line to be reflected a plurality of times between the first and second reflecting surfaces and thereby cause a plurality of lights to be transmitted through the second reflecting surface, the plurality of transmitted lights interfering with each other to produce a collimated output light which travels from the second reflecting surface along a direction determined by the wavelength of the input light, and is thereby specially distinguishable from an output light formed for an input light having a different wavelength; (c) a variable curvature mirror reflecting the output light back to the second reflecting surface to pass through the second reflecting surface and undergo multiple reflection between the first and second reflecting surfaces; and (d) a rotation axis around which the mirror is rotated to change the curvature of the mirror where the output light is reflected.

Objects of the present invention are achieved by providing an apparatus which includes (a) a plurality of mirrors having different surface curvatures to reflect light; and (b) a holder having a rotation axis and holding the plurality of mirrors equidistantly from the rotation axis, the holder being rotatable around the rotation axis to bring a different, respective mirror of the plurality of mirrors in position to reflect light produced by a virtually imaged phased array (VIPA) generator back to the VIPA generator.

Objects of the present invention are achieved by providing an apparatus which includes (a) a virtually imaged phased array (VIPA) generator producing light; (b) a plurality of mirrors having different surface curvatures; and (c) a holder having a rotation axis and holding the plurality of mirrors equidistantly from the rotation axis, the holder being rotatable around the rotation axis to bring a different, respective mirror of the plurality of mirrors in position to reflect the light produced by a VIPA generator back to the VIPA generator.

In addition, objects of the present invention are achieved by providing an apparatus which includes (a) a virtually imaged phased array (VIPA) generator receiving an input light at a respective wavelength and producing a corresponding output light traveling from the VIPA generator in a direction determined by the wavelength of the input light; (b) a plurality of mirrors having different surface curvatures; and (c) a holder having a rotation axis and holding the plurality of mirrors equidistantly from the rotation axis, the holder being rotatable around the rotation axis to bring a different, respective mirror of the plurality of mirrors in position to reflect the output light back to the VIPA generator, to thereby provide dispersion compensation to the input light.

Objects of the present invention are also achieved by providing an apparatus which includes (a) a radiation window; (b) first and second reflecting surfaces in parallel with each other, the first reflecting surface allowing substantially no light to be transmitted therethrough and being in the same plane as the radiation window, the second reflecting surface having a reflectivity which causes a portion of light incident thereon to be transmitted therethrough, where an input light at a respective wavelength travels through the radiation window and is focused into a line, and the first and second reflecting surfaces are positioned so that the input light radiates from the line to be reflected a plurality of times between the first and second reflecting surfaces and thereby cause a plurality of lights to be transmitted through the second reflecting surface, the plurality of transmitted lights interfering with each other to produce a collimated output light which travels from the second reflecting surface along a direction determined by the wavelength of the input light, and is thereby specially distinguishable from an output light formed for an input light having a different wavelength; (c) a plurality of mirrors having different surface curvatures; and (d) a holder having a rotation axis and holding the plurality of mirrors equidistantly from the rotation axis, the holder being rotatable around the rotation axis to bring a different, respective mirror of the plurality of mirrors in position to reflect the output light back to the second reflecting surface to pass through the second reflecting surface and undergo multiple reflection between the first and second surfaces.

Moreover, objects of the present invention are achieved by providing an apparatus which includes (a) a plurality of fixed mirrors having different surface curvatures to reflect light; and (b) a rotating mirror rotatable about a rotation axis to reflect light produced by a virtually imaged phased array (VIPA) generator to a respective fixed mirror of the plurality of fixed mirrors, and to reflect the light reflected by the respective fixed mirror back to the VIPA generator.

In addition, objects of the present invention are achieved by providing an apparatus which includes (a) a virtually imaged phased array (VIPA) generator producing light; (b) a plurality of fixed mirrors having different surface curvatures to reflect light; and (c) a rotating mirror rotatable about a rotation axis to reflect light produced by the VIPA generator to a respective fixed mirror of the plurality of fixed mirrors, and to reflect the light reflected by the respective fixed mirror back to the VIPA generator.

Further, objects of the present invention are achieved by providing an apparatus which includes (a) a virtually imaged phased array (VIPA) generator receiving an input light at a respective wavelength and producing a corresponding output light traveling from the VIPA generator in a direction determined by the wavelength of the input light; (b) a plurality of fixed mirrors having different surface curvatures to reflect light; and (c) a rotating mirror rotatable to about a rotation axis to reflect the output light traveling from the VIPA generator to a respective fixed mirror of the plurality of fixed mirrors, and to reflect the light reflected by the respective fixed mirror back to the VIPA generator, to thereby provide dispersion compensation to the input light.

Also, objects of the present invention are achieved by providing an apparatus which includes (a) a radiation window; (b) first and second reflecting surfaces in parallel with each other, the first reflecting surface allowing substantially no light to be transmitted therethrough and being in the same plane as the radiation window, the second reflecting surface having a reflectivity which causes a portion of light incident thereon to be transmitted therethrough, where an input light at a respective wavelength travels through the radiation window and is focused into a line, and the first and second reflecting surfaces are positioned so that the input light radiates from the line to be reflected a plurality of times between the first and second reflecting surfaces and thereby cause a plurality of lights to be transmitted through the second reflecting surface, the plurality of transmitted lights interfering with each other to produce a collimated output light which travels from the second reflecting surface along a direction determined by the wavelength of the input light, and is thereby specially distinguishable from an output light formed for an input light having a different wavelength; (c) a plurality of fixed mirrors having different surface curvatures to reflect light; and (d) a rotating mirror rotatable about a rotation axis to reflect the output light traveling from the second reflecting surface to a respective fixed mirror of the plurality of fixed mirrors, and to reflect the light reflected by the respective fixed mirror back to the second reflecting surface to pass through the second reflecting surface and undergo multiple reflection between the first and second reflecting surfaces.

Objects of the present invention are achieved by providing an apparatus which includes (a) a plurality of fixed mirrors having different surface curvatures to reflect light; and (b) an off-axis parabolic mirror rotatable about a rotation axis to reflect light produced by a virtually imaged phased array (VIPA) generator to a respective fixed mirror of the plurality of fixed mirrors, and to reflect the light reflected by the respective fixed mirror back to the VIPA generator.

Further, objects of the present invention are achieved by providing an apparatus which includes (a) a virtually imaged phased array (VIPA) generator producing light; (b) a plurality of fixed mirrors having different surface curvatures to reflect light; and (c) an off-axis parabolic mirror rotatable about a rotation axis to reflect light produced by the VIPA generator to a respective fixed mirror of the plurality of fixed mirrors, and to reflect the light reflected by the respective fixed mirror back to the VIPA generator.

In addition, objects of the present invention are achieved by providing an apparatus which includes (a) a virtually imaged phased array (VIPA) generator receiving an input light at a respective wavelength and producing a corresponding output light traveling from the VIPA generator in a direction determined by the wavelength of the input light; (b) a plurality of fixed mirrors having different surface curvatures to reflect light; and (c) an off-axis parabolic mirror rotatable about a rotation axis to reflect the output light traveling from the VIPA generator to a respective fixed mirror of the plurality of fixed mirrors, and to reflect the light reflected by the respective fixed mirror back to the VIPA generator, to thereby provide dispersion compensation to the input light.

Moreover, objects of the present invention are achieved by providing an apparatus which includes (a) a radiation window; (b) first and second reflecting surfaces in parallel with each other, the first reflecting surface allowing substantially no light to be transmitted therethrough and being in the same plane as the radiation window, the second reflecting surface having a reflectivity which causes a portion of light incident thereon to be transmitted therethrough, where an input light at a respective wavelength travels through the radiation window and is focused into a line, and the first and second reflecting surfaces are positioned so that the input light radiates from the line to be reflected a plurality of times between the first and second reflecting surfaces and thereby cause a plurality of lights to be transmitted through the second reflecting surface, the plurality of transmitted lights interfering with each other to produce a collimated output light which travels from the second reflecting surface along a direction determined by the wavelength of the input light, and is thereby specially distinguishable from an output light formed for an input light having a different wavelength; (c) a plurality of fixed mirrors having different surface curvatures to reflect light; and (d) an off-axis parabolic mirror rotatable about a rotation axis to reflect the output light traveling from the second reflecting surface to a respective fixed mirror of the plurality of fixed mirrors, and to reflect the light reflected by the respective fixed mirror back to the second reflecting surface to pass through the second reflecting surface and undergo multiple reflection between the first and second reflecting surfaces.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 27 is a graph illustrating characteristics of different mirror designs for an apparatus using a VIPA.

FIGS. 28(A), 28(B), 28(C), 28(D), 28(E) and 28(F) are diagrams illustrating examples of mirrors of an apparatus using a VIPA.

FIG. 50 is a graph illustrating insertion loss in an apparatus which uses a VIPA to provide chromatic dispersion, according to an embodiment of the present invention.

FIG. 51 is a diagram illustrating different diffraction efficiency at different wavelengths in an apparatus which uses a VIPA to provide chromatic dispersion, according to an embodiment of the present invention.

FIG. 52 is a diagram illustrating the light intensity of light traveling out of a fiber and into a VIPA, according to an embodiment of the present invention.

FIG. 53 is a diagram illustrating a side view of an optical phase mask on an input fiber to produce a double-humped shape far field distribution, in an apparatus which uses a VIPA to provide chromatic dispersion, according to an embodiment of the present invention.

FIG. 54 is a diagram illustrating a cross-sectional view along lines 54—54 in FIG. 53, according to an embodiment of the present invention.

FIGS. 57 and 58 are diagrams illustrating a side view of phase masks on a VIPA to provide a double-humped shape far field distribution with respect to light received inside the VIPA, according to an additional embodiment of the present invention.

FIGS. 68 and 69 are diagrams illustrating a tunable dispersion compensator that utilizes a rotatable variably curved mirror, according to an embodiment of the present invention.

FIG. 70 is a diagram illustrating an example of a variably curved mirror for utilization as part of a tunable dispersion compensator, according to an embodiment of the present invention.

FIG. 71 is a diagram illustrating a tunable dispersion compensator that utilizes a plurality of curved mirrors or mirror segments, according to an embodiment of the present invention.

DESCRIPTION OF THE PREFERRED EMBODIMENTS

Figure 1A:
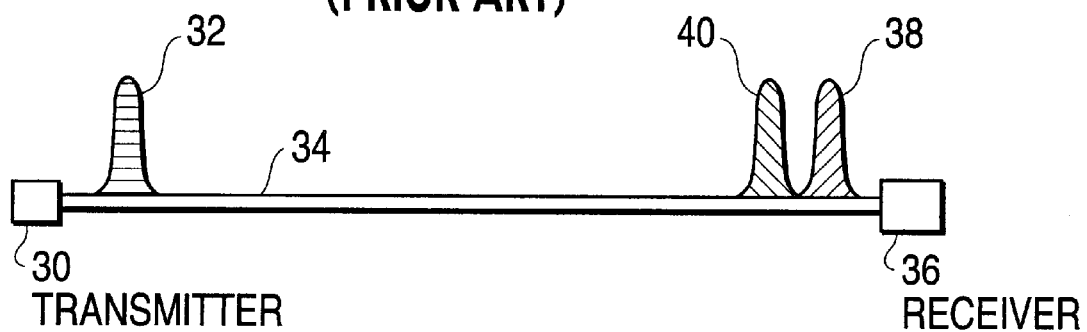
FIG. 1(A) (prior art) is a diagram illustrating a conventional fiber optic communication system.

Reference will now be made in detail to the present preferred embodiments of the present invention, examples of which are illustrated in the accompanying drawings, wherein like reference numerals refer to like elements throughout.

Figure 7:
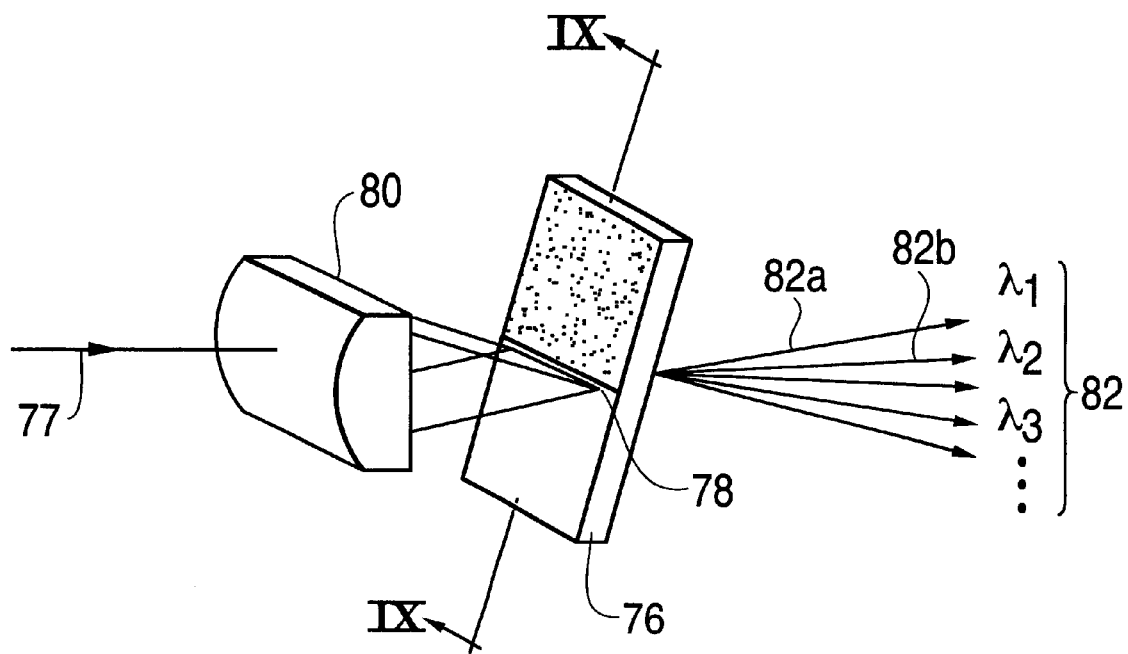
FIG. 7 is a diagram illustrating a VIPA.

FIG. 7 is a diagram illustrating a virtually imaged phased array (VIPA). Moreover, hereinafter, the terms "virtually imaged phased array," "VIPA" and "VIPA generator" may be used interchangeably.

Referring now to FIG. 7, a VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 to be received inside VIPA 76. VIPA 78 then outputs a luminous flux 82 of collimated light, where the output angle of luminous flux 82 varies as the wavelength of input light 77 changes. For example, when input light 77 is at a wavelength $\lambda 1$, VIPA 76 outputs a luminous flux 82a at wavelength $\lambda 1$ in a specific direction. When input light 77 is at a wavelength $\lambda 2$, VIPA 76 outputs a luminous flux 82b at wavelength $\lambda 2$ in a different direction. Therefore, VIPA 76 produces luminous fluxes 82a and 82b which are spatially distinguishable from each other.

Figure 8:
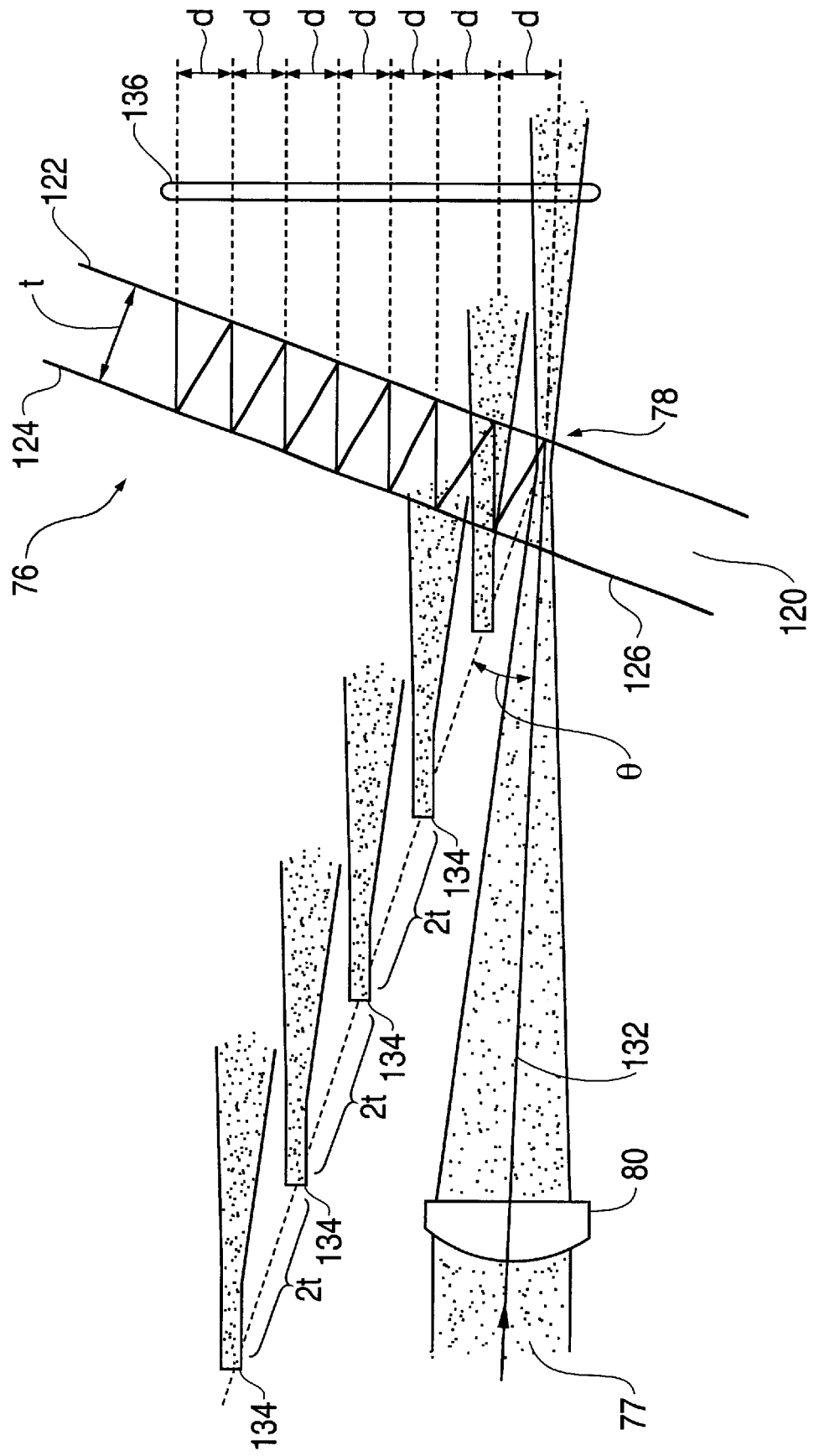
FIG. 8 is a diagram illustrating the VIPA of FIG. 7.

FIG. 8 is a detailed diagram illustrating VIPA 76. Referring now to FIG. 8, VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0% reflectance.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated is FIG. 8 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of radiation window 126 on the surface of plate 120 covered by input light 77 as it travels through radiation window 126 (for example, the area "a" illustrated in FIG. 11, discussed in more detail further below), and (ii) the area on reflecting film 124 covered by input light 77 when input light 77 is reflected for the first time by reflecting film 124 (for example, the area "b" illustrated in FIG. 11, discussed in more detail further below). It is desirable to reduce such overlap to ensure proper operation of the VIPA.

In FIG. 8, an optical axis 132 of input light 77 has a small tilt angle $\theta$. Upon the first reflection off of reflecting film 122, 5% of the light passes through reflecting film 122 and diverges after the beam waist, and 95% of the light is reflected towards reflecting film 124. After being reflecting by reflecting film 124 for the first time, the light again hits reflecting film 122 but is displaced by an amount d. Then, 5% of the light passes through reflecting film 122. In a similar manner, as illustrated in FIG. 8, the light is split into many paths with a constant separation d. The beam shape in each path forms so that the light diverges from virtual images 134 of the beam waist. Virtual images 134 are located with constant spacing 2t along a line that is normal to plate 120, where t is the thickness of plate 120. The positions of the beam waists in virtual images 134 are self-aligned, and there is no need to adjust individual positions. The lights diverging from virtual images 134 interfere with each other and form collimated light 136 which propagates in a direction that changes in accordance with the wavelength of input light 77.

The spacing of light paths is $d=2t \sin \theta$, and the difference in the path lengths between adjacent beams is $2t \cos \theta$. The angular dispersion is proportional to the ratio of these two numbers, which is $\cot \theta$. As a result, a VIPA produces a significantly large angular dispersion.

As easily seen from FIG. 8, the term "virtually imaged phased array" arises from the formation of an array of virtual images 134.

Figure 9:
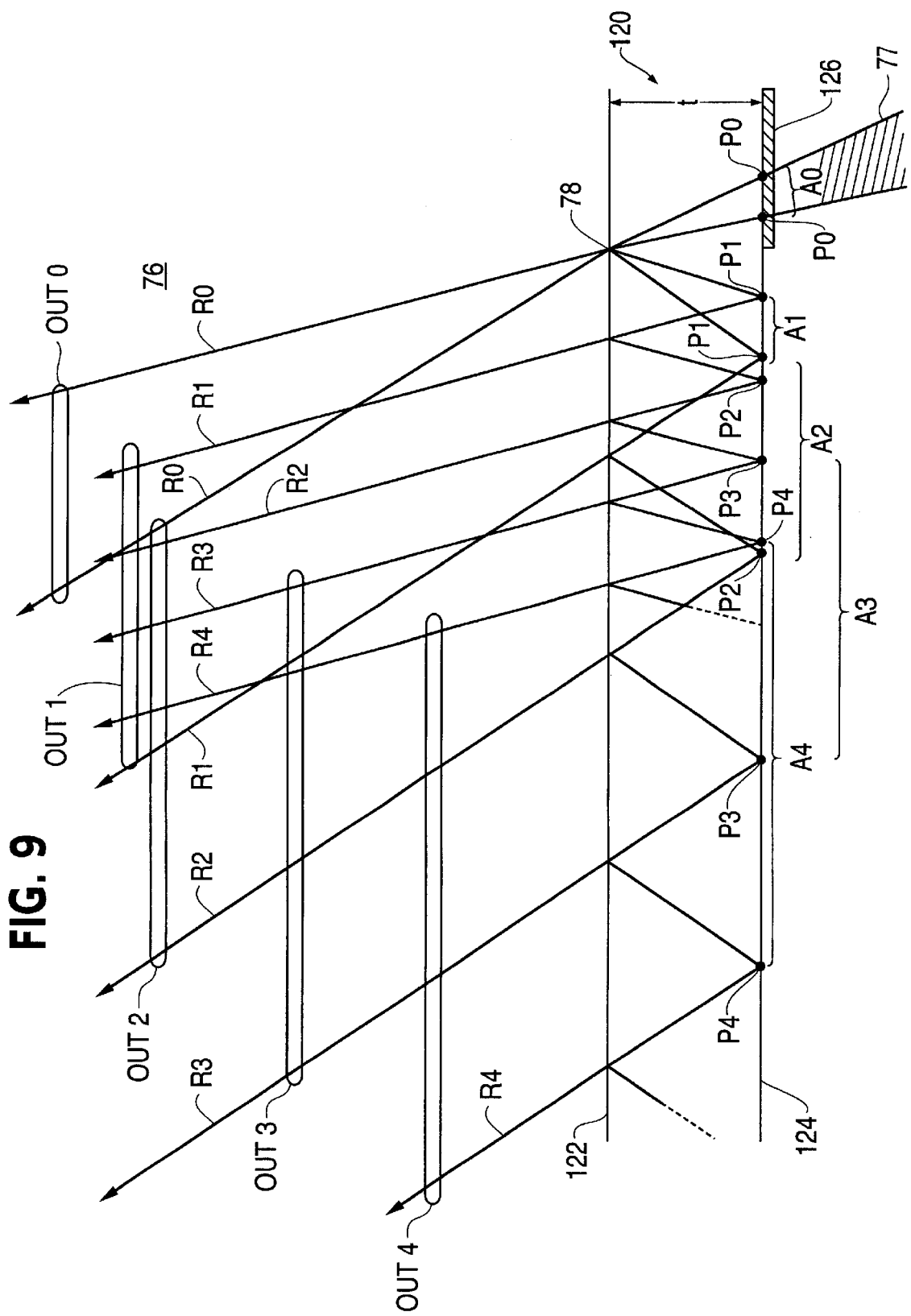
FIG. 9 is a diagram illustrating a cross-section along lines IX—IX of the VIPA illustrated in FIG. 7.

FIG. 9 is a diagram illustrating a cross-section along lines IX—IX of VIPA 76 illustrated in FIG. 7. Referring now to FIG. 9, plate 120 has reflecting surfaces 122 and 124 thereon. Reflecting surfaces 122 and 124 are in parallel with each other and spaced by the thickness t of plate 120. Reflecting surfaces 122 and 124 are typically reflecting films deposited on plate 120. As previously described, reflecting surface 124 has a reflectance of approximately 100%, except in radiation window 126, and reflecting surface 122 has a reflectance of approximately 95% or higher. Therefore, reflecting surface 122 has a transmittance of approximately 5% or less so that approximately 5% of light incident on reflecting surface 122 will be transmitted therethrough and approximately 95% or more of the light will be reflected. The reflectances of reflecting surfaces 122 and 124 can easily be changed in accordance with the specific VIPA application. However, generally, reflecting surface 122 should have a reflectance which is less than 100% so that a portion of incident light can be transmitted therethrough.

Reflecting surface 124 has radiation window 126 thereon. Radiation window 126 allows light to pass therethrough, and preferably has no reflectance, or a very low reflectance. Radiation window 126 receives input light 77 to allow input light 77 to be received between, and reflected between, reflecting surfaces 122 and 124.

Since FIG. 9 represents a cross-section along lines IX—IX in FIG. 7, focal line 78 in FIG. 7 appears as a "point" in FIG. 9. Input light 77 then propagates radially from focal line 78. Moreover, as illustrated in FIG. 9, focal line 78 is positioned on reflecting surface 122. Although it is not required for focal line 78 to be on reflecting surface 122, a shift in the positioning of focal line 78 may cause small changes in the characteristics of VIPA 76.

As illustrated in FIG. 9, input light 77 enters plate 120 through an area A0 in radiation window 126, where points P0 indicate peripheral points of area A0.

Due to the reflectivity of reflecting surface 122, approximately 95% or more of input light 77 is reflected by reflecting surface 122 and is incident on area A1 of reflecting surface 124. Points P1 indicate peripheral points of area A1. After reflecting off area A1 on reflecting surface 124, input light 77 travels to reflecting surface 122 and is partially transmitted through reflecting surface 122 as output light Out1 defined by rays R1. In this manner, as illustrated in FIG. 9, input light 77 experiences multiple reflections between reflecting surfaces 122 and 124, wherein each reflection off of reflecting surface 122 also results in a respective output light being transmitted therethrough. Therefore, for example, each time immediately after input light 77 reflects off of areas A2, A3 and A4 on reflecting surface 124, input light 77 reflects off of reflecting surface 122 to produce output lights Out2, Out3 and Out4. Points P2 indicate peripheral points of area A2, points P3 indicate peripheral points of area A3, and points P4 indicate peripheral points of area A4. Output light Out2 is defined by rays R2, output light Out3 is defined by rays R3 and output light Out4 is defined by rays R4. Although FIG. 9 only illustrates output lights Out0, Out1, Out2, Out3 and Out4, there will actually be many more output lights, depending on the power on input light 77 and the reflectances of reflecting surfaces 122 and 124. As will be discussed in more detail further below, the output lights interfere with each other to produce a luminous flux having a direction which changes in accordance with the wavelength of input light 77. Therefore, the luminous flux can be described as being a resulting output light formed from the interference of output lights Out0, Out1, Out2, Out3 and Out4.

Figure 10:
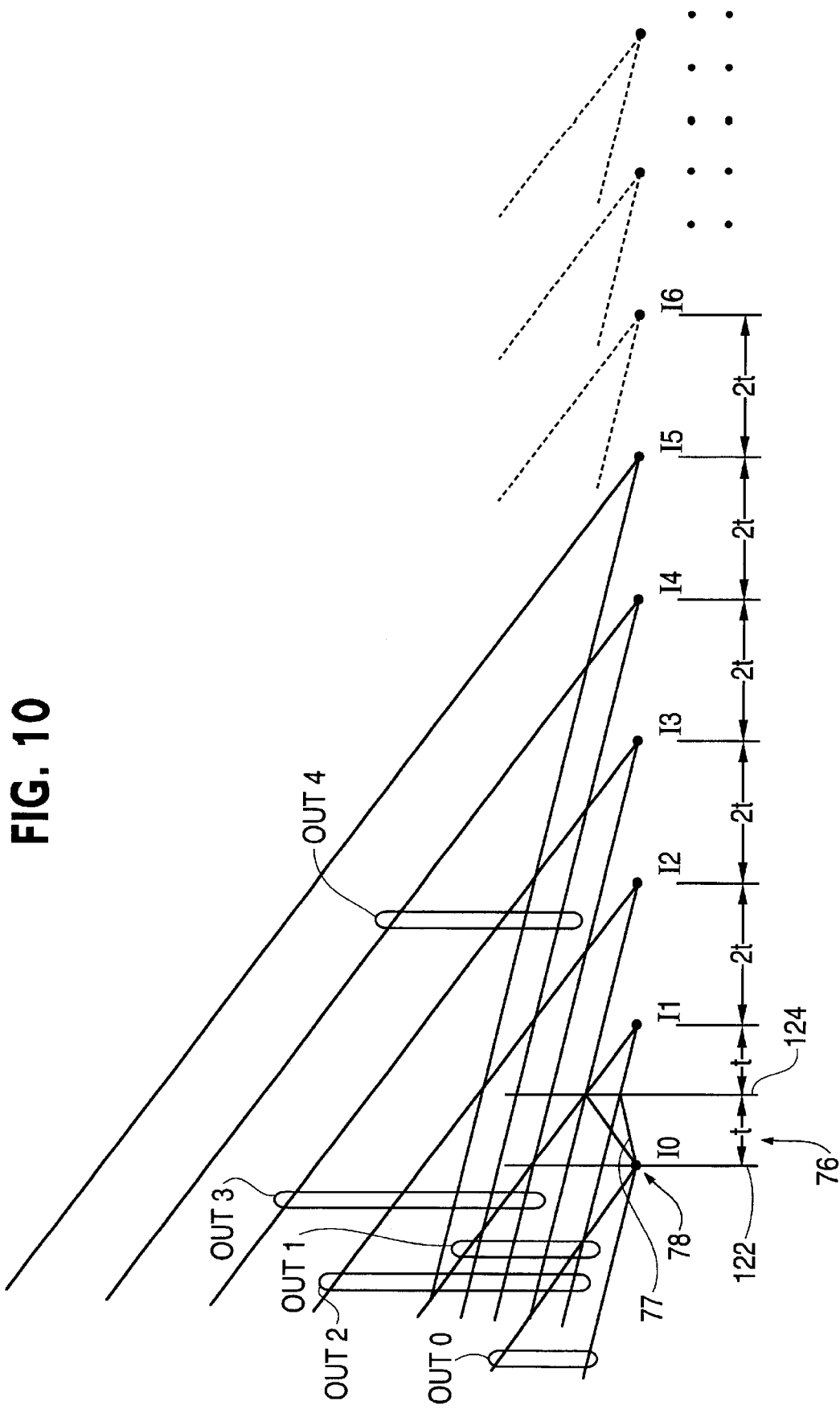
FIG. 10 is a diagram illustrating interference between reflections produced by a VIPA.

FIG. 10 is a diagram illustrating interference between reflections produced by a VIPA. Referring now to FIG. 10, light traveling from focal line 78 is reflected by reflecting surface 124. As previously described, reflecting surface 124 has a reflectance of approximately 100% and, therefore, functions essentially as a mirror. As a result, output light Out1 can be optically analyzed as if reflecting surfaces 122 and 124 did not exist and, instead, output light Out1 was emitted from a focal line $I_1$. Similarly, output lights Out2, Out3 and Out4 can be optically analyzed as if they were emitted from focal lines $I_1$, $I_2$, $I_3$ and $I_4$, respectively. The focal lines $I_2$, $I_3$ and $I_4$ are virtual images of a focal line $I_0$.

Therefore, as illustrated in FIG. 10, focal line $I_1$, is a distance 2t from focal line $I_0$ where t equals the distance between reflecting surfaces 122 and 124. Similarly, each subsequent focal line is a distance 2t from the immediately preceding focal line. Thus, focal line $I_2$ is a distance 2t from focal line $I_1$. Moreover, each subsequent multiple reflection between reflecting surfaces 122 and 124 produces an output light which is weaker in intensity than the previous output light. Therefore, output light Out2 is weaker in intensity than output light Out1.

As illustrated in FIG. 10, output lights from the focal lines overlap and interfere with each other. More specifically, since focal lines $I_1$, $I_2$, $I_3$ and $I_4$ are the virtual images of focal line $I_0$, output lights Out0, Out1, Out2, Out3 and Out4 have the same optical phase at the positions of focal lines $I_1$, $I_2$, $I_3$ and $I_4$. Therefore, interference produces a luminous flux which travels in a specific direction depending on the wavelength of input light 77.

A VIPA according to the above embodiments of the present invention has strengthening conditions which are characteristics of the design of the VIPA. The strengthening conditions increase the interference of the output lights so that a luminous flux is formed. The strengthening conditions of the VIPA are represented by the following Equation (1):

$$2t \times \cos \phi = m\lambda$$

where φ indicates the propagation direction of the resulting luminous flux as measured from a line perpendicular to the surface of reflecting surfaces 122 and 124, λ indicates the wavelength of the input light, t indicates the distance between the reflecting surfaces 122 and 124, and m indicates an integer.

Therefore, if t is constant and m is assigned a specific value, then the propagation direction φ of the luminous flux formed for input light having wavelength λ can be determined.

More specifically, input light 77 is radially dispersed from focal line 78 through a specific angle. Therefore, input light having the same wavelength will be traveling in many different direction from focal line 78, to be reflected between reflecting surfaces 122 and 124. The strengthening conditions of the VIPA cause light traveling in a specific direction to be strengthened through interference of the output lights to form a luminous flux having a direction corresponding to the wavelength of the input light. Light traveling in different direction than the specific direction required by the strengthening condition will be weakened by the interference of the output lights.

Figure 11:
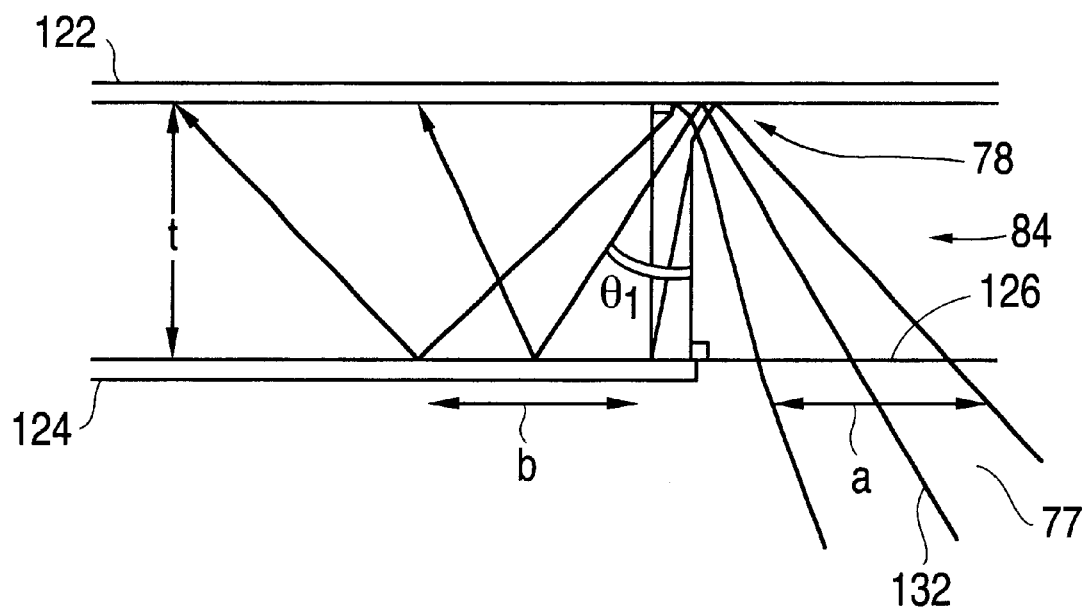
FIG. 11 is a diagram illustrating a cross-section along lines IX—IX of the VIPA illustrated in FIG. 7, for determining the tilt angle of input light.

FIG. 11 is a diagram illustrating a cross-section along lines IX—IX of the VIPA illustrated in FIG. 7, showing characteristics of a VIPA for determining the angle of incidence, or tilt angle, of input light.

Referring now to FIG. 11, input light 77 is collected by a cylindrical lens (not illustrated) and focused at focal line 78. As illustrated in FIG. 11, input light 77 covers an area having a width equal to "a" on radiation window 126. After input light 77 is reflected one time from reflecting surface 122, input light 77 is incident on reflecting surface 124 and covers an area having a width equal to "b" on reflecting surface 124. Moreover, as illustrated in FIG. 11, input light 77 travels along optical axis 132 which is at a tilt angle θ1 with respect to the normal to reflecting surface 122.

The tilt angle θ1 should be set to prevent input light 77 from traveling out of the plate through radiation window 126 after being reflected the first time by reflecting surface 122. In other words, the tilt angle θ1 should be set so that input light 77 remains "trapped" between reflecting surfaces 122 and 124 and does not escape through radiation window 126. Therefore, to prevent input light 77 from traveling out of the plate through radiation window 126, the tilt angle θ1 should be set in accordance with the following Equation (2):

$$\text{tilt of optical axis } \theta1 \geq (a+b)/4t$$

Therefore, as illustrated by FIGS. 7–11, a VIPA receives an input light having a respective wavelength within a continuous range of wavelengths. The VIPA causes multiple reflection of the input light to produce self-interference and thereby form an output light. The output light is spatially distinguishable from an output light formed for an input light having any other wavelength within the continuous range of wavelengths. For example, FIG. 9 illustrates an input light 77 which experiences multiple reflection between reflecting surfaces 122 and 124. This multiple reflection produces a plurality of output lights Out0, Out1, Out2, Out3 and Out 4 which interfere with each other to produce a spatially distinguishable luminous flux for each wavelength of input light 77.

"Self-interference" is a term indicating that interference occurs between a plurality of lights or beams which all originate from the same source. Therefore, the interference of output lights Out0, Out1, Out2, Out3 and Out4 is referred to as self-interference of input light 77, since output lights Out0, Out1, Out2, Out3 and Out4 all originate from the same source (that is, input light 77).

An input light can be at any wavelength within a continuous range of wavelengths. Thus, the input light is not limited to being a wavelength which is a value chosen from a range of discrete values. In addition, the output light produced for an input light at a specific wavelength within a continuous range of wavelengths is spatially distinguishable from an output light which would have been produced if the input light was at a different wavelength within the continuous range of wavelengths. Therefore, as illustrated, for example, in FIG. 7, the traveling direction (that is, a "spatial characteristic") of the luminous flux 82 is different when input light 77 is at different wavelengths within a continuous range of wavelengths.

FIGS. 12(A), 12(B), 12(C) and 12(D) are diagram illustrating a method for producing a VIPA.

Figure 12A:
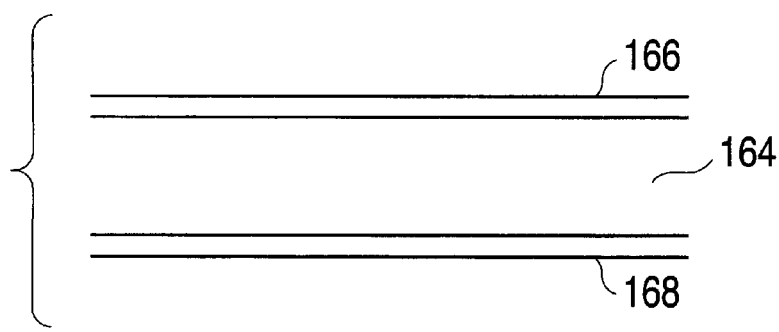
FIGS 12(A), 12(B) 12(C) and 12(D) are diagrams illustrating a method for producing a VIPA.

Referring now to FIG. 12(A), a parallel plate 164 is preferably made of glass and exhibits excellent parallelism. Reflecting films 166 and 168 are formed on both sides of the parallel plate 164 by vacuum deposition, ion spattering or other such methods. One of reflecting films 166 and 168 has a reflectance of nearly 100%, and the other reflecting film has a reflectance of lower than 100%, and preferably higher than 80%.

Figure 12B:
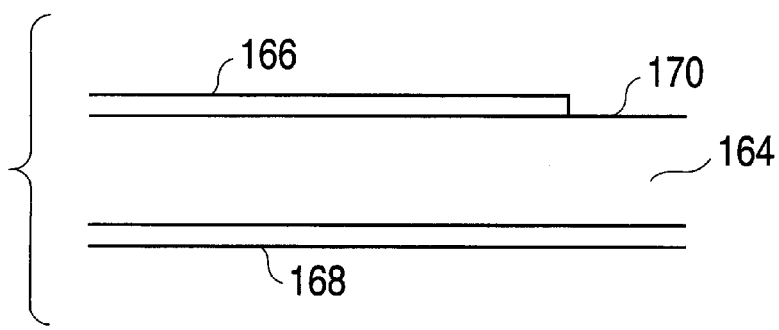

Referring now to FIG. 12(B), one of reflecting films 166 and 168 is partially shaved off to form a radiation window 170. In FIG. 12(B), reflecting film 166 is shown as being shaved off so that radiation window 170 can be formed on the same surface of parallel plate 164 as reflecting film 166. However, instead, reflecting film 168 can be partially shaved off so that a radiation window is formed on the same surface of parallel plate 164 as reflecting film 168. As illustrated by the various embodiment of the present invention, a radiation window can be on either side of parallel plate 164.

Shaving off a reflecting film can be performed by an etching process, but a mechanical shaving process can also be used and is less expensive. However, if a reflecting film is mechanically shaved, parallel plate 164 should be carefully processed to minimize damage to parallel plate 164. For example, if the portion of parallel plate 164 forming the radiation window is severely damaged, parallel plate 164 will generate excess loss caused by scattering of received input light.

Instead of first forming a reflecting film and then shaving it off, a radiation window can be produced by preliminarily masking a portion of parallel plate 164 corresponding to a radiation window, and then protecting this portion from being covered with reflecting film.

Figure 12C:
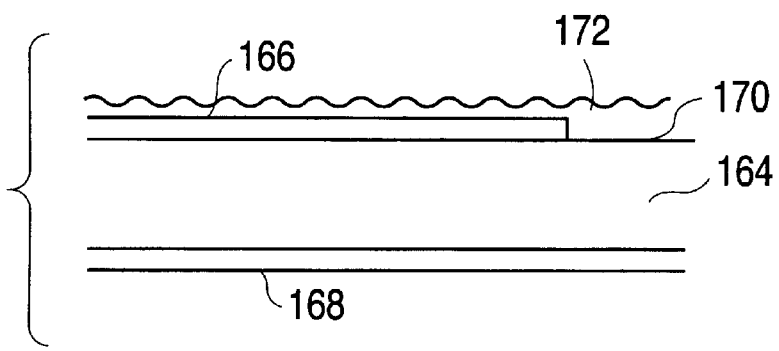

Referring now to FIG. 12(C), a transparent adhesive 172 is applied onto reflecting film 166 and the portion of parallel plate 164 from which reflecting film 166 has been removed. Transparent adhesive 172 should generate the smallest possible optical loss since it is also applied to the portion of parallel plate 164 forming a radiation window.

Figure 12D:
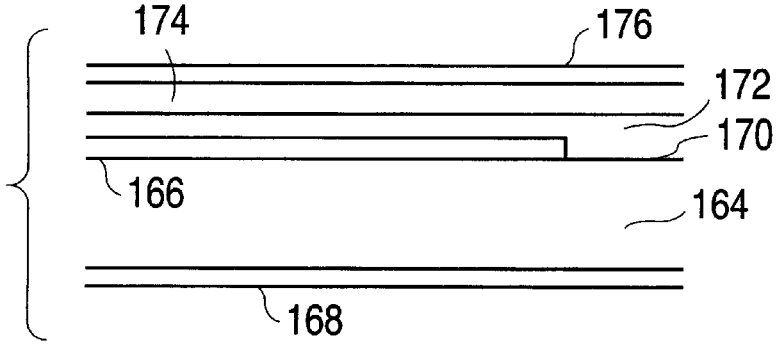

Referring now to FIG. 12(D), a transparent protector plate 174 is applied onto transparent adhesive 172 to protect reflecting film 166 and parallel plate 164. Since transparent adhesive 172 is applied to fill the concave portion generated by removing reflecting film 166, transparent protector plate 174 can be provided in parallel with the top surface of parallel plate 164.

Similarly, to protect reflecting film 168, an adhesive (not illustrated) can be applied to the top surface of reflecting film 168 and should be provided with a protector plate (not illustrated). If reflecting film 168 has a reflectance of about 100%, and there is no radiation window on the same surface of parallel plate 164, then an adhesive and protector plate do not necessarily have to be transparent.

Furthermore, an anti-reflection film 176 can be applied on transparent protector plate 174. For example, transparent protector plate 174 and radiation window 170 can be covered with anti-reflection film 176.

A focal line can be on the surface of a radiation window or on the opposite surface of a parallel plate from which input light enters. Moreover, the focal line can be in the parallel plate, or before the radiation window.

In accordance with the above, two reflecting films reflect light therebetween, with the reflectance of one reflecting film being approximately 100%. However, a similar effect can be obtained with two reflecting films each having a reflectance of less than 100%. For example, both reflecting films can have a reflectance of 95%. In this case, each reflecting film has light traveling therethrough and causing interference. As a result, a luminous flux traveling in the direction depending on the wavelength is formed on both sides of the parallel plate on which the reflecting films are formed. Thus, the various reflectances of the various embodiments of the present invention can easily be changed in accordance with required characteristics of a VIPA.

In accordance with the above, a waveguide device is formed by a parallel plate, or by two reflecting surfaces in parallel with each other. However, the plate or reflecting surfaces do not necessarily have to be parallel.

In accordance with the above, a VIPA uses multiple-reflection and maintains a constant phase difference between interfering lights. As a result, the characteristics of the VIPA are stable, thereby reducing optical characteristic changes causes by polarization. By contrast, the optical characteristics of a conventional diffraction grating experience undesirable changes in dependance on the polarization of the input light.

In accordance with the above, a VIPA provides luminous fluxes which are "spatially distinguishable" from each other. "Spatially distinguishable" refers to the luminous fluxes being distinguishable in space. For example, various luminous fluxes are spatially distinguishable if they are collimated and travel in different directions, or are focused in different locations. However, the invention is not intended to be limited to these precise examples, and there are many other ways in which luminous fluxes can be spatially distinguished from each other.

Figure 13:
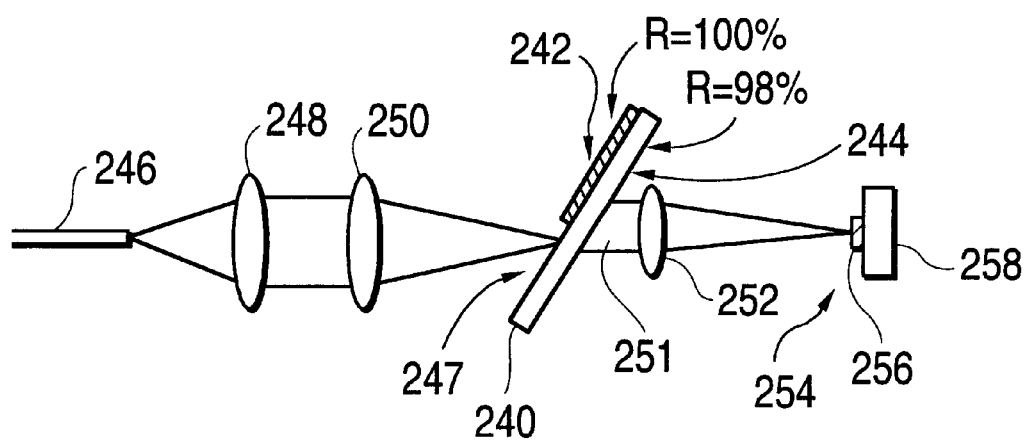
FIG. 13 is a diagram illustrating an apparatus which uses a VIPA as an angular dispersion component to produce chromatic dispersion.

FIG. 13 is a diagram illustrating an apparatus which uses a VIPA as an angular dispersive component, instead of using diffraction gratings, to produce chromatic dispersion. Referring now to FIG. 13, a VIPA 240 has a first surface 242 with a reflectivity of, for example, approximately 100%, and a second surface 244 with a reflectivity of, for example, approximately 98%. VIPA 240 also includes a radiation window 247. However, VIPA 240 is not limited to this specific configuration. Instead, VIPA 240 can have many different configurations as described herein.

As illustrated in FIG. 13, a light is output from a fiber 246, collimated by a collimating lens 248 and line-focused into VIPA 240 through radiation window 247 by a cylindrical lens 250. VIPA 240 then produces a collimated light 251 which is focused by a focusing lens 252 onto a mirror 254. Mirror 254 can be a mirror portion 256 formed on a substrate 258.

Mirror 254 reflects the light back through focusing lens 252 into VIPA 240. The light then undergoes multiple reflections in VIPA 240 and is output from radiation window 247. The light output from radiation window 247 travels through cylindrical lens 250 and collimating lens 248 and is received by fiber 246.

Therefore, light is output from VIPA 240 and reflected by mirror 254 back into VIPA 240. The light reflected by mirror 254 travels through the path which is exactly opposite in direction to the path through which it originally traveled. As will be seen in more detail below, different wavelength components in the light are focused onto different positions on mirror 254, and are reflected back to VIPA 240. As a result, different wavelength components travel different distances, to thereby produce chromatic dispersion.

Figure 14:
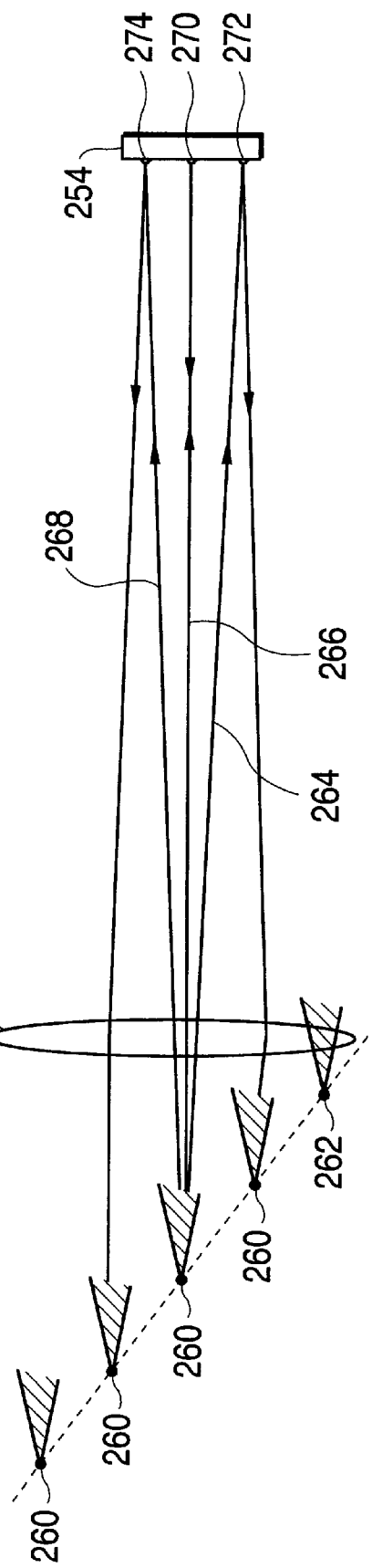
FIG. 14 is a more detailed diagram illustrating the operation of the apparatus in FIG. 13.

FIG. 14 is a more detailed diagram illustrating the operation of the VIPA in FIG. 13. Assume a light having various wavelength components is received by VIPA 240. As illustrated in FIG. 14, VIPA 240 will cause the formation of virtual images 260 of beam waist 262, where each virtual image 260 emits light.

As illustrated in FIG. 14, focusing lens 252 focuses the different wavelength components in a collimated light from VIPA 240 at different points on mirror 254. More specifically, a longer wavelength 264 focuses at point 272, a center wavelength 266 focuses at point 270, and a shorter wavelength 268 focuses at point 274. Then, longer wavelength 264 returns to a virtual image 260 which is closer to beam waist 262, as compared to center wavelength 266. Shorter wavelength 268 returns to a virtual image 260 which is farther from beam waist 262, as compared to center wavelength 266. Thus, the arrangement provides for normal dispersion.

Mirror 254 is designed to reflect only light in a specific interference order, and light in any other interference order should be focused out of mirror 254. More specifically, as previously described, a VIPA will output a collimated light. This collimated light will travel in a direction in which the path from each virtual image has a difference of $m\lambda$, where m is an integer. The mth order of interference is defined as an output light corresponding to m.

Figure 15:
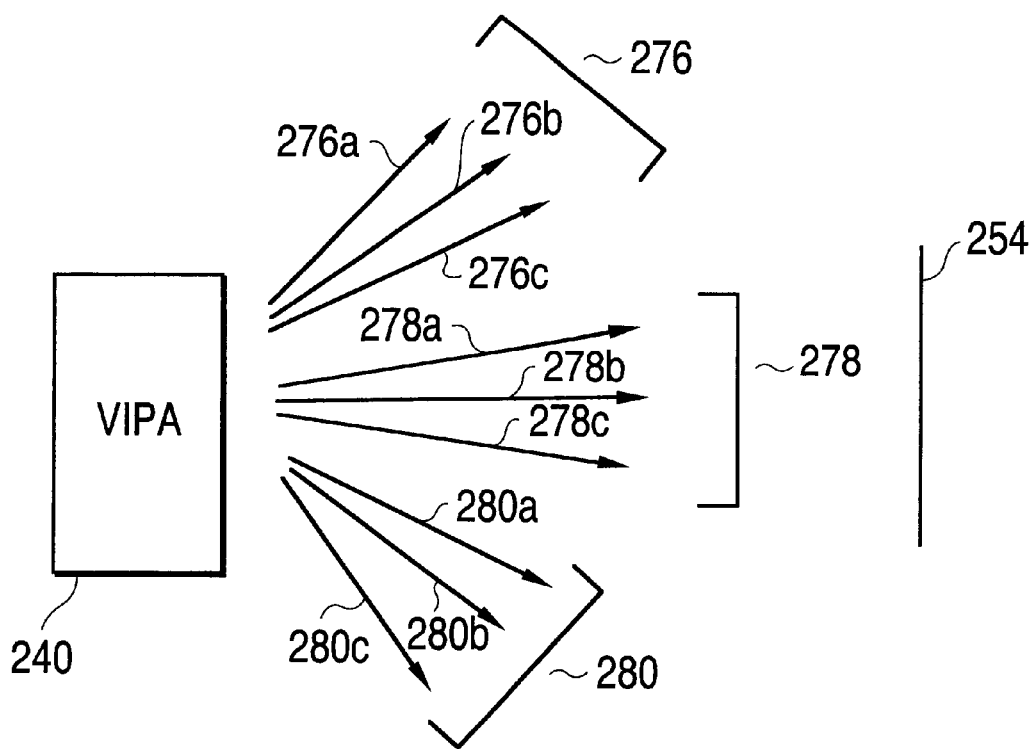
FIG. 15 is a diagram illustrating various orders of interference of a VIPA.

For example, FIG. 15 is a diagram illustrating various orders of interference of a VIPA. Referring now to FIG. 15, a VIPA, such as VIPA 240, emits collimated lights 276, 278 and 280. Each collimated light 276, 278 and 280 corresponds to a different interference order. Therefore, for example, collimated light 276 is collimated light corresponding to an (n+2)th interference order, collimated light 278 is collimated light corresponding to an (n+1)th interference order, and collimated light 280 is collimated light corresponding to an nth interference order, wherein n is an integer. Collimated light 276 is illustrated as having several wavelength components 276a, 276b and 276c. Similarly, collimated light 278 is illustrated as having wavelength components 278a, 278b and 278c, and collimated light 280 is illustrated as having wavelength components 280a, 280b and 280c. Here, wavelength components 276a, 278a and 280a have the same wavelength. Wavelength components 276b, 278b and 280b have the same wavelength (but different from the wavelength of wavelength components 276a, 278a and 280a). Wavelength components 276c, 278c and 280c have the same wavelength (but different from the wavelength of wavelength components 276a, 278a and 280a, and the wavelength of wavelength components 276b, 278b and 280b). Although FIG. 15 only illustrates collimated light for three different interference orders, collimated lights will be emitted for many other interference orders.

Since collimated lights at the same wavelength for different interference orders travel in different directions and are therefore focused at different positions, mirror 254 can be made to reflect only light from a single interference order back into VIPA 240. For example, as illustrated in FIG. 15, the length of a reflecting portion of mirror 254 should be made relatively small, so that only light corresponding to a single interference order is reflected. More specifically, in FIG. 15, only collimated light 278 is reflected by mirror 254. In this manner, collimated lights 276 and 278 are focused out of mirror 254.

A wavelength division multiplexed light usually includes many channels. Referring again to FIG. 13, if the thickness t between first and second surfaces 242 and 244 of VIPA 240 is set at a specific value, the arrangement will be able to simultaneously compensate for dispersion in each channel.

More specifically, each channel has a center wavelength. These center wavelengths are usually spaced apart by a constant frequency spacing. The thickness t of VIPA 240 between first and second surfaces 242 and 244 should be set so that all of the wavelength components corresponding to the center wavelengths have the same output angle from VIPA 240 and thus the same focusing position on mirror 254. This is possible when the thickness t is set so that, for each channel, the round-trip optical length through VIPA 240 traveled by the wavelength component corresponding to the center wavelength is a multiple of the center wavelength of each channel. This amount of thickness t will hereafter be referred to as the "WDM matching free spectral range thickness", or "WDM matching FSR thickness".

Moreover, in this case, the round-trip optical length (2nt cos θ) through VIPA 240 is equal to the wavelength corresponding to the center wavelength in each channel multiplied by an integer for the same θ and different integer, where n is the refractive index of the material between first and second surfaces 242 and 244, θ indicates a propagation direction of a luminous flux corresponding to the center wavelength of each channel. More specifically, as previously described, θ indicates the small tilt angle of the optical axis of input light (see FIG. 8).

Therefore, all of the wavelength components corresponding to the center wavelengths will have the same output angle from VIPA 240 and thus the same focusing position on mirror 254, if t is set so that, for the wavelength component corresponding to the center wavelength in each channel, 2nt cos θ is an integer multiple of the center wavelength of each channel for the same θ and different integer.

For example, a 2 mm physical length in round trip (which is approximately double a 1 mm thickness of VIPA 240) and a refractive index of 1.5 enable all the wavelengths with a spacing of 100 GHz to satisfy this condition. As a result, VIPA 240 can compensate for dispersion in all the channels of a wavelength division multiplexed light at the same time.

Therefore, referring to FIG. 14, with the thickness t set to the WDM matching FSR thickness, VIPA 240 and focusing lens 252 will cause (a) the wavelength component corresponding to the center wavelength of each channel to be focused at point 270 on mirror 254, (b) the wavelength component corresponding to the longer wavelength component of each channel to be focused at point 272 on mirror 254, and (c) the wavelength component corresponding to the shorter wavelength component of each channel to be focused at point 274 on mirror 254. Therefore, VIPA 240 can be used to compensate for chromatic dispersion in all channels of a wavelength division multiplexed light.

Figure 16:
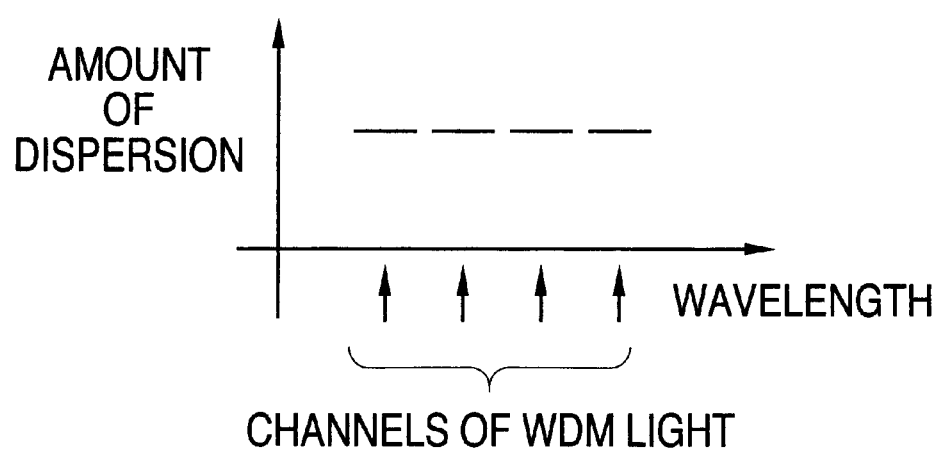
FIG. 16 is a graph illustrating the chromatic dispersion for several channels of a wavelength division multiplexed light.

FIG. 16 is a graph illustrating the amount of dispersion of several channels of a wavelength division multiplexed light, in a case when the thickness t is set to the WDM matching FSR thickness. As illustrated in FIG. 16, all the channels are provided with the same dispersion. However, the dispersions are not continuous between the channels. Moreover, the wavelength range for each channel at which VIPA 240 will compensate for dispersion can be set by appropriately setting the size of mirror 254.

If the thickness t is not set to the WDM matching FSR thickness, different channels of a wavelength division multiplexed light will be focused at different points on mirror 254. For example, if the thickness t is one-half, one-third or some other fraction of the round trip optical length thickness, then focusing points of two, three, four or more channels may be focused on the same mirror, with each channel being focused at a different focusing point. More specifically, when the thickness t is one-half the WDM matching FSR thickness, the light from odd channels will focus at the same points on mirror 254, and the light from even channels will focus at the same points on mirror 254. However, the lights from the even channels will be focused at different points from the odd channels.

Figure 17:
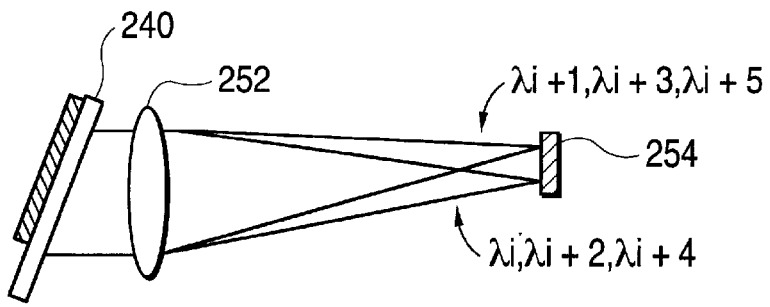
FIG. 17 is a diagram illustrating different channels of a wavelength division multiplexed light being focused at different points on a mirror by a VIPA.

For example, FIG. 17 is a diagram illustrating different channels being focused at different points on mirror 254. As illustrated in FIG. 17, wavelength components of the center wavelength of even channels are focused at one point on mirror 254, and wavelength components of the center wavelength of odd channels are focused at a different point. As a result, VIPA 240 can adequately compensate for dispersion in all the channels of a wavelength division multiplexed light at the same time.

Figure 18:
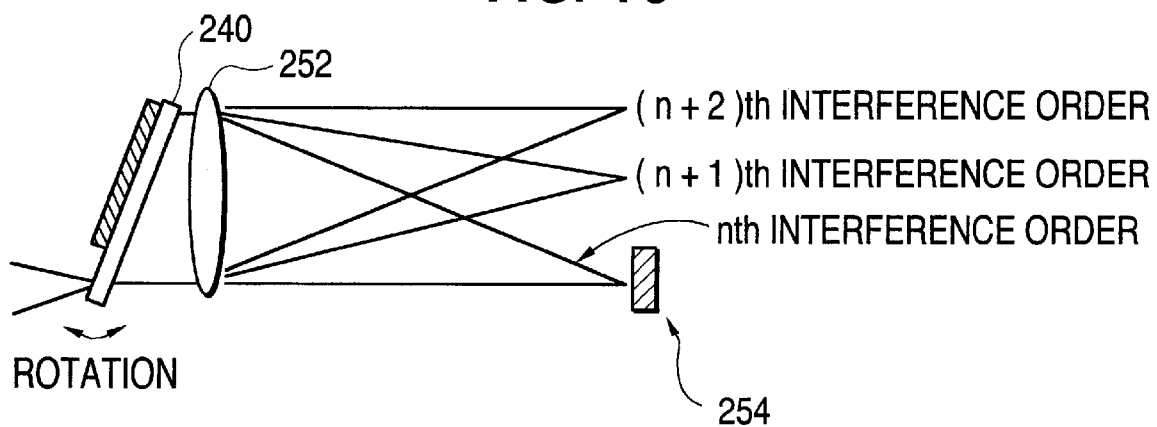
FIG. 18 is a diagram illustrating a side view of an apparatus which uses a VIPA to provide variable chromatic dispersion to light.

There are several different ways to vary the value of the dispersion added by a VIPA. For to, example, FIG. 18 is a diagram illustrating a side view of an apparatus which uses a VIPA to provide variable dispersion to light. Referring now to FIG. 18, VIPA 240 causes each different interference order to have a different angular dispersion. Therefore, the amount of dispersion added to an optical signal can be varied by rotating or moving VIPA 240 so that light corresponding to a different interference order is focused on mirror 254 and reflected back into VIPA 240.

Figure 19:
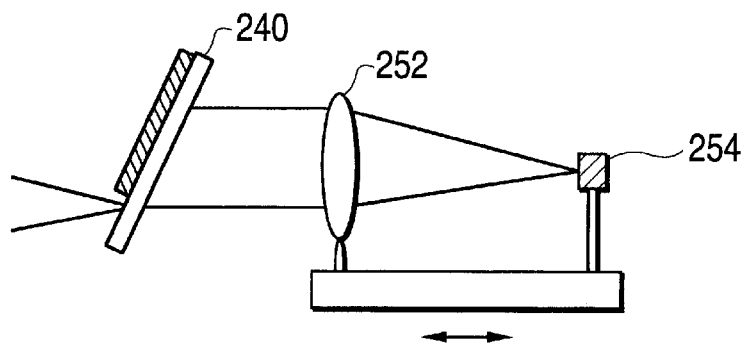
FIG. 19 is a diagram illustrating a side view of an apparatus which uses a VIPA to provide variable chromatic dispersion to light.

FIG. 19 is a diagram illustrating a side view of an apparatus which uses a VIPA to provide variable dispersion. Referring now to FIG. 19, the relative distance between focusing lens 252 and mirror 254 is maintained constant, and focusing lens 252 and mirror 254 are moved together relative to VIPA 240. This movement of focusing lens 252 and mirror 254 changes the shift of light returning to VIPA 240 from mirror 254, and thereby varies the dispersion.

Figure 20A:
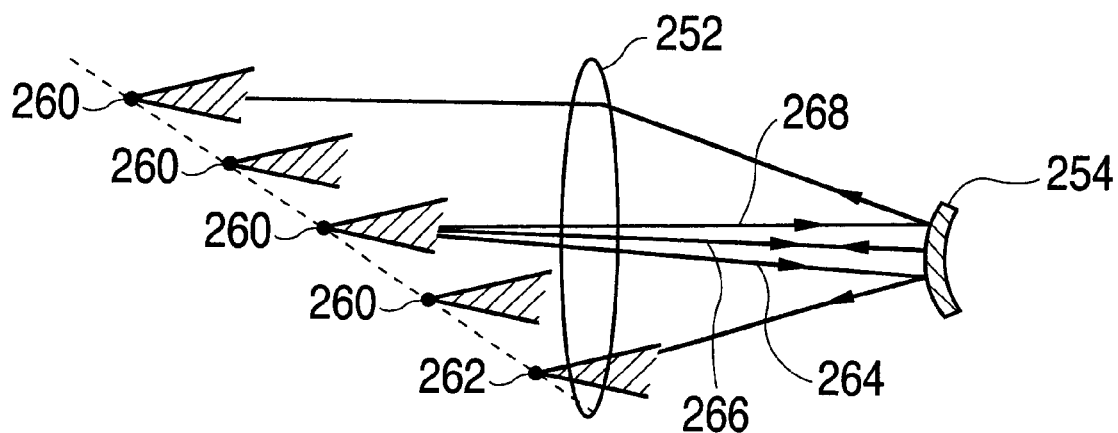
FIGS. 20(A) and (B) are diagrams illustrating side views of an apparatus which uses a VIPA to provide chromatic dispersion to light.
Figure 20B:
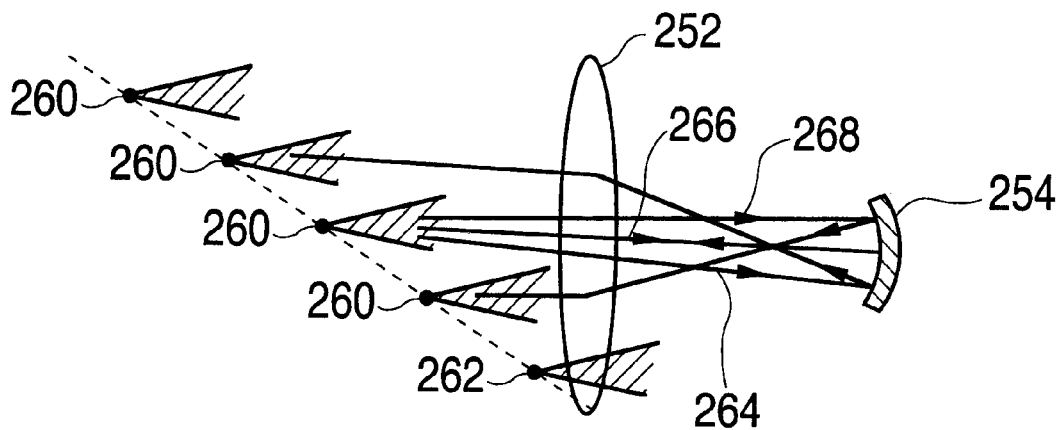

FIGS. 20(A) and 20(B) are diagrams illustrating side views of apparatuses which use a VIPA to provide various values of chromatic dispersion to light. FIGS. 20(A) and 20(B) are similar to FIG. 14, in that FIGS. 20(A) and 20(B) illustrate the travel directions of a longer wavelength 264, a center wavelength 266 and a shorter wavelength 268 of light emitted by a virtual image 260 of beam waist 262.

Referring now to FIG. 20(A), mirror 254 is a convex mirror. With a convex mirror, the beam shift is magnified. Therefore, a large chromatic dispersion can be obtained with a short lens focal length and a small amount of space. When mirror 254 is convex, as in FIG. 20(A), the convex shape can typically only be seen from a side view and cannot be seen when viewed from the top.

Referring now to FIG. 20(B), mirror 254 is a concave mirror. With a concave mirror, the sign of the dispersion is inverted. Therefore, anomalous dispersion can be obtained with a short lens focal length and a small space. When mirror 254 is concave, as in FIG. 20(B), the concave shape can typically only be seen from a side view and cannot be seen when viewed from the top.

Therefore, typically, mirror 254 would appear flat in the top view. However, it is possible for mirror 254 to also be a concave or a convex mirror when viewed by the top, thereby indicating that the mirror is a "one-dimensional" mirror.

In FIGS. 20(A) and 20(B), mirror 254 is located at or near the focal point of focusing lens 252.

Therefore, as described above, mirror 254 can be convex or concave in the side view, as illustrated, for example, in FIGS. 20(A) and 20(B), respectively. A convex mirror can enhance the chromatic dispersion and a concave mirror can reduce or even invert the chromatic dispersion from negative (normal) to positive (anomalous). More specifically, a convex mirror generates larger dispersion in the negative direction and a concave mirror generates smaller dispersion in the negative direction or dispersion inverted to positive. This is possible because the magnitude of chromatic dispersion is a function of the curvature of the mirror in the side view.

Figure 21:
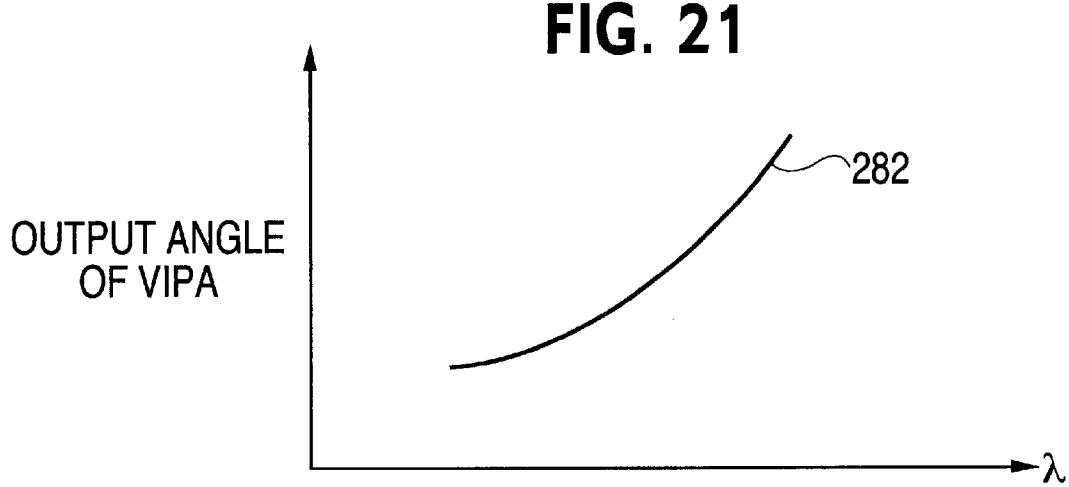
FIG. 21 is a graph illustrating the output angle of a luminous flux from a VIPA versus wavelength of the luminous flux.

FIG. 21 is a graph illustrating the output angle of a luminous flux from VIPA 240 versus wavelength of the luminous flux. As can be seen from FIG. 21, a curve 282 of the wavelength versus the output angle is not linear.

Since the relationship between the wavelength and the output angle of a luminous flux produced by a VIPA is not linear, the chromatic dispersion is not constant in a wavelength band as long as a flat mirror, a normal convex mirror or a normal concave mirror is used as mirror 254. This nonlinearity in chromatic dispersion is referred to as the higher order dispersion.

Generally, referring to the apparatuses in FIGS. 20(A) and 20(B), the nonlinearity in chromatic dispersion can be understood by referring to the following Equation (3):

(angular dispersion)·(1−$f\cdot(1/R)$) chromatic dispersion, where f is the focal length of lens 252 and R is the radius of curvature of mirror 254.

Figure 22:
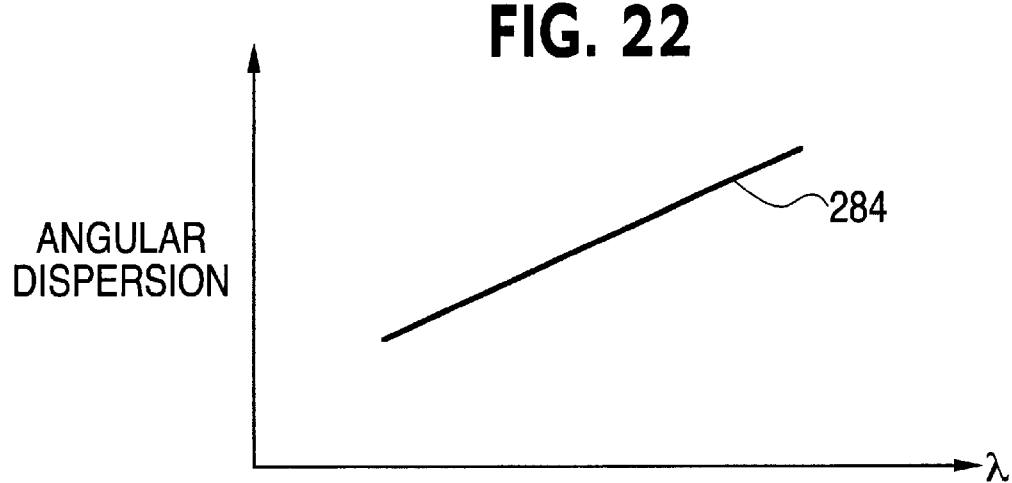
FIG. 22 is a graph illustrating the angular dispersion of a VIPA versus the wavelength of a luminous flux.

FIG. 22 is a graph illustrating the angular dispersion of VIPA 240 versus the wavelength of a luminous flux. Generally, the curve 284 in FIG. 22 represents the slope of curve 282 in FIG. 21. As can be seen from FIG. 22, the angular dispersion is not constant. Instead, the angular dispersion changes as the wavelength changes.

Figure 23:
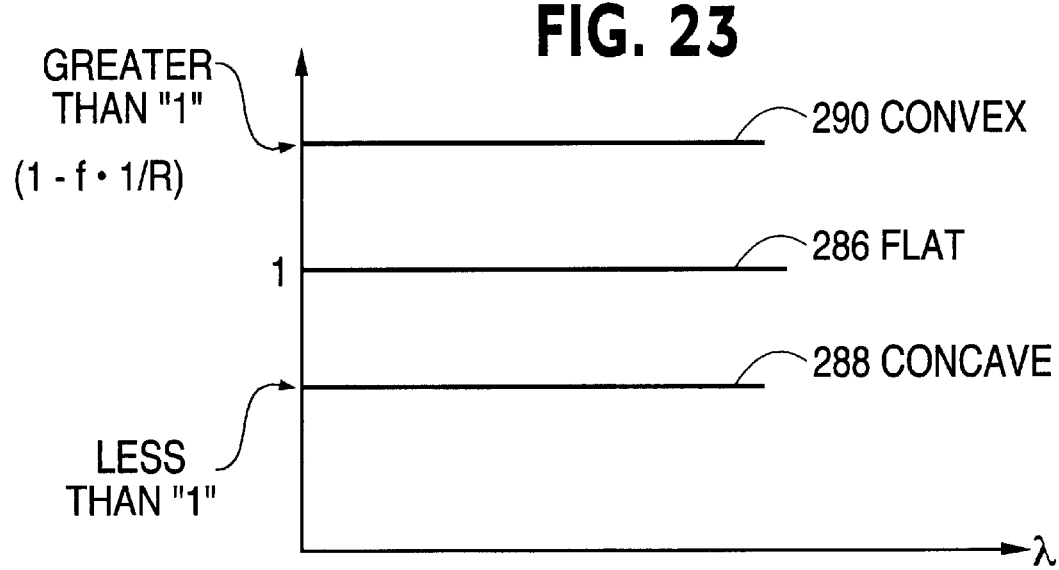
FIG. 23 is a graph illustrating the effect of different mirror types in an apparatus using a VIPA.

FIG. 23 is a graph illustrating the term (1−$f\cdot(1/R)$) in Equation 3, above, versus wavelength. More specifically, line 286 represents a graph of the term (1−$f\cdot(1/R)$) versus wavelength for a flat mirror (radius of curvature equals "∞" (infinity)). Line 288 represents a graph of the term (1−$f\cdot(1/R)$) versus wavelength for a concave mirror (radius of curvature equals "+"). Line 290 represents a graph of the term (1−$f\cdot(1/R)$) versus wavelength for convex mirror (radius of curvature equals "−"). As illustrated in FIG. 23, each of the mirrors has a constant radius of curvature.

Figure 24:
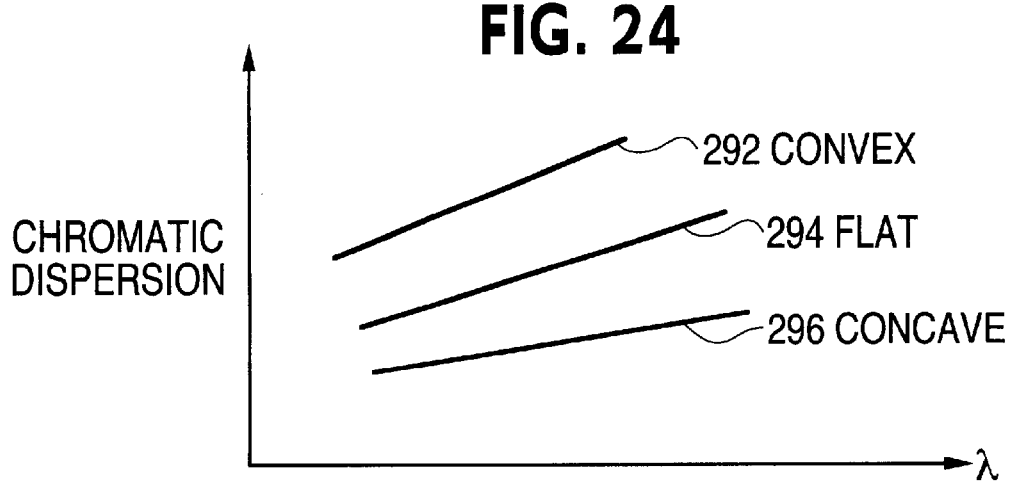
FIG. 24 is a diagram illustrating chromatic dispersion versus wavelength in an apparatus using a VIPA, for different types of mirrors used in the apparatus.

FIG. 24 is a diagram illustrating the chromatic dispersion versus wavelength of an apparatus such as in FIGS. 20(A) and 20(B), when mirror 254 is a convex mirror, a flat mirror and a concave mirror. More specifically, curve 292 is a curve of the chromatic dispersion versus wavelength when mirror 254 is a convex mirror. Curve 294 is a curve of the chromatic dispersion versus wavelength when mirror 254 is a flat mirror. Curve 296 is a curve of the chromatic dispersion versus wavelength when mirror 254 is a concave mirror.

In a very general manner, curves 292, 294 and 296 each represent a product of the angular dispersion illustrated in FIG. 22 with the appropriate line illustrated in FIG. 23, as indicated by Equation 3, above. More specifically, generally, curve 292 represents a product of curve 284 in FIG. 22 and line 290 in FIG. 23. Generally, curve 294 represents a product of curve 284 in FIG. 22 and line 286 in FIG. 23. Generally, curve 296 represents a product of curve 284 in FIG. 22 and line 288 in FIG. 23.

As can be seen from FIG. 24, the chromatic dispersion is not constant whether a convex, flat or concave mirror is used as mirror 254.

According to the above, this wavelength dependence of chromatic dispersion can be reduced or eliminated by chirping the curvature of mirror 254.

Figure 25:
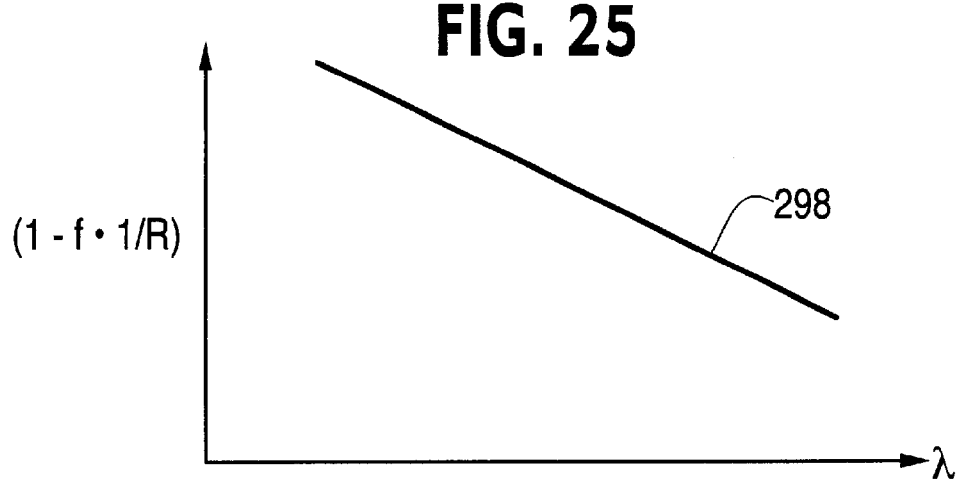
FIG. 25 is a graph illustrating the effect of a mirror in an apparatus which uses a VIPA.
Figure 26:
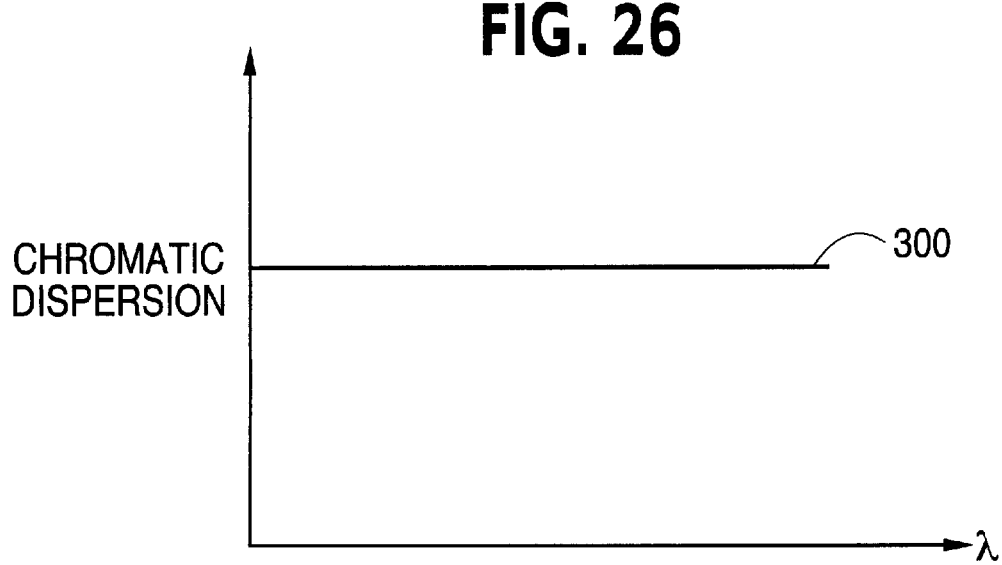
FIG. 26 is a graph illustrating constant chromatic dispersion of an apparatus using a VIPA.

More specifically, FIG. 25 is a graph illustrating a curve 298 of the term (1−$f\cdot(1/R)$) in Equation 3, above, versus wavelength. Generally, curve 298 in FIG. 25 is inverse to curve 284 in FIG. 22. Therefore, a mirror having the characteristics in FIG. 25 will provide a constant chromatic dispersion, as illustrated by the curve 300 in FIG. 26.

For example, with the apparatus illustrated, for example, in FIG. 14, a longer wavelength has a larger dispersion in the negative direction than a shorter wavelength. Therefore, mirror 254 can be designed to have a concave portion where the longer wavelength reflects, and a convex portion were the shorter wavelength reflects, to effectively cancel the wavelength dependence of dispersion. Ideally, the curvature of mirror 254 varies from convex to concave continuously along the focusing point of light when the wavelength changes from short to long. If this modification is based on a conventional convex mirror, not a flat mirror, the curvature of the mirror can be made to vary from strong convex to weak convex continuously along the focusing point of light when the wavelength changes from short to long.

Therefore, there are many different designs for mirror 254, to provide a constant chromatic dispersion. For example, FIG. 27 is a graph illustrating characteristics many different mirror designs. Curve 302 in FIG. 27 illustrates a mirror which continuously changes from convex to concave as the wavelength of output light increases. Curve 304 illustrates a mirror which changes from strongly convex to slightly convex as the wavelength of output light increases. Curve 306 illustrates a mirror which changes from slightly concave to strongly concave as the wavelength of output light increases. Other mirror designs include, for example, those shown by curves 308 and 310.

There are a virtually unlimited number of mirror designs which could be used, and such designs could be graphed in a FIG. 27. Moreover, mirror designs are not limited to those having characteristic curves with the same slopes as those in FIG. 27.

FIGS. 28(A), 28(B), 28(C) and 28(D) illustrate the surface shape of various mirrors which can be used as mirror 254. For example, FIG. 28(A) illustrates a mirror which continuously changes from convex to concave, as represented by curve 302 in FIG. 27. FIG. 28(B) illustrates a mirror which continuously changes from strong convex to weak convex, as represented by curve 310 in FIG. 27. FIG. 28(C) illustrates a mirror which continuously changes from weak concave to strong concave, as represented by curve 306 in FIG. 27.

Moreover, there are a virtually unlimited number of mirror designs which could be used. For example, FIG. 28(D) illustrates a flat mirror which changes to convex. FIG. 27(E) illustrates a flat mirror which changes to concave. FIG. 28(F) illustrates a mirror having a convex portion and a concave portion, but where the mirror does not continuously change from convex to concave.

Therefore, as indicated above, an apparatus includes a VIPA, a mirror and a lens. The VIPA receives an input light and produces a corresponding output light (such as a luminous flux) propagating away from the VIPA. The lens focuses the output light onto the mirror so that the mirror reflects the output light and the reflected light is directed by the lens back to the VIPA. The mirror has a shape which causes the apparatus to produce a constant chromatic dispersion.

For example, output light focused by the lens is incident on a different surface point on the mirror as the wavelength of the output light changes. The mirror is shaped so that the surface points change continuously from convex to concave as the wavelength of the output light changes from shorter to longer. As another example, the mirror can be shaped so that the surface points change continuously from stronger convex to weaker convex as the wavelength of the output light changes from shorter to longer.

Alternatively, the mirror can be shaped so that the surface points change continuously from weaker concave to stronger concave as the wavelength of the output light changes from shorter to longer. There are many other examples. For example, the mirror can have a concave portion and a convex portion so that output light at a shorter wavelength than a specific wavelength reflects off the convex portion and so that output light at a longer wavelength than the specific wavelength reflect off the concave portion.

Moreover, for example, the mirror can have a flat portion which continuously changes to a concave portion in correspondence with an increase in the wavelength of the output light above a specific wavelength so that output light at a shorter wavelength than the specific wavelength is incident on the flat portion and output light at a longer wavelength than the specific wavelength is incident on the concave portion. Or, the mirror can have a convex portion which continuously changes to a flat portion in corresponding with an increase in the wavelength of the output light above a specific wavelength so that output light at a shorter wavelength than the specific wavelength is incident on the convex portion and output light at a longer wavelength than the specific wavelength is incident on the flat portion.

Figure 6A:
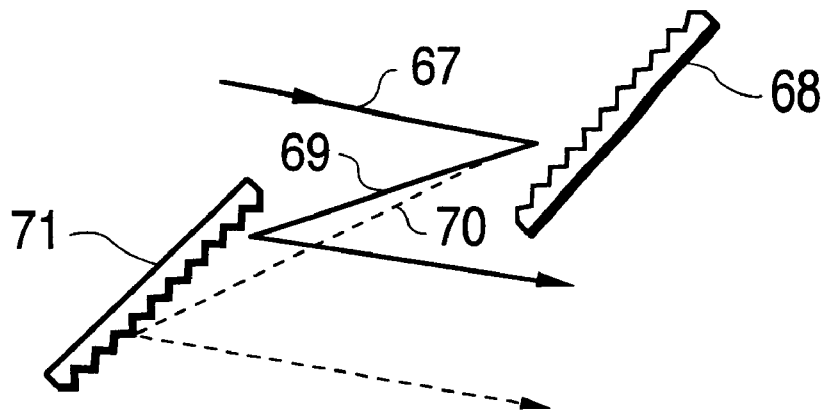
FIG. 6(A) (prior art) is a diagram illustrating a spatial grating pair arrangement for production of anomalous dispersion.
Figure 6B:
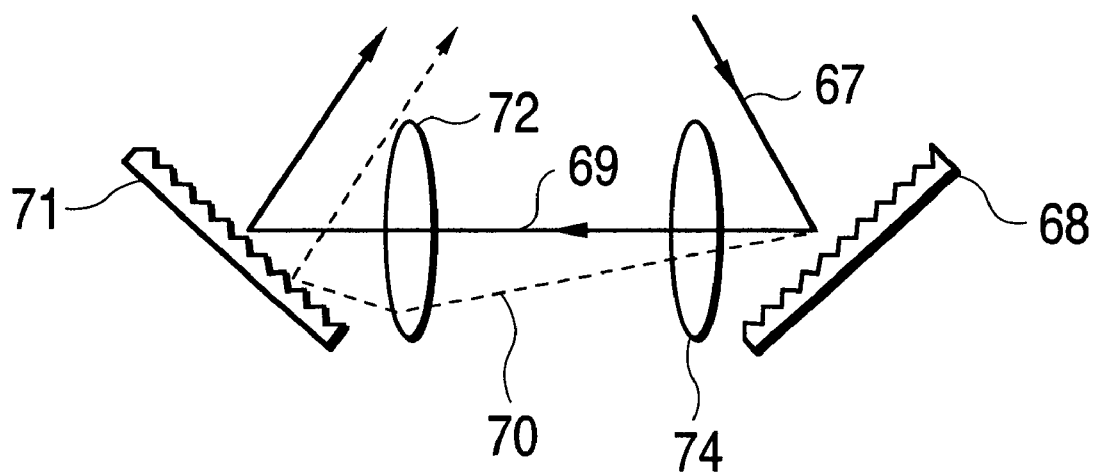
FIG. 6(B) (prior art) is a diagram illustrating a spatial grating pair arrangement for production of normal dispersion.

A VIPA, as described above, provides a much larger angular dispersion than a diffraction grating. Therefore, a VIPA can be used to compensate for much larger chromatic dispersion than a spatial grating pair arrangement as illustrated in FIGS. 6(A) and 6(B).

Figure 29:
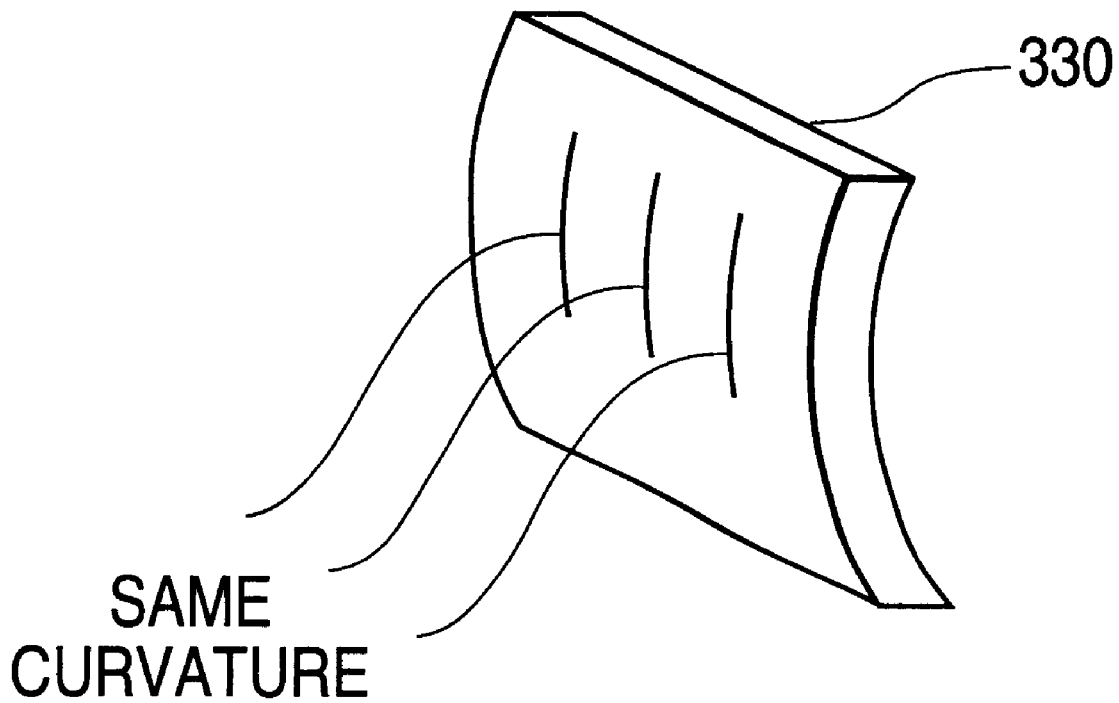
FIG. 29 is a diagram illustrating a cylindrical mirror.
Figure 30A:
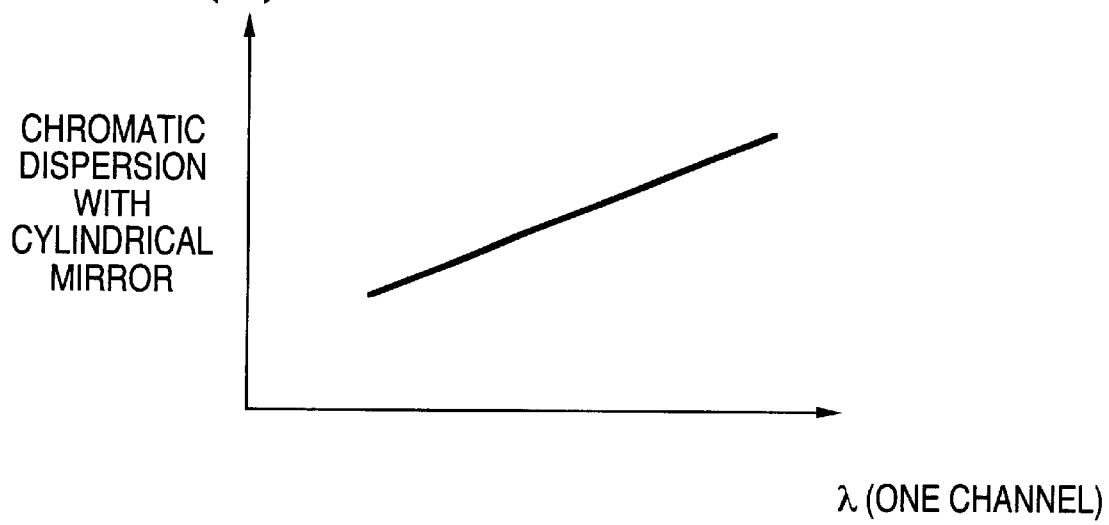
FIG. 30(A) is a graph illustrating chromatic dispersion versus wavelength for one channel of a wavelength division multiplexed light, after undergoing chromatic dispersion compensation with a VIPA with a cylindrical mirror.
Figure 30B:
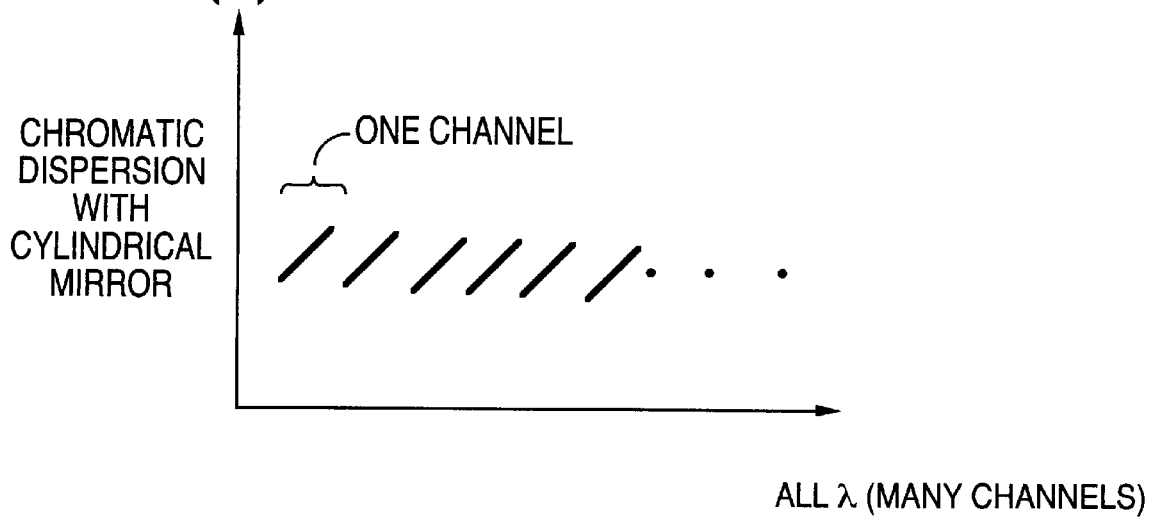
FIG. 30(B) is a graph illustrating chromatic dispersion versus wavelength for all wavelengths of a wavelength division multiplexed light, after undergoing chromatic dispersion compensation with a VIPA with a cylindrical mirror.

A mirror, as described above, to reflect light back to a VIPA to compensate for chromatic dispersion, can be described as a cylindrical mirror since the mirror shape is that of the surface of a cylinder. In other words, as shown in FIG. 29, the mirror has the same radius of curvature along an axis forming the cylinder. Since chromatic dispersion is a function of the radius of the mirror curvature as described above, the chromatic dispersion will not change when the mirror is moved along the axis forming the cylinder. As shown in FIG. 30(A), the chromatic dispersion may change within each channel as previously described (see FIG. 24). However, the chromatic dispersion will be periodic, as shown in FIG. 30(B), and the chromatic dispersion will be approximately the same for all the channels.

Figure 31A:
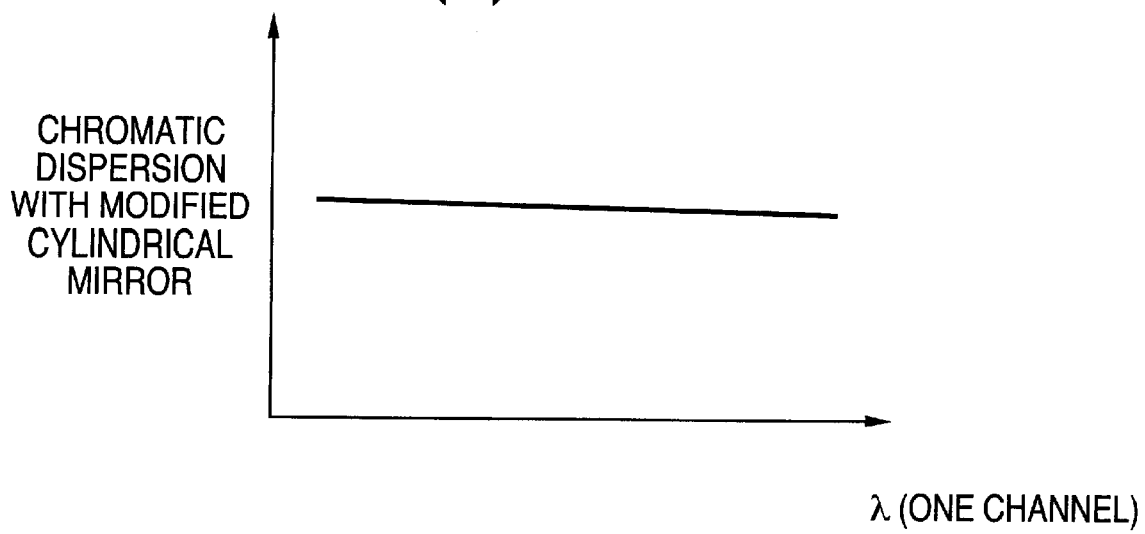
FIG. 31(A) is a graph illustrating chromatic dispersion versus wavelength for one channel of a wavelength division multiplexed light, after undergoing chromatic dispersion compensation with a VIPA with a modified cylindrical mirror.

FIG. 31(A) is a graph illustrating chromatic dispersion versus wavelength for one channel of a wavelength division multiplexed light, after undergoing chromatic dispersion compensation with a VIPA with a modified cylindrical mirror as in, for example, FIGS. 28(A) through 28(F). Referring now to FIG. 31(A), it can be seen that the amount of chromatic dispersion is substantially the same for each wavelength within the same channel.

Figure 31B:
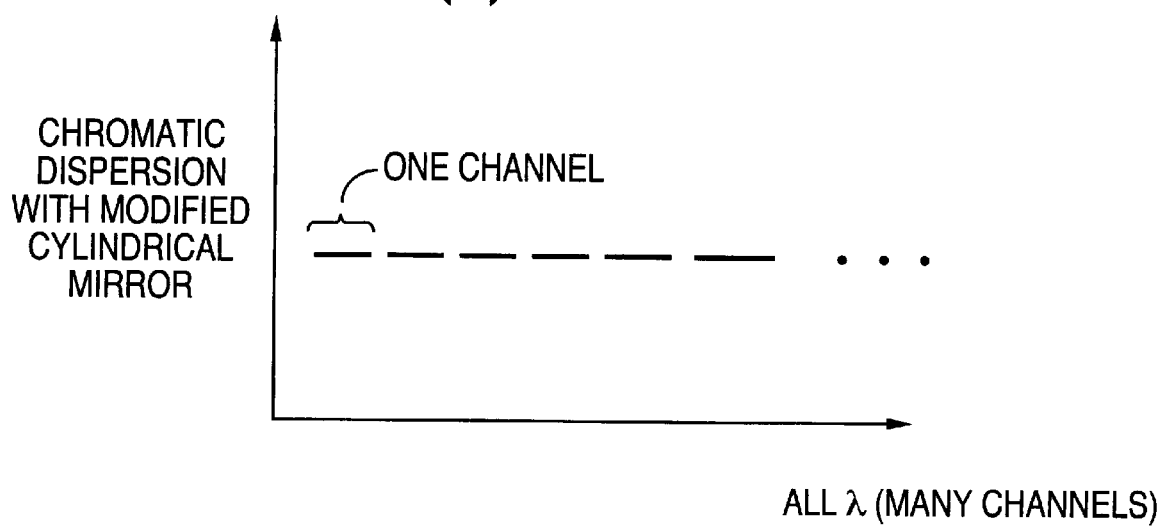
FIG. 31(B) is a graph illustrating chromatic dispersion versus wavelength for all wavelengths of a wavelength division multiplexed light, after undergoing chromatic dispersion compensation with a VIPA with a modified cylindrical mirror.

FIG. 31(B) is a graph illustrating chromatic dispersion versus wavelength for all wavelengths (and therefore, many channels) of a wavelength division multiplexed light, after undergoing chromatic dispersion compensation with a VIPA with a modified cylindrical mirror as in, for example, FIGS. 28(A) through 28(F). Referring now to FIG. 31(B), it can be seen that the amount of chromatic dispersion is substantially the same, or uniform, for all wavelengths in all channels.

Figure 32:
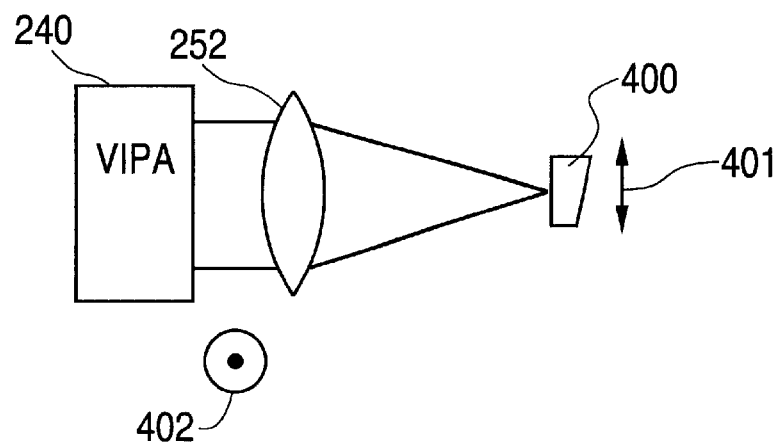
FIG. 32 is a diagram illustrating a top view of an apparatus using a VIPA to provide variable chromatic dispersion to light, according to a further embodiment of the present invention.

FIG. 32 is a diagram illustrating a top view of an apparatus using a VIPA to provide variable chromatic dispersion to light, according to a further embodiment of the present invention. Referring now to FIG. 32, a cone shaped mirror 400 is used to reflect light back to VIPA 240. Mirror 400 is movable in a direction 401.

As previously indicated, VIPA 240 produces a collimated luminous flux, which can be referred to as a collimated output light, traveling in a direction determined by the wavelength of the light. The angular dispersion direction of VIPA 240 is the direction in which the traveling direction of the collimated output light changes as the wavelength of the light changes, and is represented, for example, by direction 402 in FIG. 32. Collimated output lights for different wavelengths will be in the same plane.

Therefore, direction 401 is along the surface of the cone and can be described as being perpendicular to both the angular dispersion direction of VIPA 240 and the traveling directions of collimated light from VIPA 240. Alternatively, direction 401 can be described as being perpendicular to a plane which includes the traveling direction of the collimated output lights for different wavelengths from VIPA 240.

Figure 33A:
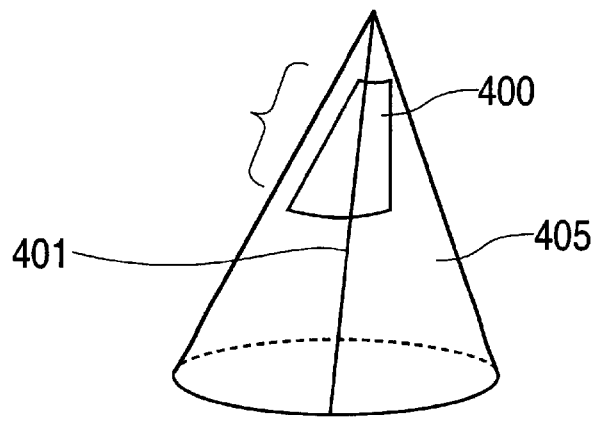
FIGS. 33(A) and 33(B) are diagrams illustrating how a mirror can be formed from a section of a cone, according to embodiment of the present invention.
Figure 33B:
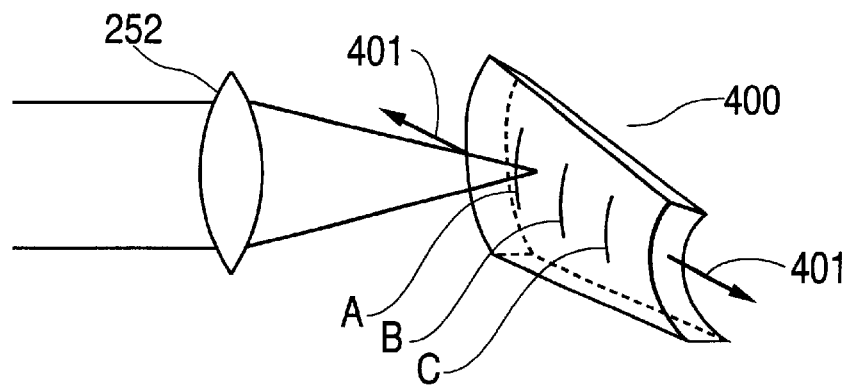

FIGS. 33(A) and 33(B) are diagrams illustrating how mirror 400 can be formed, for example, from a section of a cone 405, according to an embodiment of the present invention. As can be seen from FIG. 33(A), direction 401 preferably passes along the surface of, and through the top of, cone 405. Although it is preferable for direction 401 to pass through the top of cone 405, it is not necessary to pass through the top.

In FIG. 33(B), mirror 400 is shown with three different radii of curvature A, B and C. Radius of curvature A is the largest, radius of curvature C is the smallest, and radius of curvature B is between A and C in size.

By moving the mirror in direction 401 (corresponding, for example, to direction 401 in FIG. 32), the position of the light focus moves from A to C on the surface of the cone shaped mirror in FIG. 33(B). Since the radii are different for A, B and C, the chromatic dispersion will be different. Thus, the chromatic dispersion will be varied by moving the cone shaped mirror.

Figure 34A:
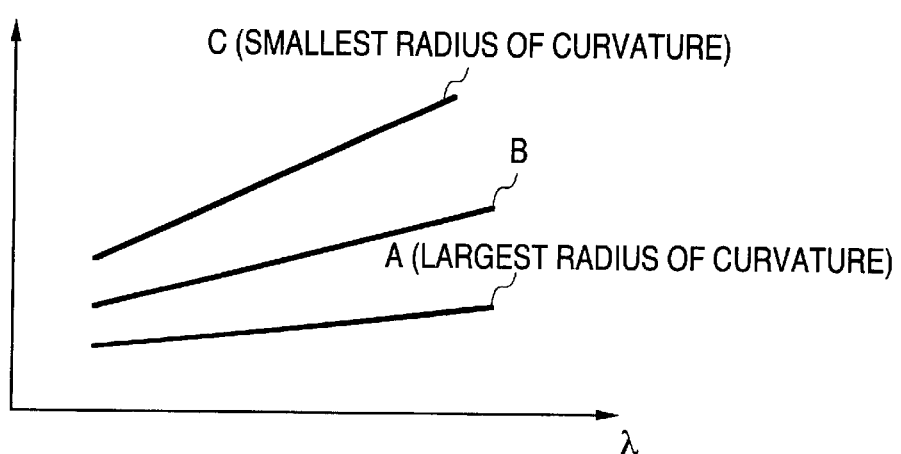
FIG. 34(A) is a graph illustrating the amount of chromatic dispersion versus wavelength within one channel for different radii of curvature of a mirror in an apparatus using a VIPA to provide chromatic dispersion, according to an embodiment of the present invention.

FIG. 34(A) is a graph illustrating the amount of chromatic dispersion versus wavelength within one channel for radii of curvature A, B and C of a cone shaped mirror when the mirror is moved in a direction such as direction 401, according to an embodiment of the present invention. As can be seen from FIG. 34(A), generally, radius of curvature C produces the greatest amount of chromatic dispersion. Generally, radius of curvature A produces the smallest amount of chromatic dispersion. As can be seen from FIG. 34(A), the amount of chromatic dispersion produced by radius of curvature B is between A and C.

As can be seen from FIG. 34(A) and also described with reference to FIGS. 24 and 30(A), the amount of chromatic dispersion will be different for different wavelengths within a channel. However, as described with reference to FIGS. 26, 31(A) and 31(B), by modifying the mirror, it is possible to provide a uniform amount of chromatic dispersion in each channel, and in all the channels.

Figure 34B:
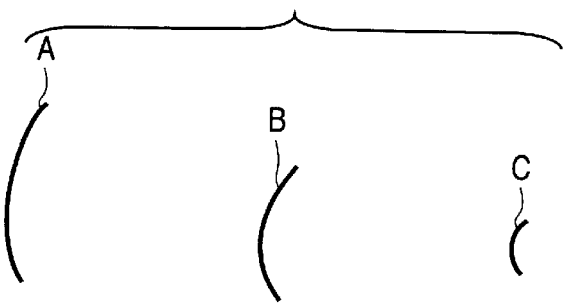
FIG. 34(B) is a diagram illustrating radii of curvature of FIG. 34(A), according to an embodiment of the present invention.
Figure 34C:
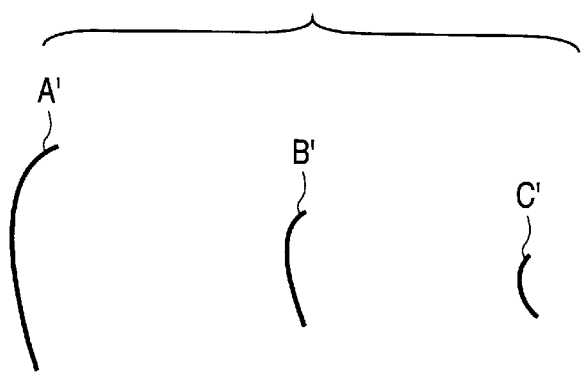
FIG. 34(C) is a diagram illustrating modified radii of curvature, according to an embodiment of present invention.

For example, FIG. 34(B) is a diagram illustrating the radii of curvature A, B and C when a cone shaped mirror is moved in a direction such as direction 401, according to an embodiment of the present invention. By contrast, FIG. 34(C) is a diagram illustrating modified radii of curvature A', B' and C' when a modified cone shaped mirror to provide uniform chromatic dispersion is moved in a direction such as direction 401, according to an embodiment of the present invention. For example, in the modified mirror, output light focused by lens 252 is incident on a different surface point on the mirror as the wavelength of the output light changes. The mirror is shaped so that the surface points change continuously from convex to concave as the wavelength of the output light changes from shorter to longer. As another example, the mirror can be shaped so that the surface points change continuously from stronger convex to weaker convex as the wavelength of the output light changes from shorter to longer.

Alternatively, the mirror can be shaped so that the surface points change continuously from weaker concave to stronger concave as the wavelength of the output light changes from shorter to longer. There are many other examples. For example, the mirror can have a concave portion and a convex portion so that output light at a shorter wavelength than a specific wavelength reflects off the convex portion and so that output light at a longer wavelength than the specific wavelength reflect off the concave portion.

As a result, the modified mirror will provide a uniform chromatic dispersion in each channel, and in all the channels.

Figure 35:
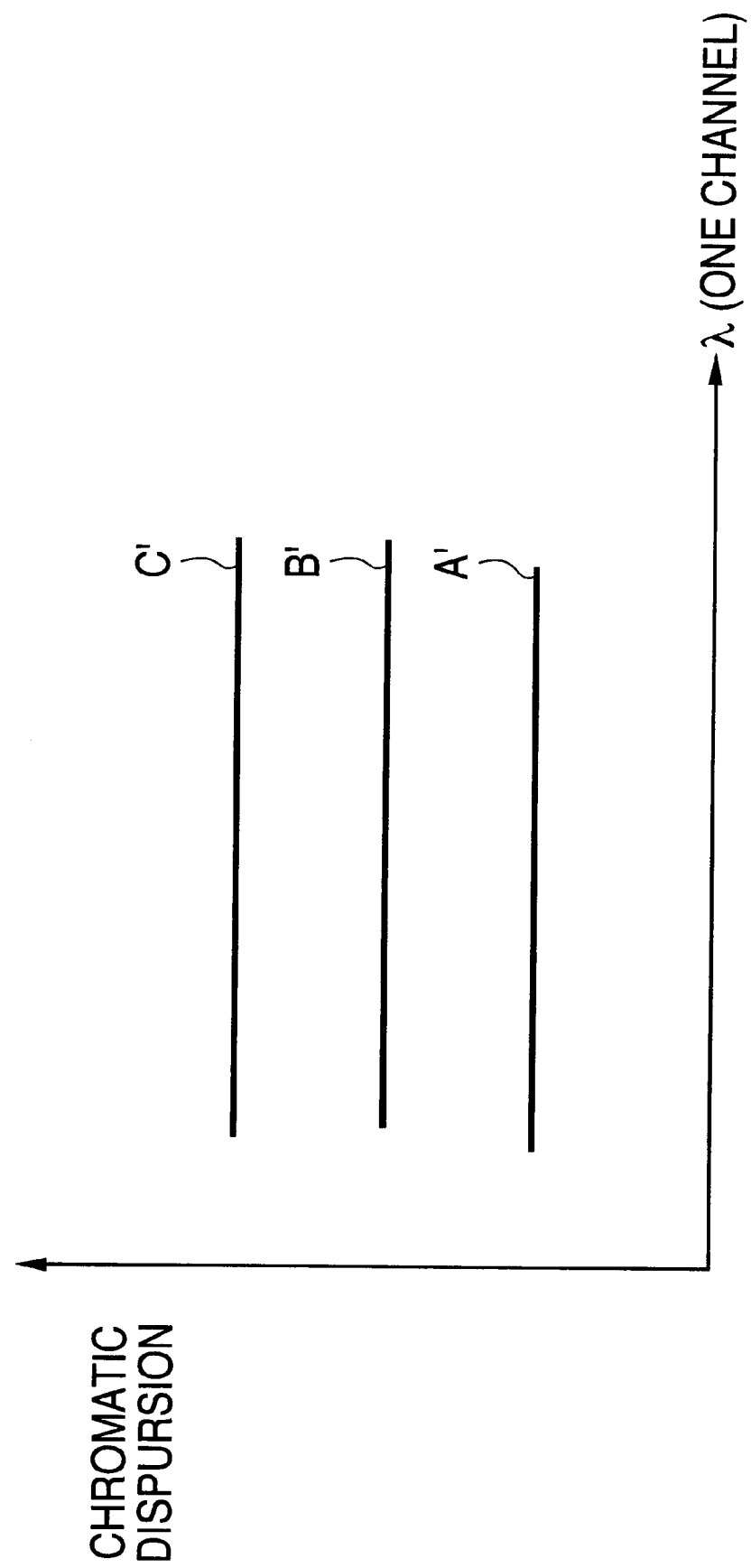
FIG. 35 is a graph illustrating the chromatic dispersion versus wavelength for different radii of curvature in an apparatus using a VIPA to provide chromatic dispersion, according to an embodiment of the present invention.

FIG. 35 is a graph illustrating the chromatic dispersion versus wavelength in one channel for radii of curvature A', B' and C', according to an embodiment of the present invention. As can be seen from FIG. 35, each radii of curvature A', B' and C' produces a uniform but different amount of chromatic dispersion. Therefore, each channel will have a uniform chromatic dispersion and the amount of the chromatic dispersion is variable by moving the mirror.

Figure 36:
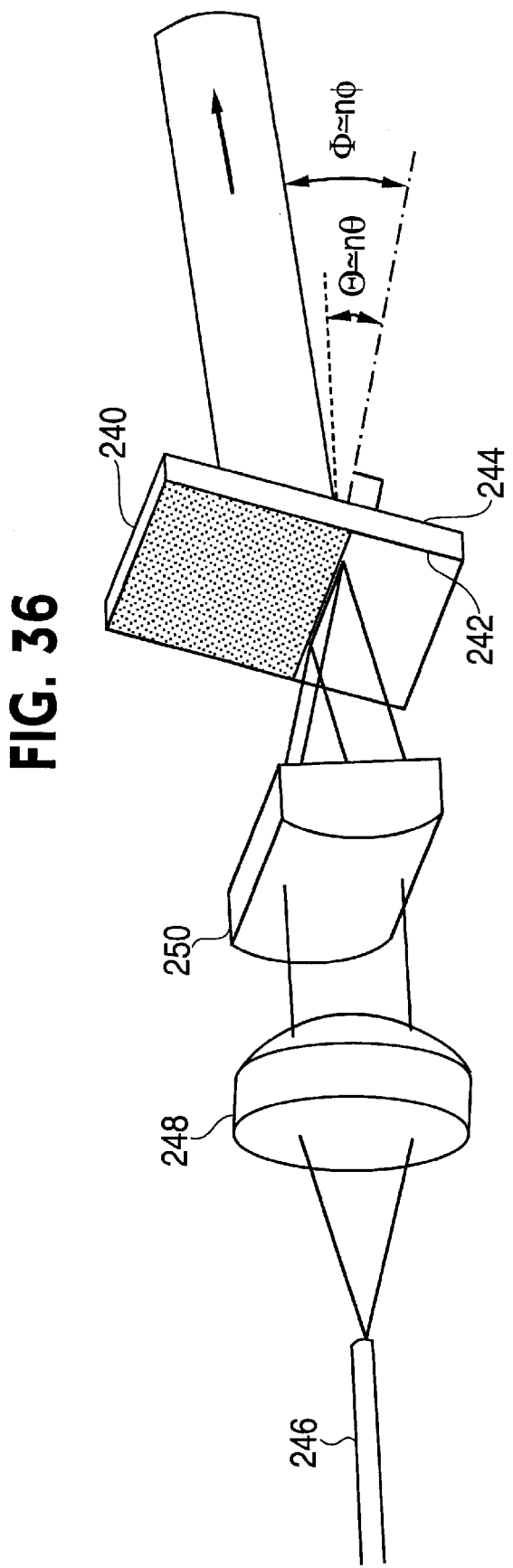
FIG. 36 is a diagram illustrating various angles in an apparatus which uses a VIPA, according to an embodiment of the present invention.

FIG. 36 is a diagram illustrating various angles in an apparatus which uses a VIPA, according to an embodiment of the present invention. Referring now to FIG. 36, $\Theta$ and $\theta$ are the average incident angles, and $\Phi$ and $\phi$ are the output angles with respect to the normal line to a plate, such as second surface 244, forming VIPA 240. $\Theta$ and $\Phi$ indicate the angles in air, whereas $\theta$ and $\phi$ indicate the angles in glass between surfaces 242 and 244 of VIPA 240. The angles in the air are approximately n times larger than those in the glass because of the refraction at the glass surface. Here, n is the index of the glass.

Figure 37:
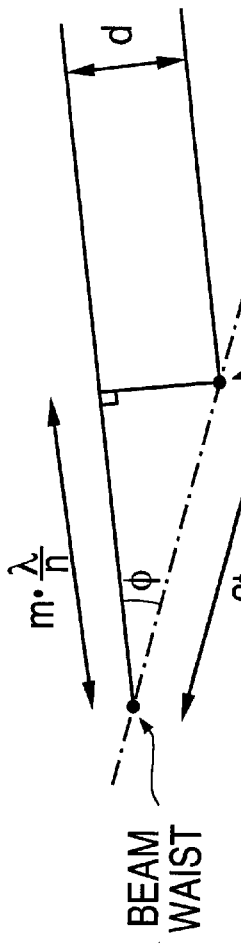
FIG. 37 is an additional diagram illustrating angles in an apparatus which uses a VIPA, according to an embodiment of the present invention.

FIG. 37 is an additional diagram illustrating angles in an apparatus which uses a VIPA, according to an embodiment of the present invention. As indicated in FIG. 37, the output angle $\phi$ is determined as the direction where the difference in the light paths originating at two adjacent beam waists is a multiple of the light wavelength. The spacing between the adjacent beam waists is 2t (t is the thickness of the VIPA, as illustrated, for example, in FIG. 8) and the output angle in the glass is $\phi$. So, 2t cos $\phi$=m$\lambda$/n (m is an integer). From this, the angular dispersion is $d\Phi/d\lambda = -n^2/\lambda\Phi$, as shown by the following Equation (4):

Separation of the light paths: d=2t sin $\phi$
Difference of the path lengths:

$$m \cdot \frac{\lambda}{n} = 2t \cos \phi$$

$$\frac{m\Delta\lambda}{n} = -2t\sin\phi\Delta\phi$$

$$\Delta\phi = -\cot\phi \cdot \frac{\Delta\lambda}{\lambda} \approx -\frac{1}{\phi}\frac{\Delta\lambda}{\lambda}$$

$\theta$: Input angle in glass
$\Theta$: Input angle in air
$\phi$: Output angle in glass
$\Phi$: Output angle in air $$\Theta \approx n\theta$$
$$\Phi \approx n\phi$$
$$\Delta\Phi \approx \Delta\phi$$
$$\Delta\Phi \approx -\frac{n}{\phi}\frac{\Delta\lambda}{\lambda} \approx -\frac{n^2}{\Phi}\frac{\Delta\lambda}{\lambda}, \frac{d\Phi}{d\lambda} \approx -\frac{n^2}{\lambda\Phi}$$

Equation(4)

Figure 38:
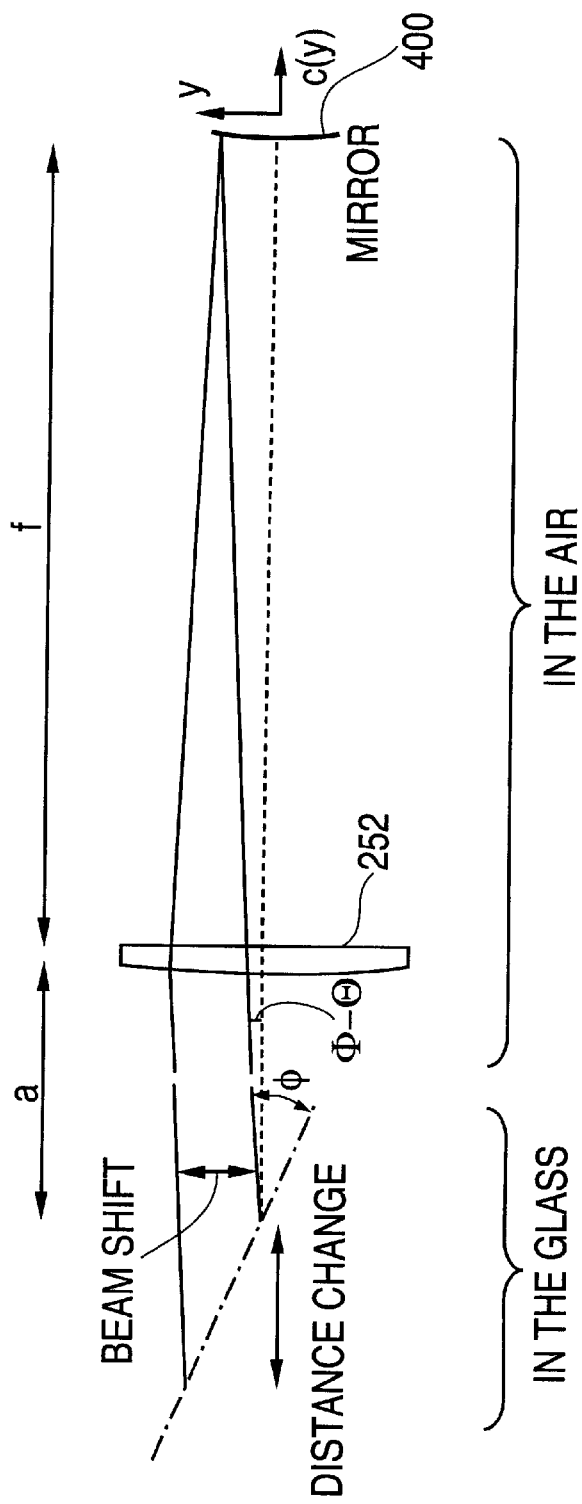
FIG. 38 is a diagram illustrating how chromatic dispersion is generated in an apparatus using a VIPA, according to an embodiment of the present invention.

FIG. 38 is a diagram illustrating how chromatic dispersion is generated in an apparatus using a VIPA, according to an embodiment of the present invention. FIG. 14 also illustrates how chromatic dispersion is generated, but FIG. 38 is a more quantitative description.

Referring now to FIG. 38, the light travel angle in the air with respect to the normal line to the VIPA is $\Phi-\Theta$. Also, the focal length of lens 252 is f and the depth of the center beam waist is a. The light focusing position y on the mirror is $y=f(\Phi-\Theta)$. The mirror shape is c(y) as a function of y. The mirror slope h is dc/dy. Then, the beam shift after the round trip is obtained by the following Equation (5):

Mirror shape: c(y), Slope of mirror surface:

$$h(y) = \frac{dc(y)}{dy},$$

$y \approx f(\Phi-\Theta)$ (Beam shift)$\approx 2(f-a)((\Phi-\Theta)+2f\,h(y)$ $$(Delay) = \frac{n}{c}(Distance\ change) \approx \frac{n}{c} \cdot \frac{(Beam\ shift)}{\phi} \quad \text{Equation(5)}$$

$$\approx \frac{2n^2}{c\Phi}\{(f-a)(\Phi-\Theta) + fh(y)\}$$

The distance change in FIG. 38 is easily obtained from the beam shift, and the delay is the distance change divided by the speed of light in the glass. The chromatic dispersion is calculated as the delay change with the wavelength change and is shown by the following Equation (6):

$$(Dispersion) = \frac{d(Delay)}{d\lambda} \quad \text{Equation (6)}$$

$$\approx \frac{2n^2}{c}\left\{(f-a)\frac{\Theta}{\Phi^2} + \frac{f}{\Phi}\frac{dh(y)}{dy}\frac{dy}{d\Phi} - \frac{fh(y)}{\Phi^2}\right\}\frac{d\Phi}{d\lambda}$$

$$\approx -\frac{2n^4}{c\lambda\Phi^3}\left\{(f-a)\Theta + f^2\Phi\frac{dh(y)}{dy} - fh(y)\right\}$$

For a cylindrical mirror of radius r:

$$(Dispersion) \approx -\frac{2n^4\Theta}{c\lambda\Phi^3}\left\{f - a + \frac{f^2}{r}\right\} \quad \text{Equation (7)}$$

If the mirror is a cylindrical mirror and has a circular shape along with angular dispersion direction, dh/dy is simply 1/r and the following Equation (7) is obtained:

From Equation (7), it can be seen that chromatic dispersion is not uniform in a WDM channel and, instead, the chromatic dispersion changes approximately in proportion to $1/\Phi^3$.

As indicated in Equation (6), chromatic dispersion is a function of $\Phi$. To make this dispersion uniform in a WDM channel, this formula needs to be constant as $\Phi$ changes. Therefore, the value in the large parenthesis of Equation (6) should be proportional to $\Phi^3$ (small change of $\lambda$ is ignored). Assuming the proportional constant is K (this means the chromatic dispersion is $-2n^4K/c\lambda$) and that n, c, $\lambda$, f and a are constant or almost constant for the small change of wavelength, we get the following Equation (8).

$$(f-a)\Theta + f^2\Phi\frac{dh(y)}{dy} - fh(y) = K\Phi^3. \quad \text{Equation (8)}$$

Here, $y \approx f(\Phi-\Theta)$. So, $$\Phi = \frac{y}{f} + \Theta$$

The condition for a uniform dispersion in a WDM channel is $$f^2\left(\frac{y}{f} + \Theta\right)\frac{dh(y)}{dy} - fh(y) = k\left(\frac{y}{f} + \Theta\right)^3 - (f-a)\Theta$$

The mirror slope h should be zero at the center y=0. Equation (8) is solved to get the following Equation (9):

$$h(y) = \frac{K}{2f^4}y^3 + \frac{3K\Theta}{2f^3}y^2 + \frac{K\Theta^2 - (f-a)}{f^2}y \quad \text{Equation (9)}$$

The mirror curve is obtained after integration and is shown by the following Equation (10):

$$c(y) = \int h(y)dy \quad \text{Equation (10)}$$

$$= \frac{K}{8f^4}y^4 + \frac{K\Theta}{2f^3}y^3 + \frac{K\Theta^2 - (f-a)}{2f^2}y^2$$

Equation (10) determines the ideal curves for different K, which were described, for example, in FIG. 28.

Figure 39A:
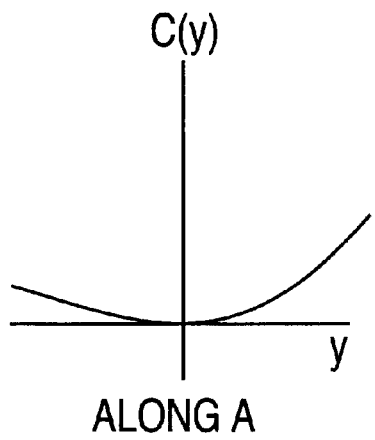
FIGS. 39(A), 39(B) and 39(C) are graphs illustrating mirror curves, according to an embodiment of the present invention.
Figure 39B:
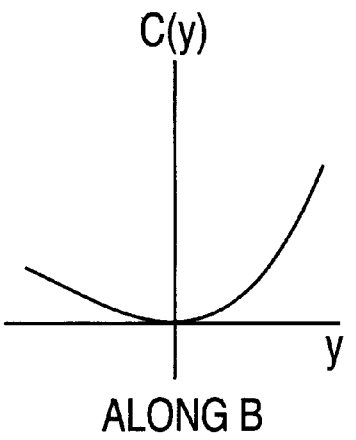
Figure 39C:
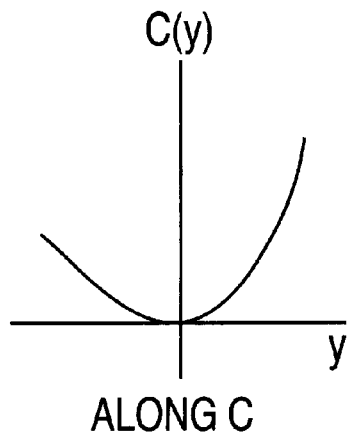

The mirror shape is determined by the value K, which gives the chromatic dispersion. To get the shape along the curve A, B, and C in FIG. 33(B), a small K, a medium K, and a large K can be used, respectively, for Equation (10). The curves are illustrated in FIGS. 39(A), 39(B) and 39(C). However, for easy manufacturing, the shapes could be approximately a part of an ellipse, or a parabola, or a hyperbola. In these cases, the mirror can be made as a part of a cone.

Figure 40:
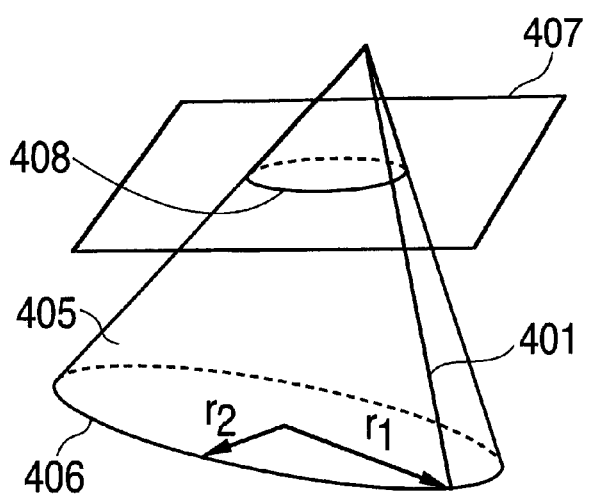
FIG. 40 is a diagram illustrating a cone for forming a mirror, according to an embodiment of the present invention.

FIG. 40 is a diagram illustrating an example of a cone for forming a mirror, according to an embodiment of the present invention. Referring now to FIG. 40, cone 405 has a base 406. If base 406 is a circle, cone 405 is a normal cone. However, cone 405 may be stretched, for example, in a side direction. In such case, base 406 will be ellipse, as shown in FIG. 40. In the case of ellipse, base 406 has a longer axis $r_1$ and a shorter axis $r_2$. Direction 401 is determined by the line passing along the cone surface from the top of the cone to the bottom where the cone surface hits the longer or shorter axis in base 406. However, this line does not necessarily have to hit one of the axes. As shown in FIG. 40, cone 406 is cut by a plane 407 which is perpendicular to direction 401. A cut curve 408 for the mirror is an ellipse, parabola or hyperbola, depending on the top angle of cone 405. Therefore, cut curve 408 in the mirror area is a part of one of these three curves. A modified cone shaped mirror is defined so that cut curve 408 is determined by Equation (10), rather than the three shapes.

Light for different WDM channels will be focused at different positions displaced in the direction 401. Therefore, the different WDM channels will see different curves and generate different chromatic dispersion. Therefore, the cone shape can be further modified so that the cut curves for different WDM channels are determined by Equation (10) with desirable value Ks. This indicates that the dispersion change is not limited to a linear change with wavelength or WDM channels and it could change in any way.

Figure 41:
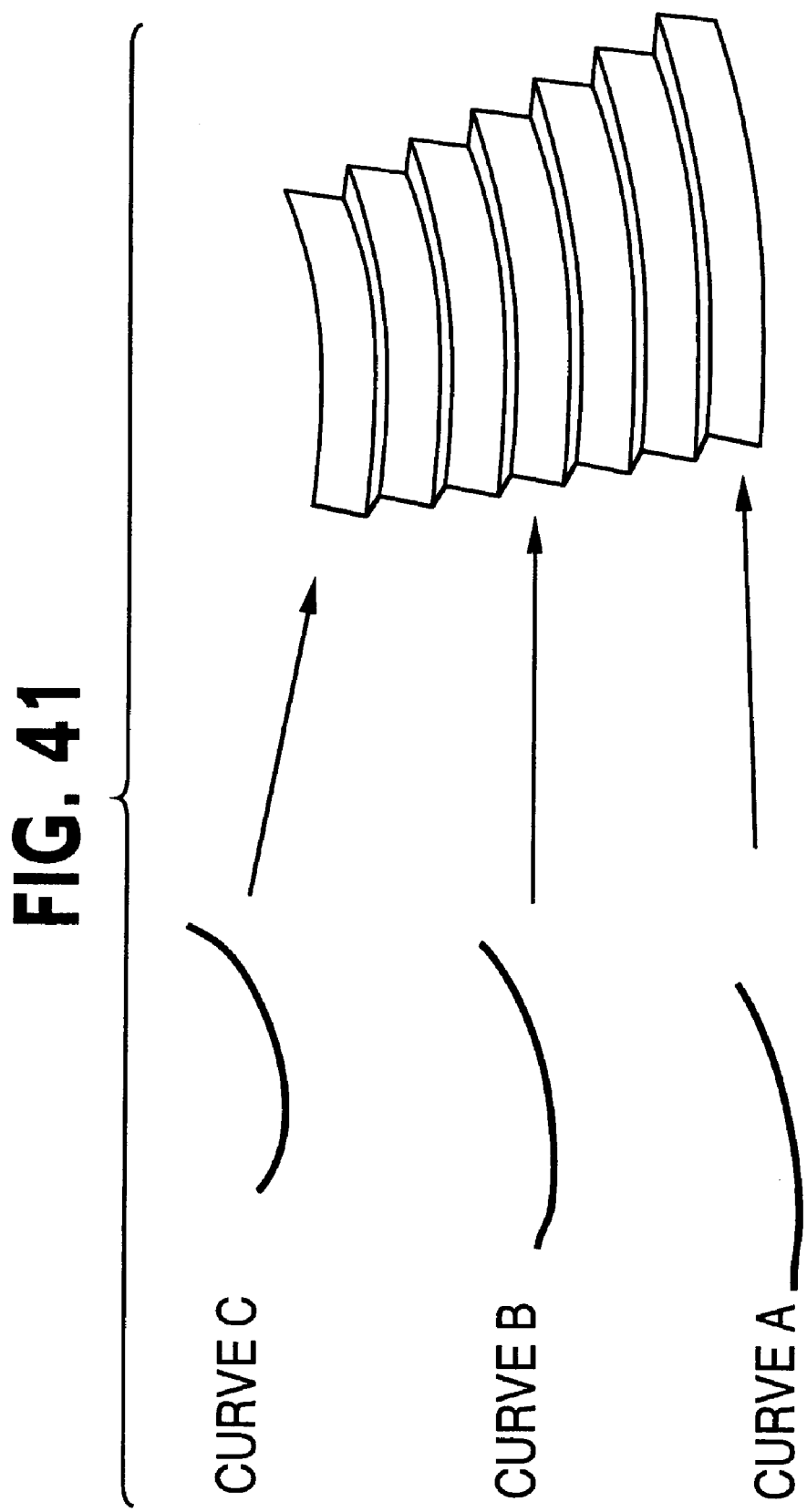
FIG. 41 is a diagram illustrating a step shaped mirror surface, according to an embodiment of the present invention.

FIG. 41 is a diagram illustrating a step shaped mirror surface, according to an embodiment of the present invention. This mirror can provide different shapes for different WDM channels without causing an excess tilt of the mirror with respect to the incident light.

Referring again to FIG. 32, mirror 400 is movable in direction 401. Mirror 400 can also be described as movable in or around a focal plane of lens 252. Mirror 400 has a cone shape, or modified cone shape, as described above, so mirror 400 will have different curvatures along the surface. Since the curvature changes along direction 401, and mirror 400 is movable in this direction, the chromatic dispersion can be varied by moving mirror 400 by a relatively small distance. In this design, the moving distance of mirror 400 would typically be less than 1 cm, which is much smaller than the moving distance of mirror 254 in FIG. 19.

Further, in FIG. 19, the position of lens 252 is movable, whereas in FIG. 32, the position of lens 252 would typically be fixed. Therefore, in FIG. 19, a large space will be required between VIPA 240 and lens 252, so that the lens 252 and mirror 254 can be moved together for a relatively large distance to provide the required amount of chromatic dispersion. This large space between VIPA 240 and lens 252 is undesirable, and greatly increases the overall size of the apparatus. By comparison, in FIG. 32, a relatively small space is required between VIPA 240 and lens 252, and mirror 400 only has to move a relatively small distance to provide the required amount of chromatic dispersion, thereby allowing the overall apparatus to be much smaller than that in FIG. 19.

Figure 42:
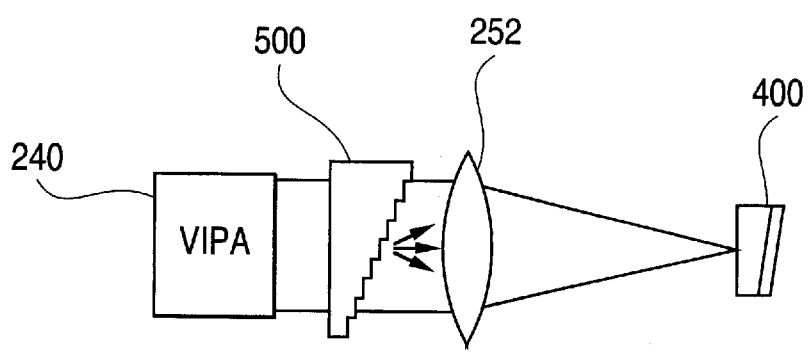
FIG. 42 is a diagram illustrating a side view of an apparatus using a VIPA to provide chromatic dispersion slope, according to an additional embodiment of the present invention.

FIG. 42 is a diagram illustrating a side view of an apparatus using a VIPA to provide chromatic dispersion slope, according to an additional embodiment of the present invention. Referring now to FIG. 42, an angular dispersive component 500 is positioned between VIPA 240 and lens 252. Angular dispersive component 500 could be, for example, a transmission type diffraction grating, a reflection type diffraction grating or a holographic grating.

Angular dispersive component 500 has an angular dispersion direction which is perpendicular to the angular dispersion direction of VIPA 240.

Preferably, the amount of angular dispersion provided by angular dispersive component 500 should be large enough to distinguish the different wavelengths for different WDM channels. Therefore, preferably, the angular dispersion provided by angular dispersive component 500 should be larger than approximately 0.1 degrees/nm. This number is readily achievable by using a diffraction grating as angular dispersive component 500. However, the present invention is not limited to any particular amount of angular dispersion.

In FIG. 42, the position of mirror 400 is preferably fixed. This is different than in FIG. 32, where the position of mirror 400 is movable. However, in FIG. 42, mirror 400 is not limited to being fixed, and can be movable to add variable dispersion.

By using angular dispersive component 500 between VIPA 240 and lens 252, the light in different channels will be focused by lens 252 at positions which are displaced along direction 401 (not shown in FIG. 42) on the surface of mirror 400 because of the angular dispersion of angular dispersive component 500, and will see a different curvature of mirror 400. As a result, different channels will have different chromatic dispersions. This channel dependent chromatic dispersion is called high order dispersion or dispersion slope, and is required for compensation of a fiber dispersion since different WDM channels traveling in a fiber will see different chromatic dispersion in the fiber.

Figure 43A:
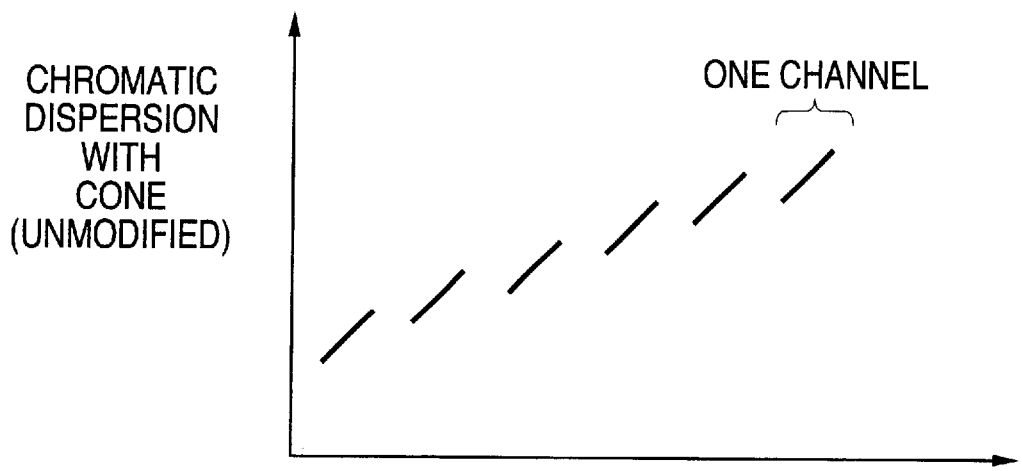
FIG. 43(A) is a graph illustrating the amount of chromatic dispersion for all wavelengths with the apparatus in FIG. 42 using a cone shaped mirror, according to an embodiment of the present invention.

FIG. 43(A) is a graph illustrating the amount of chromatic dispersion for all wavelengths (many channels) with a cone shaped mirror used as mirror 400 in FIG. 42, according to an embodiment of the present invention. For example, this cone shaped mirror would typically be as illustrated in FIGS. 33(A) and 33(B). As illustrated in FIG. 43(A), the amount of chromatic dispersion is not uniform in each channel and differs for different channels.

Figure 43B:
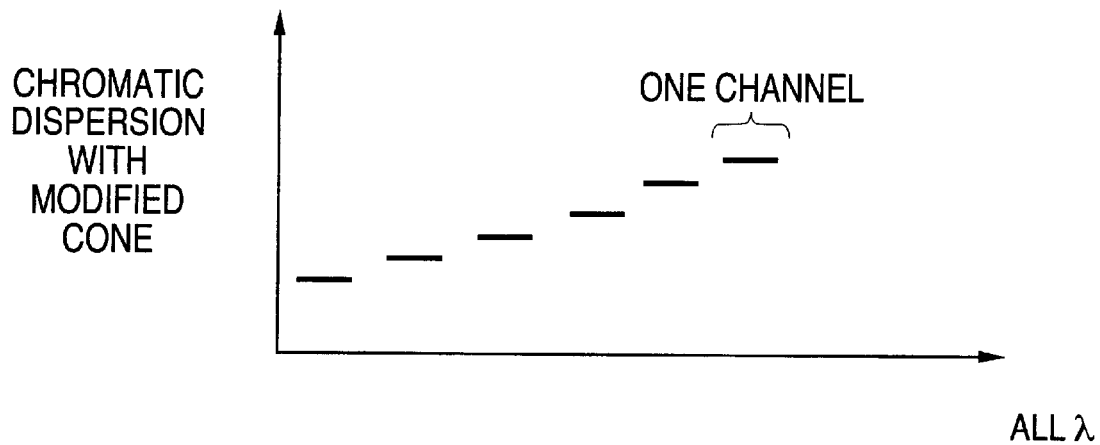
FIG. 43(B) is a graph illustrating the amount of chromatic dispersion for all wavelengths with the apparatus in FIG. 42 using a modified cone shaped mirror, according to an embodiment of the present invention.

FIG. 43(B) is a graph illustrating the amount of chromatic dispersion for all wavelengths (many channels) with a modified cone shaped mirror used as mirror 400 in FIG. 42, according to an embodiment of the present invention. For example, this modified cone shaped mirror would typically have radii of curvature A', B' and C' as in FIG. 34(C), according to an embodiment of the present invention. As illustrated in FIG. 43(B), the amount of chromatic dispersion is uniform in each channel and different for different channels.

In FIGS. 43(A) and 43(B), the dispersion is shown as increasing with increasing wavelength. However, in some embodiments of the present invention, the dispersion could decrease with increasing wavelength by inverting angular dispersive component 500 or by inverting the direction of the cone shaped mirror.

Therefore, parameters (such as the mirror shape, lens focal length, etc.) are preferably designed so that the chromatic dispersion for each WDM channel, such as those shown, for example, in FIGS. 43(A) or 43(B), is the same amount but opposite sign to the chromatic dispersion of the transmission line at the corresponding wavelength for the purpose of the simultaneous dispersion compensation of all WDM channels. Namely, although different WDM channels may experience different chromatic dispersion amounts through the transmission line, a VIPA can be used, as described herein, to compensate for the dispersion of the WDM channels with different dispersion amounts.

Figure 44:
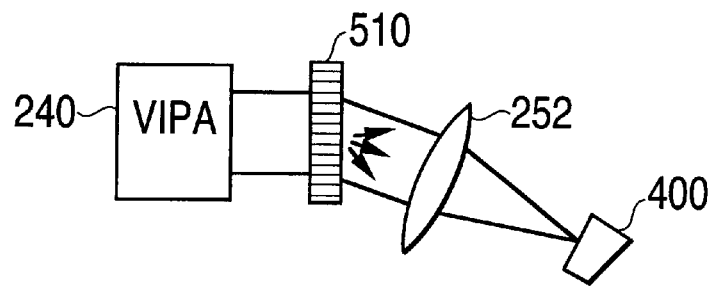
FIG. 44 is a diagram illustrating the use of a holographic grating between a VIPA and a lens, according an embodiment of the present invention.

FIG. 44 is a diagram illustrating the use of a holographic grating 510 as an angular dispersive component between VIPA 240 and lens 252, according to an embodiment of the present invention.

Figure 45:
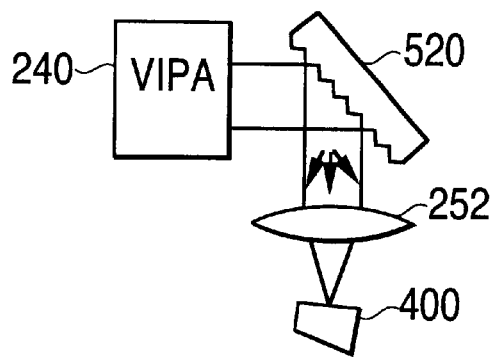
FIG. 45 is a diagram illustrating the use of a reflection type grating between a VIPA and a lens, according to an embodiment of the present invention.

Moreover, FIG. 45 is a diagram illustrating the use of a reflection type grating 520 as an angular dispersive component between VIPA 240 and lens 252, according to an embodiment of the present invention.

When a diffraction grating is used as an angular dispersive component (see FIG. 42), one problem is its polarization dependence. Therefore, a quarter wave plate can be used to cancel the polarization dependence of the diffraction grating.

Figure 46:
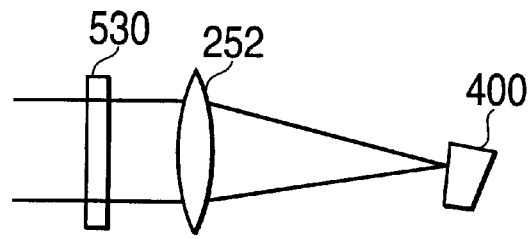
FIGS. 46 and 47 are diagrams illustrating the use of quarter wave plate, according to embodiments of the present invention.

For example, FIG. 46 is a diagram illustrating the use of a quarter wave plate 530 inserted between the diffraction grating and lens 252.

Figure 47:
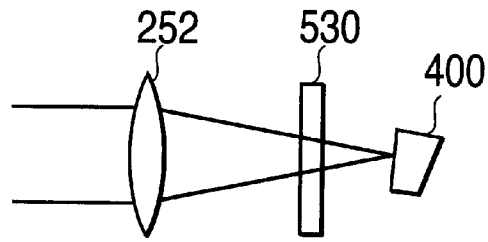

FIG. 47 is a diagram illustrating the use of quarter wave plate 530 inserted between lens 252 and the cone shape mirror 400. As an example, quarter wave plate 530 is positioned with the axes at 45° with respect to the plane of s or p polarization of the diffraction grating.

With configurations as in FIGS. 46 and 47, light passed through the diffraction grating with p-polarization will return to the diffraction grating with s-polarization, and light passed through the diffraction grating with s-polarization will return to the diffraction grating with p-polarization. Therefore, the polarization dependence of the diffraction grating is canceled.

Figure 48A:
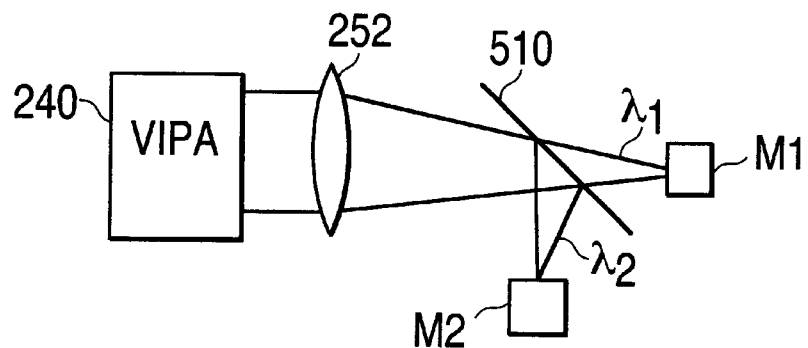
FIG. 48(A) is a diagram illustrating a side or top view of an apparatus which uses a VIPA to provide different chromatic dispersion for different channels, according to a still further embodiment of the present invention.

FIG. 48(A) is a diagram illustrating a side or top view of an apparatus which uses a VIPA to provide two different chromatic dispersions for different channels, according to a still further embodiment of the present invention. Referring now to FIG. 48(A), a wavelength filter 510 is positioned between lens 252 and mirrors M1 and M2. Wavelength filter

510 filters the light from lens 252 so that light at wavelength λ1 is directed to mirror M1, and light at wavelength λ2 is directed to mirror M2. Mirror M1 has a different curvature than mirror M2 and therefore, λ1 and λ2 will have different chromatic dispersion. Thus, each of mirrors M1 and M2 can be, for example, a cylindrical mirror or a modified cylindrical mirror, as described herein. For example, mirrors M1 and M2 can be modified cylindrical mirrors to provide uniform but different amount of chromatic dispersion in channels corresponding to λ1 and λ2.

Figure 48B:
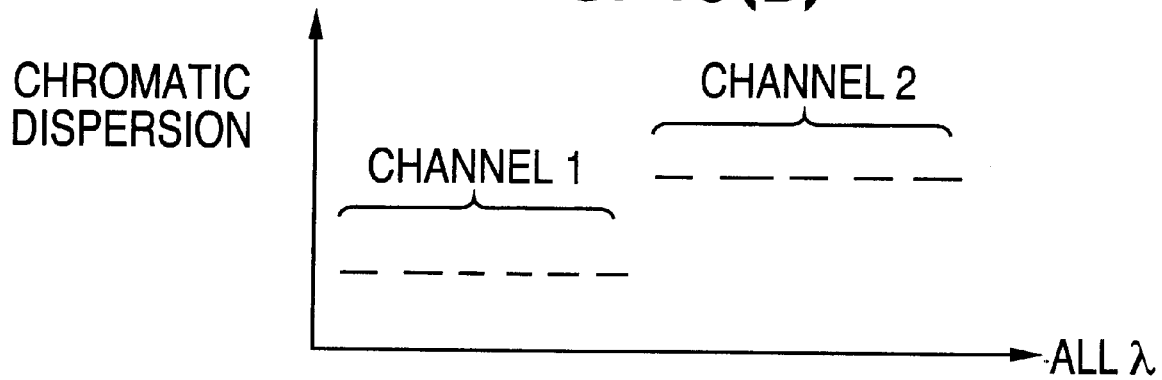
FIG. 48(B) is a graph illustrating chromatic dispersion versus wavelength for the apparatus in FIG. 48(A), according to an embodiment of the present invention.

FIG. 48(B) is a graph illustrating chromatic dispersion versus wavelength for the apparatus in FIG. 48(A), where mirrors M1 and M2 are modified cylindrical mirrors to provide uniform chromatic dispersion within each channel, according to an embodiment of the present invention.

While FIG. 48(A) shows an apparatus configured for two wavelengths, there is generally no limit in the number of wavelength filters and mirrors which can be used to separate additional wavelengths or channels.

Figure 49:
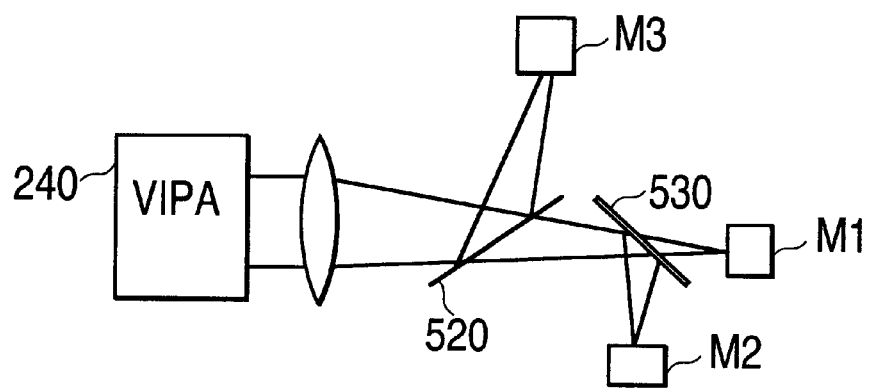
FIG. 49 is a diagram illustrating a side or top view of an apparatus which uses a VIPA to provide different chromatic dispersion for different channels, according to an embodiment of the present invention.

For example, FIG. 49 is a diagram illustrating a side or top view of an apparatus which uses a VIPA to provide three different chromatic dispersion for different channels, according to an embodiment of the present invention. Referring now to FIG. 49, wavelength filters 520 and 530 are used to direct light at wavelengths λ1, λ2 and λ3 to mirrors M1, M2 and M3, respectively.

According to the above embodiments of the present invention, an apparatus which uses a VIPA in combination with a mirror, such as a cone or modified cone shaped mirror, to generate dispersion slope or higher order dispersion. The cone or modified cone shape of the mirror is designed so that the dispersion slope or higher order dispersion of the apparatus compensates for dispersion slope or higher order dispersion of a transmission line (fiber).

Figure 1B:
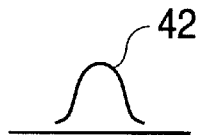
FIG. 1(B) is a diagram illustrating a pulse before transmission through a fiber in a conventional fiber optic communication system.
Figure 1C:
FIG. 1(C) is a diagram illustrating a pulse after being transmitted through a fiber in a conventional fiber optic communication system.
Figure 2:
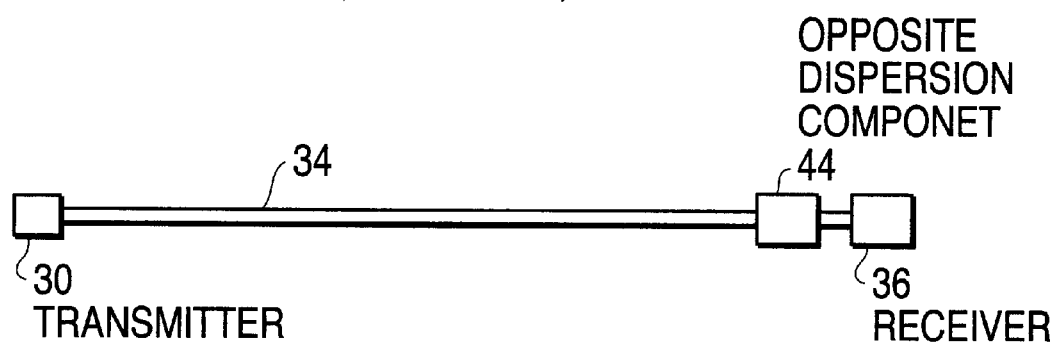
FIG. 2 (prior art) is a diagram illustrating a fiber optic communication system having an opposite dispersion component to compensate for chromatic dispersion.
Figure 3:
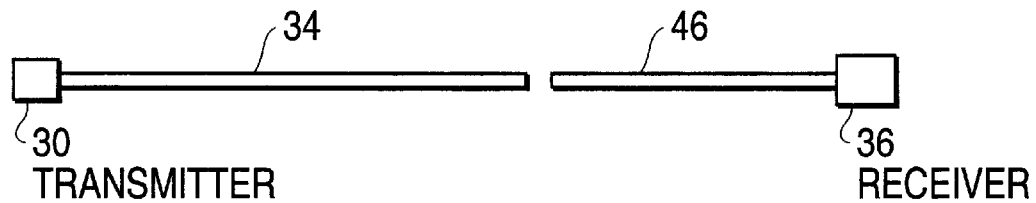
FIG. 3 (prior art) is a diagram illustrating a fiber optic communication system having a dispersion compensation fiber as an opposite dispersion component.
Figure 4:
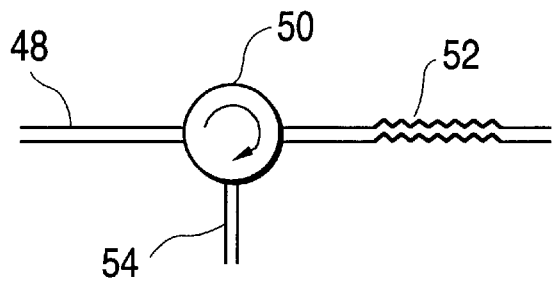
FIG. 4 (prior art) is a diagram illustrating a chirped grating for use as an opposite dispersion component, to compensate for chromatic dispersion.
Figure 5:
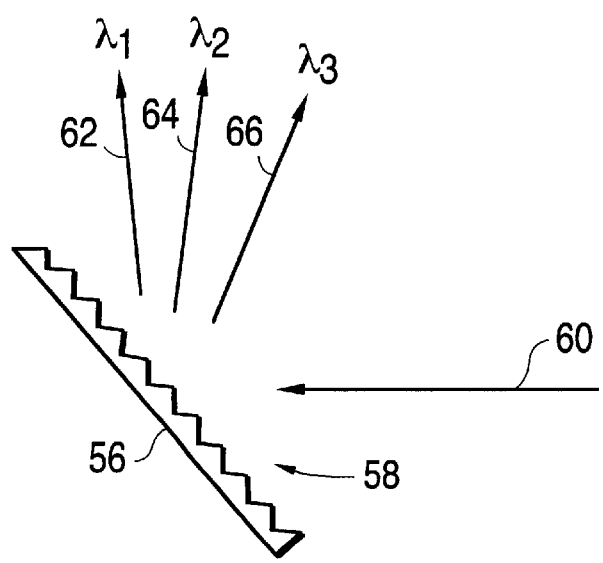
FIG. 5 (prior art) is a diagram illustrating a conventional diffraction grating.

In an optical communication system in which a transmitter transmits an optical signal through a transmission line to a receiver, the apparatus of the present invention can be inserted in the transmitter, the transmission line, the receiver, or in any combination of the transmitter, transmission line and receiver. For example, in FIG. 1, the apparatus of the present invention can be inserted in transmitter 30, optical fiber 34 (for example, a transmission line) or receiver 36, or in any combination of transmitter 30, optical fiber 34 and receiver 36. Further, two or more of the apparatuses of the present invention can be cascaded together, or only one apparatus can be used in transmitter 30, optical fiber 34 and/or receiver 36. Thus, the present invention is not limited to the number of apparatuses which can be used together to provide the required affect.

One problem with an apparatus which use a VIPA to provide chromatic dispersion, as in the above-described embodiments of the present invention, is that the apparatus has a relatively narrow band in the transmission spectrum. Generally, the band is narrow due to insertion loss from fiber-to-fiber. For example, in FIG. 13, insertion loss occurs from the light traveling out of fiber 246 to when the light is again received by fiber 246 after traveling through VIPA 240 and being reflected by mirror 254.

For example, FIG. 50 is a graph illustrating the insertion loss in an apparatus which uses a VIPA to provide chromatic dispersion, according to an embodiment of the present invention. Referring now to FIG. 50, curve 550 illustrates the actual insertion loss which might typically occur for one channel. By contrast, curve 560 illustrates a more desirable insertion loss for the channel.

The insertion loss is due to several different factors, one major factor is a loss due to different diffraction efficiency at different wavelengths.

For example, FIG. 51 is a diagram illustrating different diffraction efficiency at different wavelengths. Referring now to FIG. 51, light output from VIPA 240 is focused by lens 252 on a mirror 570. Light at the shortest wavelength is focused at point 580, light at the center wavelength is focused at point 590, and light at the longest wavelength is focused at point 600. However, due to the characteristics of VIPA 240, and especially to the physics underlying the multiple reflection incurring inside VIPA 240, the light at the center wavelength at point 590 will be the strongest, whereas the light at the shortest wavelength and the longest wavelength at points 580 and 600, respectively, will be weaker.

For example, FIG. 52 is a diagram illustrating the light intensity of light traveling out of a fiber and into a VIPA in the above embodiments of the present invention. FIG. 52 includes fiber 246 and lenses 248 and 250 as in FIG. 13, but the VIPA is removed and the light is allowed to travel to a screen 610. A dotted box 240 shows where the VIPA would be positioned.

As indicated in FIG. 52, the light has a light intensity shown by curve 620 at screen 610. As a result, the insertion loss can be made closer to the desired insertion loss 560 in FIG. 50 if the far field distribution of the input light provided to the VIPA is a double-humped shape. In this manner, the transmission spectrum of the apparatus will be much flatter.

FIG. 53 is a diagram illustrating a side view of an optical phase mask on an input fiber to produce a double-humped shape far field distribution, in an apparatus which uses a VIPA to provide chromatic dispersion, according to an embodiment of the present invention. Referring now to FIG. 53, an input fiber 246 (corresponding, for example, to input fiber 246 in FIG. 13) has a core 650. Optical phase masks 660 and 670 cover a portion of the top and bottom, respectively, of core 650. As a result, a double-humped shape far field distribution will be provided at the input to the VIPA (not illustrated in FIG. 53), and the insertion loss of the apparatus will have a more desirable insertion loss.

FIG. 54 is a diagram illustrating a cross-sectional view along lines 54—54 in FIG. 53, according to an embodiment of the present invention. As can be seen from FIGS. 53 and 54, phase masks 660 and 670 cover the top and bottom, respectively. The phase masks should not be on the side portions of the core.

It is not necessary for the phase masks to be on the input fiber. Instead, for example, the phase masks could be on the VIPA.

Figure 55:
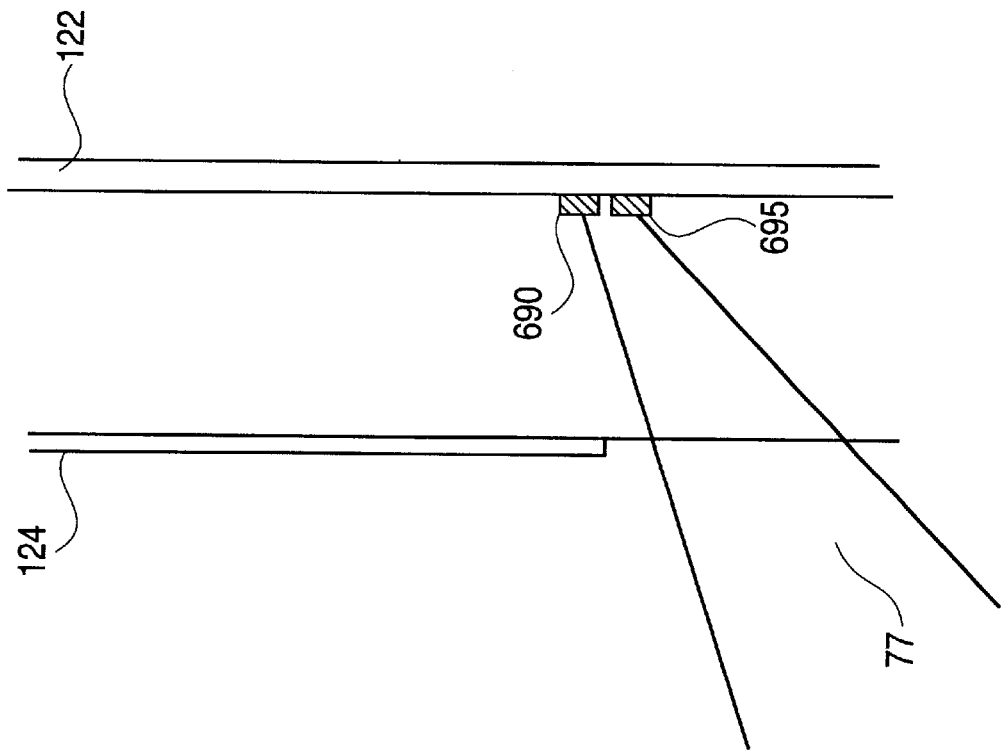
FIG. 55 is a diagram illustrating a side view of phase masks on a VIPA to provide a double-humped shape far field distribution with respect to light received inside the VIPA, according to an embodiment of the present invention.

For example, FIG. 55 is a diagram illustrating a side view of phase masks on a VIPA to provide a double-humped shape far field distribution with respect to light received inside the VIPA, according to an embodiment of the present invention. Elements in FIG. 55 are similar to that in FIG. 11.

Referring now to FIG. 55, optical phase masks 690 and 695 are positioned on the light incident window surface 124, to provide a double-humped shape far field distribution of light received into the VIPA.

Figure 56:
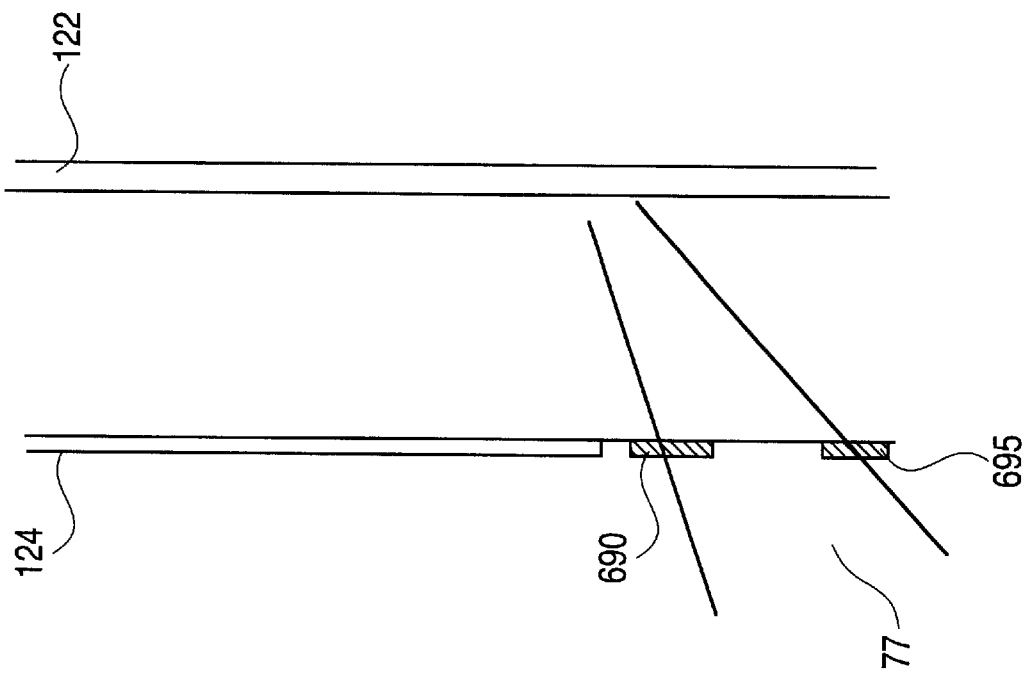
FIG. 56 is a diagram illustrating a side view of phase masks on a VIPA to provide a double-humped shape far field distribution with respect to light received inside the VIPA, according to an additional embodiment of the present invention.

FIG. 56 is a diagram illustrating a side view of phase masks on a VIPA to provide a double-humped shape far field distribution with respect to light received inside the VIPA, according to an additional embodiment of the present invention. FIG. 56 is different than FIG. 55 in that phase masks 690 and 695 are provided on reflecting surface 122. Therefore, phase masks can be on either reflecting surface or on the light incident window of the VIPA.

Further, a double-humped shape far field distribution can be obtained by positioning phase masks in the center of the input light.

For example, FIGS. 57 and 58 are diagrams illustrating a side view of phase masks on a VIPA to provide a double-humped shape far field distribution with respect to light received inside the VIPA, according to an additional embodiment of the present invention. In FIGS. 57 and 58, a phase mask 700 is positioned in the center of the input light. In this case, the optical phase at the center of the far field distribution may be π, and may be 0 at the ends. This is the opposite of the far field distribution in FIGS. 53–56.

As indicated above, phase masks can be used to provide a double-humped shape far field distribution. The phase mask preferably has a thickness corresponding to the addition of π to the optical phase. However, a preferable range of optical phase added by the phase mask is $\frac{2}{3}\pi$ to $\frac{4}{3}\pi$.

Any transparent material that provides the proper additional phase can be used for the phase mask. For example, $SiO_2$ would be a typical material for use as a phase mask.

As indicated above, a phase mask is used to provide a double-hump shaped far field distribution. Here, a "double-humped shape" is defined as having two almost identical peaks with a valley between the peaks. The depth of the valley should be less than or equal to 50% of the top peak value, and preferably less than 20% of the top peak value. Preferably, the peaks are identical, but it is satisfactory for the peaks to have an amplitude of within 10% of each other.

Further, instead of using a phase mask, there are other ways to produce a double-hump shaped far field distribution, and the present invention is not limited to using a phase mask for this purpose.

The above described embodiments using a phase mask to produce a double-hump shaped far field distribution are applicable to embodiments of the present invention that use a VIPA to produce chromatic dispersion. However, these embodiments are also applicable to the use of a VIPA as a demultiplexer. For example, the above-described embodiments of the present invention relating to the use of a phase mask to produce a double-hump shaped far field distribution can be applied to the VIPA in FIGS. 7 and 8.

As described above, an apparatus using a VIPA to compensate for chromatic dispersion would typically have a loss curve in each WDM channel as shown in FIG. 50. As described above, this loss curve can be flattened by using an optical phase mask. However, there are other ways to flatten the loss curve, such as by adding excess loss.

Figure 59:
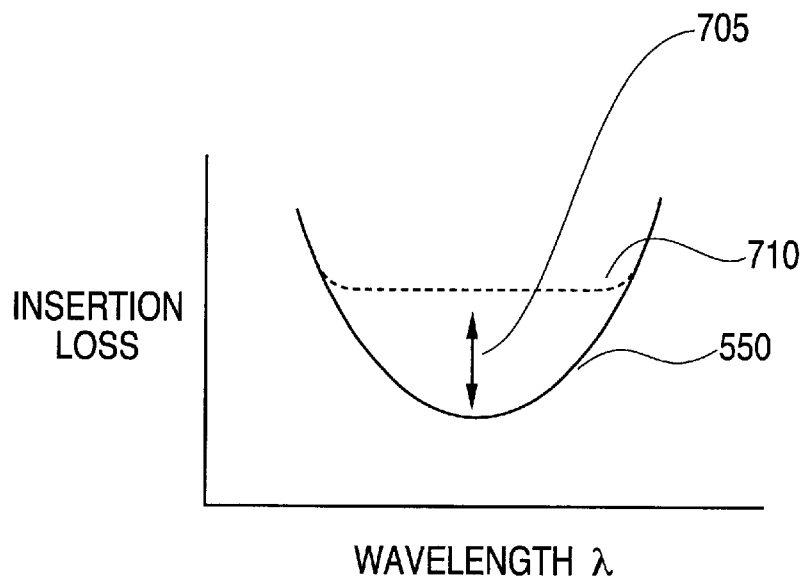
FIG. 59 is a diagram illustrating excessive loss added to a loss curve, according to an embodiment of the present invention.

For example, FIG. 59 is a diagram illustrating excessive loss added to the loss curve, according to an embodiment of the present invention. Referring now to FIG. 59, by adding excess loss 705, loss curve 550 will be flattened to become curve 710.

Figure 60:
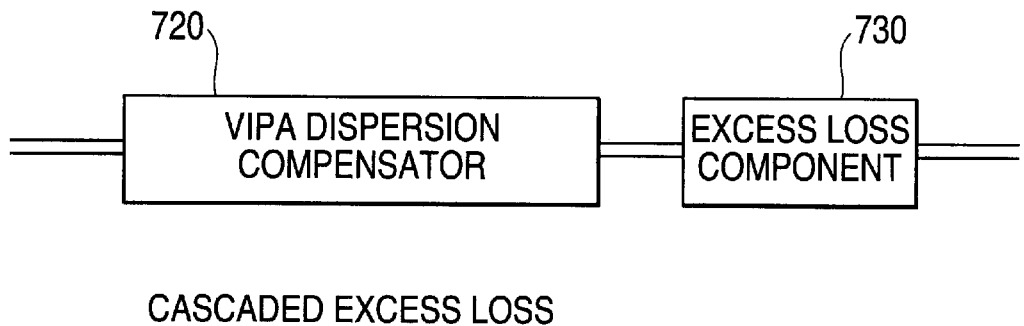
FIG. 60 is a diagram illustrating the use of an excess loss component to provide excess loss, according to an embodiment of the present invention.

FIG. 60 is a diagram illustrating the use of an excess loss component to provide excess loss, and thereby flatten the loss curve, according to an embodiment of the present invention. Referring now to FIG. 60, a VIPA dispersion compensator 720 represents an apparatus which uses a VIPA to produce chromatic dispersion, as described herein. An excess loss component 730 is cascaded with VIPA dispersion component 720. Excess loss component 730 could be either upstream or downstream of VIPA dispersion component 720 and there might be some optical components between VIPA dispersion component 720 and excess loss component 730. Thus, the present invention is not limited to any specific placement of VIPA dispersion component 720 with respect to excess loss component 730.

Excess loss component 730 can be, for example, an optical interferometer or a wavelength filter. However, a Mach-Zehnder interferometer or a Fabry-Perot interferometer would be suitable, because they have a periodic transmission curve and the period can be adjusted to the WDM channel spacing by choosing appropriate parameters of the interferometer. Therefore, the overall transmission curve will be flattened for all the WDM channels simultaneously.

The above described embodiments using an excess loss component are applicable to embodiments of the present invention that use a VIPA to produce chromatic dispersion. However, these embodiments are also applicable to the use of a VIPA as a demultiplexer. For example, the above-described embodiments of the present invention relating to the use of an excess loss component can be applied with the VIPA in FIGS. 7 and 8.

Instead of using an excessive loss component, there are other ways to flatten the loss curve.

Figure 61:
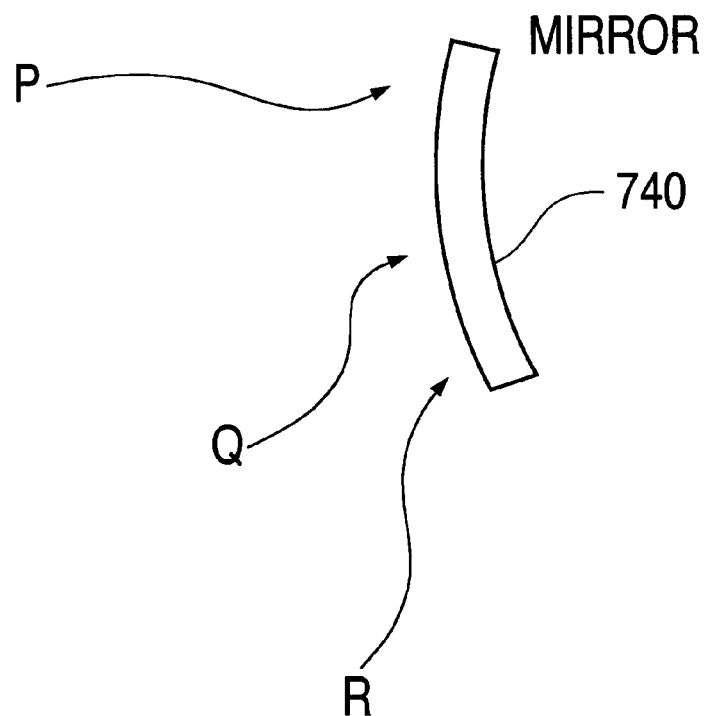
FIG. 61 is a diagram illustrating a side view of a mirror for use with a VIPA to provide chromatic dispersion, according to an embodiment of the present invention.

For example, FIG. 61 is a diagram illustrating a side view of a mirror for use with a VIPA to provide chromatic dispersion, and which will flatten the loss curve, according to an embodiment of the present invention. Referring now to FIG. 61, a mirror 704 could be a cone shaped mirror, a modified cone shaped mirror, a flat mirror, or any other shape mirror. FIG. 61 shows positions P, Q and R in the side view. Positions P, Q and R corresponds, respectively to points 274, 270 and 272, respectively, in FIG. 14. Light at a shorter wavelength is focused at point 274 or P, and light at a longer wavelength is focused at point 272 or R.

The reflectivity on mirror 740 is modulated along the angular dispersion direction of the VIPA. That is, the reflectivity at the position Q is lowest, to thereby provide a higher loss, and the reflectivity at the position P and R is higher, to thereby provide a lower loss. Therefore, the power of the reflected light is reduced near the center of the WDM channel, and thus the loss curve is flattened. To modify the reflectivity, a layer of light absorbing material may be coated near position Q or, in the case of a multi-layer mirror, the thickness of one or more layer may be modulated.

This modulation of the reflectivity can be effectively achieved by patterning the mirror instead of actually modulating the reflectivity, if the VIPA is used with a mirror which is not a cone or modified cone shape, that is, if the VIPA is used with a mirror such as, for example, mirror 254 in FIGS. 14, 20(A), 20(B), or the mirror shapes in FIGS. 28(A) through 28(F).

Figure 62:
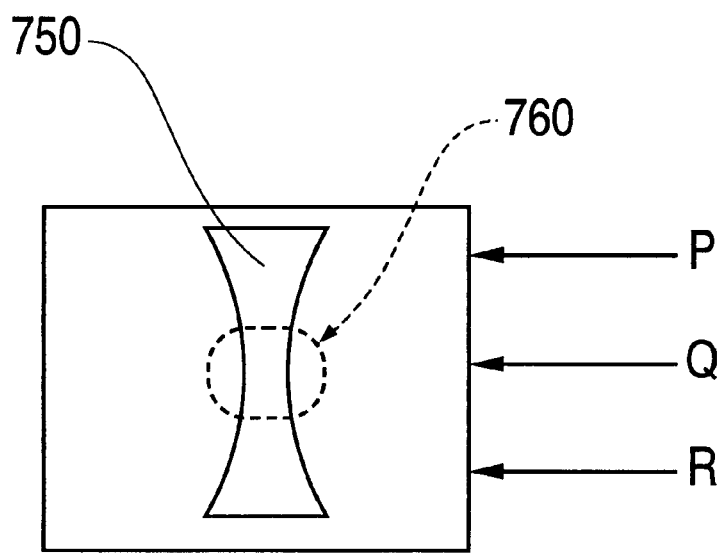
FIG. 62 is diagram illustrating a front view of a mirror, according to an embodiment of the present invention.

For example, FIG. 62 is a diagram illustrating a front view of a mirror 750, according to an embodiment of the present invention. Referring now to FIG. 62, mirror 750 is patterned as illustrated in the figure, to change the reflectivity of mirror 750. Here, the width of mirror 750 is smaller than the focused beam size 760 near the position Q, and therefore, the light power reflected from near position Q is reduced.

Figure 63A:
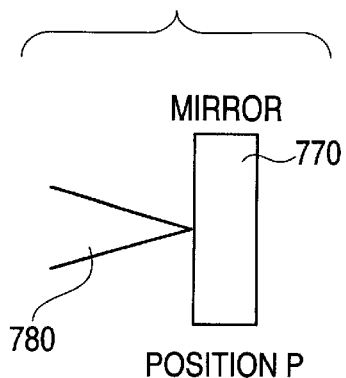
FIGS. 63(A), 63(B) and 63(C) are diagrams illustrating a way to modulate effective reflectivity in an apparatus using a VIPA, according to an embodiment of the present invention.
Figure 63B:
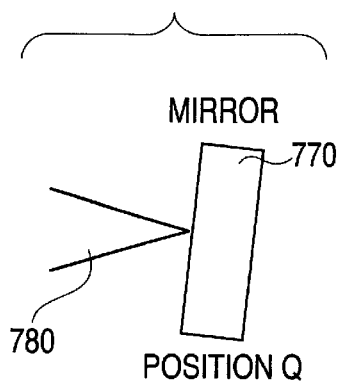
Figure 63C:
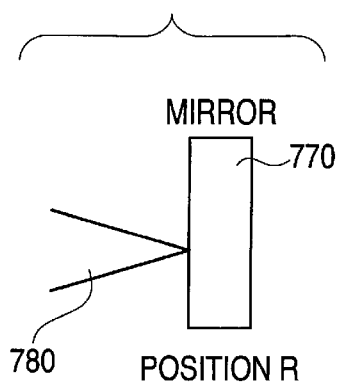

FIGS. 63(A), 63(B) and 63(C) are diagrams illustrating another way to modulate the effective reflectivity in the case of a VIPA used with a mirror 770 which is not a cone or modified cone shape, according to an embodiment of the present invention. More specifically, FIGS. 63(A), 63(B) and 63(C) illustrate a top view of incident beam 780 on mirror 770 at positions P, Q and R, respectively. As illustrated in FIGS. 63(A), 63(B) and 63(C), instead of modulating the reflectivity, the mirror angle in the top view is changed. In previously described embodiments of the present invention, such as that in FIG. 14, the mirror is preferably perpendicular to the average light incident angle in the top view. However, if the mirror is tilted in the top view, as in FIGS. 63(A), 63(B) and 63(C), the reflected light is deflected and the coupling efficiency to the output fiber is reduced. At positions P and R, incident light 780 is perpendicular to mirror 770 and the light is fully returned to the output fiber. On the other hand, at position Q, mirror 770 is tilted in the top view and the reflected light is slightly diverged from the output fiber direction. This causes an excess loss and flattening of the loss curve. By changing this tilting angle of mirror 770 in the top view gradually along the angular dispersion direction of the VIPA, the excess loss to flatten the loss curve can be effectively produced.

The changing of the mirror angle as in FIGS. 63(A), 63(B) and 63(C), and the patterning of the mirror as in FIG. 62, could be used in the above-described apparatuses which use a VIPA in combination with a mirror which is not cone or modified cone shaped. This is because, in the case of a cone or modified cone shaped mirror, the light at a wavelength may be focused effectively at different positions on the mirror in the top view, and therefore, the mirror should not be patterned or tilted in the top view.

Figure 64:
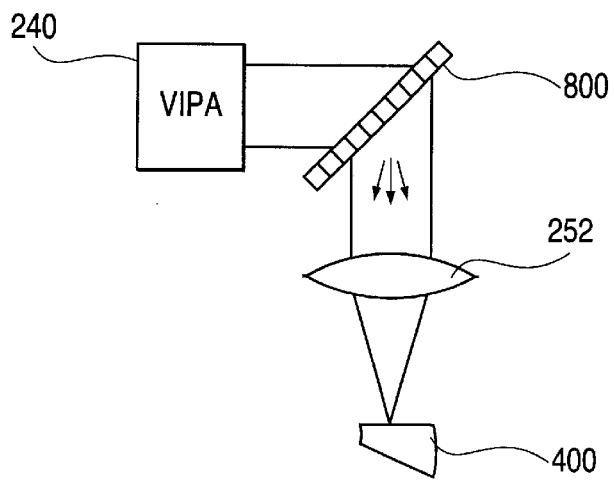
FIG. 64 is a diagram illustrating the use of a grating between a VIPA and a lens, according to an embodiment of the present invention.

FIG. 64 is a diagram illustrating the use of a grating between a VIPA and a lens, according to an embodiment of the present invention. FIG. 64 is similar to FIGS. 44 and 45. However, whereas the embodiments in FIGS. 44 and 45 use a holographic grating and a reflection type grating, respectively, the embodiment in FIG. 64 uses a grating 800. Grating 800 is, for example, a type of transmission grating, but the output light from grating 800 has a large angle which is in a range of greater than or equal to 30 degrees and less than or equal to 150 degrees from the input light to grating 800. For example, in the specific example of FIG. 64, the output light from grating 800 is approximately 90 degrees from the input light to grating 800. Grating 800 may be made, for example, holographically. The configuration in FIG. 64 is highly practical, since the angular dispersion of grating 800 is relatively large within a small space.

Moreover, the embodiments in FIGS. 46 and 47 can be applied to the embodiment in FIG. 64. More specifically, quarter wave plate 530, as shown in FIGS. 46 and 47, can be applied to the embodiment in FIG. 64, to cancel the polarization dependence of grating 800.

In FIGS. 44, 45 and 64, mirror 400 could be movable to change the dispersion amount.

Figure 65:
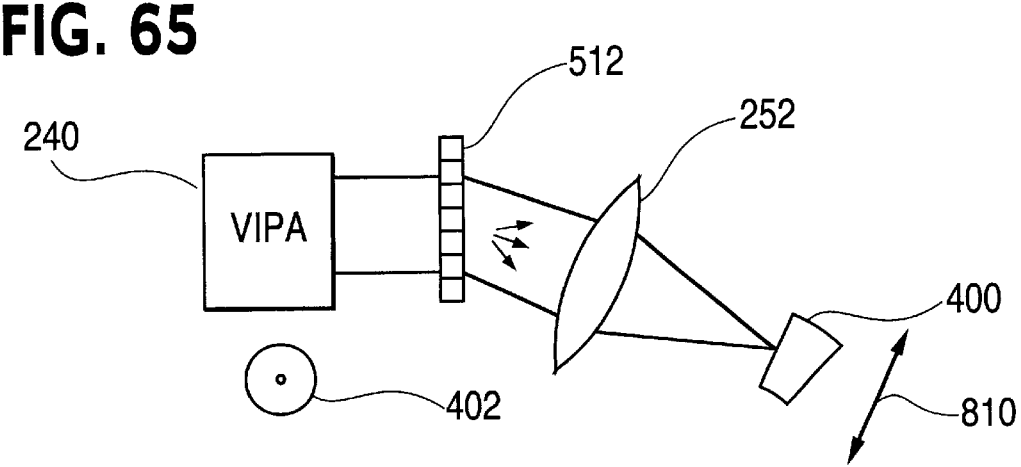
FIGS. 65, 66 and 67 are diagrams illustrating the use of a VIPA with a movable mirror, according to embodiments of the present invention.
Figure 66:
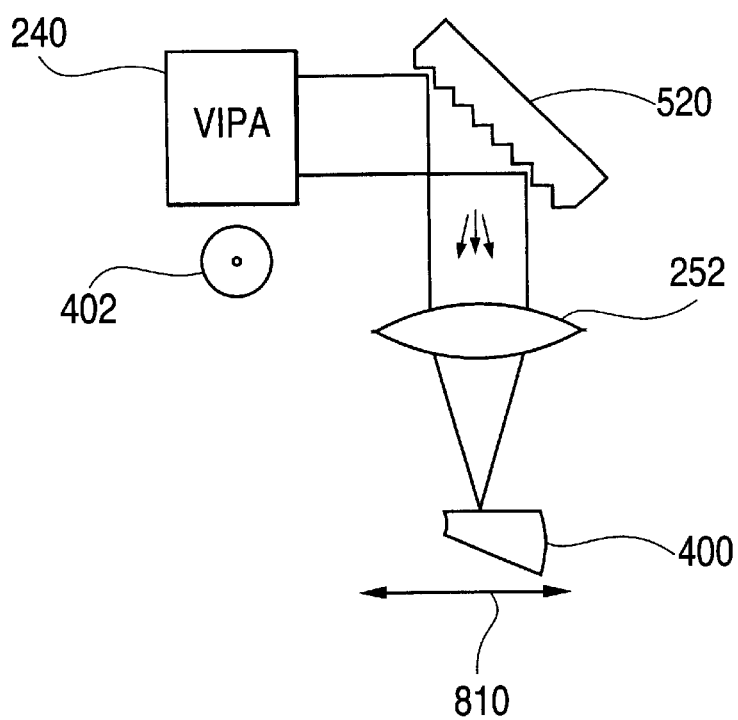
Figure 67:
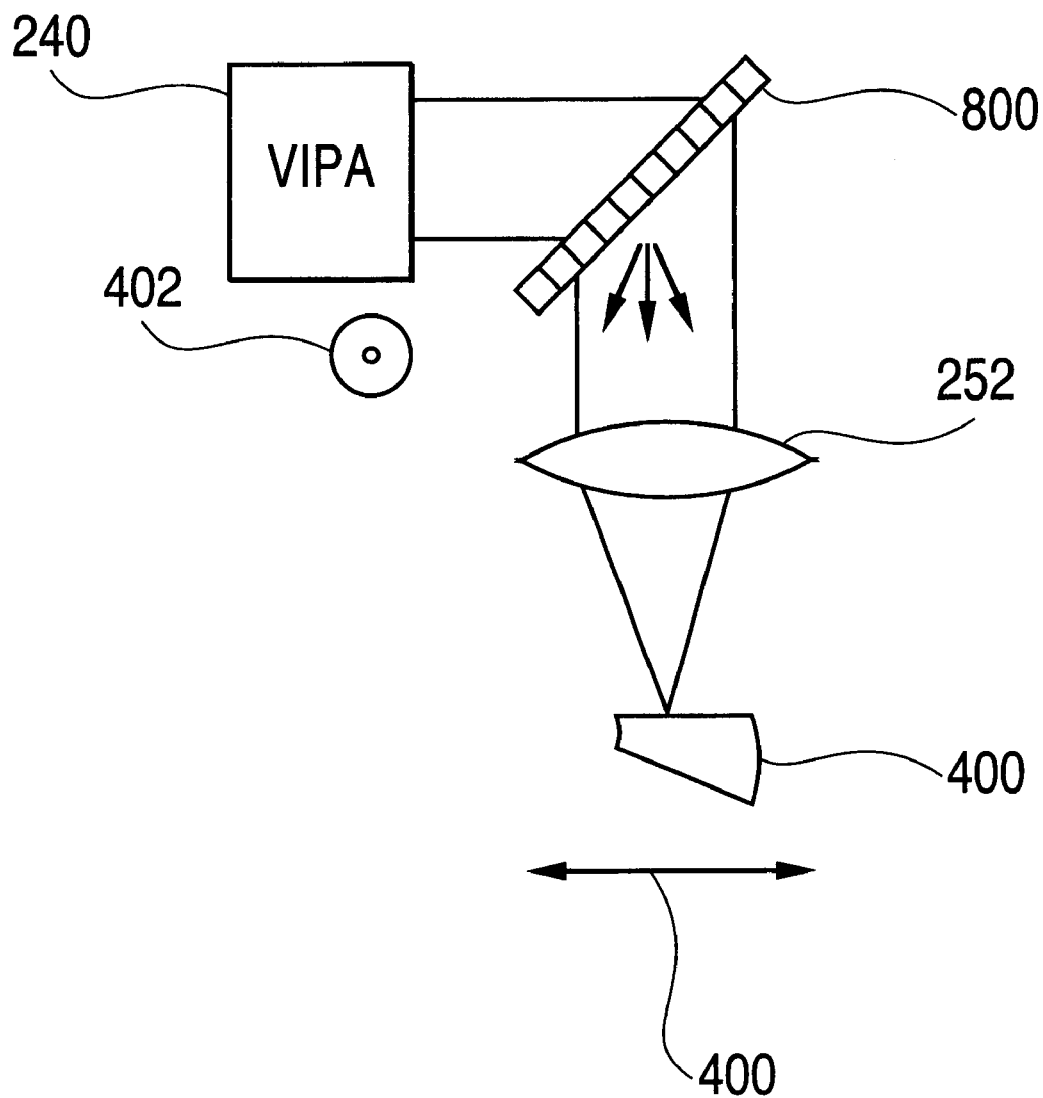

For example, FIGS. 65, 66 and 67 correspond, respectively, to FIGS. 44, 45 and 64, but show mirror 400 as being movable to change the dispersion amount. For example, in FIGS. 65, 66 and 67, mirror 400 is movable in a direction 810 along the surface of mirror 400 and perpendicular to the angular dispersion direction 402 of VIPA 240.

As should be understood from the above, in various embodiments of the present invention, the amount of chromatic dispersion can be changed. Therefore, the VIPA operates in conjunction with other elements (such as a mirror, lens, etc) to provide a tunable chromatic dispersion compensator.

FIGS. 68 and 69 illustrate a tunable dispersion compensator, according to another embodiment of the present invention. Referring now to FIGS. 68 and 69, the tunable dispersion compensator comprises a variable-curvature mirror 455 whose curvature changes along a dimension parallel to the angular dispersion direction of a VIPA 340. As illustrated in FIG. 70, the variable-curvature mirror 455 comprises, for example, a flat portion 455a and a convex portion 455b, although an unlimited number of other configurations are possible.

As illustrated in FIGS. 68 and 69, the tunable dispersion compensator comprises a mechanism for rotating the variable-curvature mirror 455 about an axis 456 that is perpendicular to the angular dispersion direction of VIPA 340. Alternatively, axis 456 can be described as being perpendicular to a plane which includes the traveling directions of the collimated output lights for different wavelengths from VIPA 340. The rotation around axis 456 allows differently curved portions of mirror 455 to be brought into the focal plane of a focusing lens 352.

FIGS. 68 and 69 both illustrate the pathways of light comprising a longer wavelength 464 103 of a channel and of the light comprising a shorter wavelength 468 of a channel through the tunable dispersion compensator. However, the light comprising any optical channel comprises light of a continuum of wavelengths. In FIG. 68, variable-curvature mirror 455 is disposed so that convex portion 455b intercepts and reflects the longer wavelength light 464 and the shorter wavelength light 468, whereas, in FIG. 69, the mirror is disposed such that flat portion 455a intercepts and reflects these lights. As previously described, the convex and flat portions 455a–455b reflect lights 464 and 468 back through lens 352 and back into VIPA 340 such that a greater magnitude of chromatic dispersion is produced when the convex portion is disposed in the light paths.

Because variable-curvature mirror 455 comprises a plate with axis of rotation 456 disposed on or within the plate, then, in general, the axis of rotation does not coincide with the center of curvature of any particular portion of variable-curvature mirror 455. Therefore, rotation of variable-curvature mirror 455 about axis 456 will generally not bring the differently curved portions of variable-curvature mirror 455 into the correct position at or near the focus of lens 352. Therefore, the movement of the mirror between its various positions comprises both a rotation of variable-curvature mirror 455 about axis 456 as well as a translation of axis 456 along a pre-defined path. In FIGS. 68 and 69, axis 456 comprises a rod or pin which is caused to move along a slot or track 458 during rotation from the position illustrated in FIG. 68 to that illustrated in FIG. 69, and vice versa. Alternatively, the translation of the axis might be realized by many other mechanisms. The rotation of mirror 455 and translation of axis 456 are simultaneously controlled in the apparatus so as to bring mirror portions comprising different magnitudes and types of curvature (convex, concave, and planar) into the path of the light paths as desired. In this fashion, this apparatus in FIGS. 68 and 69 functions as a tunable chromatic dispersion compensator.

FIG. 71 illustrates a tunable dispersion compensator, according to another embodiment of the present invention. The compensator in FIG. 71 comprises similar components to the compensator in FIGS. 68 and 69 except that a mirror assembly 558 of the compensator replaces the single variable-curvature mirror 455 in FIGS. 68 and 69. Mirror assembly 558 comprises a plurality of mirrors 555a, 555b, 555c, etc. all rigidly disposed approximately equidistantly from a rotational axis 556. Here, a "plurality" of mirrors indicates two or more mirrors or mirror segments. These mirror or mirror segments generally comprise surfaces with a variety of magnitudes and types of curvature (convex, concave, and planar). The mirrors or mirror segments 555a, 555b, 555c, etc. are attached to a mirror holder 557 centered upon the rotational axis 556. Through rotation of mirror holder 557 about axis 556, different respective individual mirrors of the plurality of mirrors 555a, 555b, 555c, etc. may be brought into position so as to intercept and reflect lights 464 and 468.

In FIG. 71, mirror holder 557 comprises a cylinder centered upon rotational axis 556. However, any geometric shape or construction may be utilized for mirror holder 557 provided that the distance from the center of lens 352 to the surface of the mirror from which lights 464 and 468 are reflected is maintained approximately equal to the focal distance of lens 352. Although the mirrors or mirror segments 555a, 555b, 555c, etc. are illustrated as separate non-contiguous mirror segments in FIG. 71, these mirrors may also comprise portions of a single mirror surface of continuously varying curvature.

Figure 72:
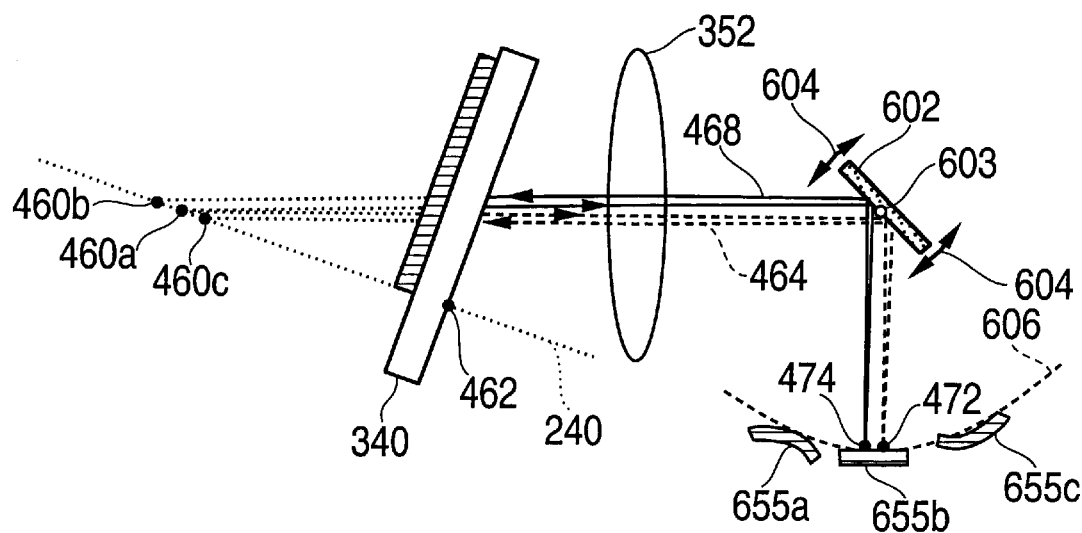
FIG. 72 is a diagram illustrating a tunable dispersion compensator that utilizes a plurality of curved mirrors or mirror segments and a rotatable flat mirror, according to an embodiment of the present invention.

FIG. 72 is a diagram illustrating a tunable dispersion compensator, according to another embodiment of the present invention. The tunable dispersion compensator in FIG. 72 comprises the same VIPA 340 and focusing lens 352 components that also comprise the tunable dispersion compensator in FIGS. 68 and 69, and the tunable dispersion compensator in FIG. 71. However, in contrast to the tunable dispersion compensator in FIGS. 68 and 69, and the tunable dispersion compensator in FIG. 71, there is no curved mirror disposed along the focal line of lens 352. Instead, the compensator in FIG. 72 comprises a plurality of mirrors or mirror segments 655a, 655b, 655c, etc. disposed off said focal line and a rotating flat mirror 602. The mirror or mirror segments 655a, 655b, 655c, etc. generally comprise surfaces with a variety of magnitudes and types of curvature (convex, concave, and planar). Although these mirrors or mirror segments are illustrated as separate non-contiguous mirror segments in FIG. 72, these mirrors may also comprise portions of a single mirror surface of continuously varying curvature.

In FIG. 72, the rotating flat mirror 602 is disposed along the focal line of lens 352 opposite to VIPA 340 and at an angle to this line so as to fold the paths of lights 464 and 468 onto one or more of the mirrors or mirror segments 655a, 655b, 655c, etc. Flat mirror 602 rotates about an axis 603 that is disposed at the reflective surface flat mirror 602 and along the focal line of lens 352. It is to be kept in mind that axis 603 shown in FIG. 72 is generally not a physical component but only a geometrical construction. The pathway (not shown) of light of a center wavelength of an optical channel intercepts mirror 602 at the position of rotational axis 603.

The plurality of mirrors or mirror segments 655a, 655b, 655c, etc. comprising the tunable dispersion compensator in FIG. 72 are disposed along a circular arc 606 which represents a portion of a circle centered at rotational axis 603. The radius of arc 606 is such that the sum of the distance from the center of lens 352 to axis 603 plus the distance from axis 603 to arc 606 is equal to the focal distance of lens 352. Therefore, lights 464 and 468 are both focused or approximately focused at points 472 and 474, respectively, wherein both points 472 and 474 are located at the surface of one of the mirrors or mirror segments 655a, 655b, 655c, etc. Lights 464 and 468 are reflected by one of the plurality of mirrors or mirror segments 655a, 655b, 655c, etc. such that each of lights 464 and 468 returns back to the rotating flat mirror 602, back through lens 352 and back into VIPA 340.

In the tunable dispersion compensator of FIG. 72, the amount of chromatic dispersion produced in the optical signal comprising lights 464 and 468 may be varied by rotating flat mirror 602 about its center as shown by the adjustment direction 604. This rotation of the rotating flat mirror 602 causes controlled movement of the reflection points 472 and 474 from one to another of the fixed set of mirrors or mirror segments 655a, 655b, 655c, etc. As previously described, the magnitude and direction of the mirror curvature of the particular mirror or mirror segment of the set 655a, 655b, 655c, etc. from which the signal lights are reflected back to VIPA 340 determines the amount of chromatic dispersion produced by the apparatus. The signal lights remain focused at the surface of each mirror or mirror segment 655a, 655b, 655c, etc. according to the disposition of these mirrors or mirror segments along arc 606. In this fashion, this apparatus functions as a tunable chromatic dispersion compensator.

Figure 73:
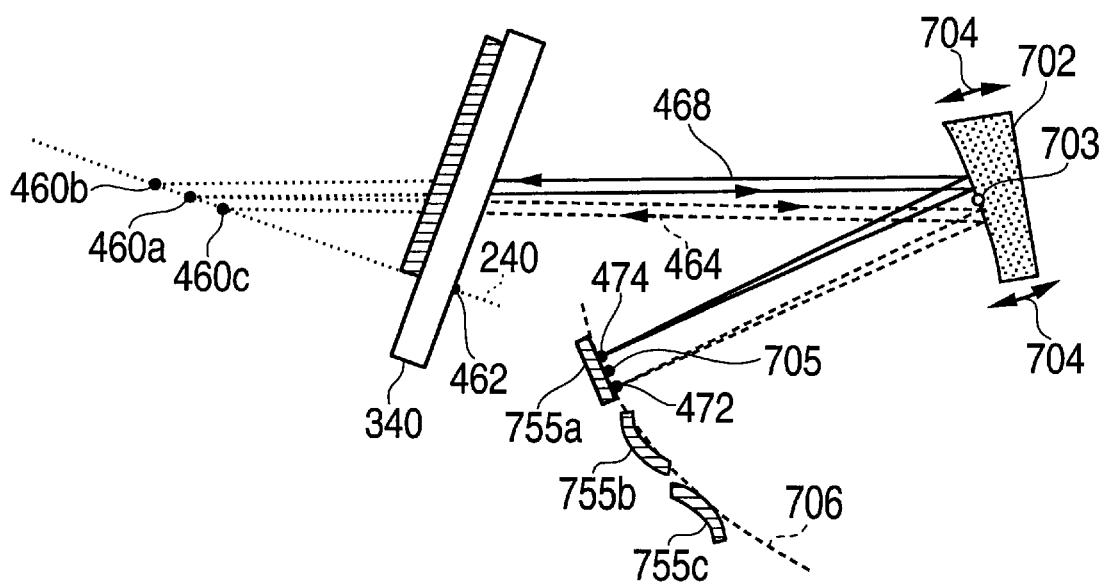
FIG. 73 is a diagram illustrating a tunable dispersion compensator that utilizes a plurality of curved mirrors or mirror segments and a rotatable off-axis parabolic mirror, according to an embodiment of the present invention.

FIG. 73 is a diagram illustrating a tunable dispersion compensator, according to a further embodiment of the present invention. The tunable dispersion compensator in FIG. 73 comprises the same VIPA 340 as that within the tunable dispersion compensators in FIGS. 68, 69, 71 and 72. However, in contrast to these other tunable dispersion compensators, the tunable dispersion compensator in FIG. 73 does not comprise a focusing lens at the output side of VIPA 340. Instead, the tunable dispersion compensator in FIG. 73 comprises an off-axis parabolic mirror 702 that performs the focusing function. Off-axis parabolic mirror 702 is disposed at the output side of VIPA 340 so as to intercept and reflect the lights comprising an optical channel that are output by VIPA 340. The paths of two such lights, a light 464 comprising a longer wavelength and a light 468 comprising a shorter wavelength, are illustrated in FIG. 73. Off-axis parabolic mirror 702 is capable of rotation about an axis 703 that is disposed along the line at which the light of a central wavelength (not shown) of an optical channel intercepts parabolic mirror 702. It is to be kept in mind that axis 703 shown in FIG. 73 is generally not a physical component but only a geometrical construction.

Off-axis parabolic mirror 702 comprises a focus point 705. Through the focusing power of off-axis parabolic mirror 702, collimated light rays output by VIPA 340 and comprising a central wavelength of an optical channel (not shown) are brought to a focus at point 705. Light 464 comprising a longer wavelength and light 468 comprising a shorter wavelength of said channel are focused at points 472 and 474, respectively, as illustrated in FIG. 73. Points 472 and 474 are disposed at opposite sides of focus point 705, as further illustrated in FIG. 73. During rotation of off-axis parabolic mirror 702 about axis 703, focus point 705 and points 472 and 474 move along an arc 706 that represents a portion of a circle centered at axis 703. The tunable dispersion compensator in FIG. 73 further comprises a plurality of mirrors or mirror segments 755a, 755b, 755c, etc., whose surfaces are tangentially disposed along arc 706. Although the mirrors or mirror segments 755a, 755b, 755c, etc. are illustrated as separate non-contiguous mirror segments in FIG. 73, these mirrors may also comprise portions of a single mirror surface of continuously varying curvature.

In the tunable dispersion compensator of FIG. 73, the amount of chromatic dispersion produced in the optical signal comprising the lights 464 and 468 may be varied by rotating off-axis parabolic mirror 702 about the axis 703 as shown by the adjustment direction 704. This rotation of off-axis parabolic mirror 702 causes controlled movement of the reflection points 472 and 474 from one to another of the set of mirrors or mirror segments 755a, 755b, 755c, etc. The lights comprising a signal channel are then reflected by one of the mirrors or mirror segments 755a, 755b, 755c, etc. back to off-axis parabolic mirror 702. These lights are then re-collimated by off-axis parabolic mirror 702 and reflected back to VIPA 340. As previously described, the magnitude and type (convex, concave or planar) of the mirror curvature of the particular mirror or mirror segment of the set 755a, 755b, 755c, etc. from which the signal lights are reflected back to the VIPA determines the amount of chromatic dispersion produced by the apparatus in FIG. 73. The signal lights remain focused at the surface of each mirror or mirror segment 755a, 755b, 755c, etc. according to the disposition of these mirrors or mirror segments along arc 706. In this fashion, this apparatus functions as a tunable chromatic dispersion compensator.

As described above, a mirror is used to reflect light back into a VIPA. Thus, a mirror can be referred to as a "light returning device" which returns light back to the VIPA. However, the present invention is not limited to the use of a mirror as a light returning device. For example, a prism (instead of a mirror) can be used as a light returning device to return light back to the VIPA. Moreover, various combinations of mirrors and/or prisms, or lens apparatuses can be used as a light returning device to return light back to VIPA.

In various embodiments of the present invention, a lens is used to focus light from a VIPA to a mirror, and to direct the returning light from the mirror back to the VIPA. See, for example, the operation of lens 252 in FIG. 13. However, the present invention is not limited to using a lens for this purpose. Instead, other types of light directing devices can be used in place of the lens. For example, a mirror can be used in place of lens 252 to focus the light from the VIPA, and to direct the returning light back to the VIPA.

In the above embodiments of the present invention, a VIPA has reflecting films to reflect light. For example, FIG. 8 illustrates a VIPA 76 having reflecting films 122 and 124 to reflect light. However, it is not intended for a VIPA to be limited to the use of "film" to provide a reflecting surface. Instead, the VIPA must simply have appropriate reflecting surfaces, and these reflecting surfaces may or may not be formed by "film".

Further, in the above embodiments of the present invention, a VIPA includes a transparent glass plate in which multiple reflection occurs. For example, FIG. 8 illustrates a VIPA 76 having a transparent glass plate 120 with reflecting surfaces thereon. However, it is not intended for a VIPA to be limited to the use of a glass material, or any type of "plate", to separate the reflecting surfaces. Instead, the reflecting surfaces must simply be maintained to be separated from each other by some type of spacer. For example, the reflecting surfaces of a VIPA can be separated by "air", without having a glass plate therebetween. Therefore, the reflecting surfaces can be described as being separated by a transparent material which is, for example, optical glass or air.

According to the above embodiments of the present invention, an apparatus uses a VIPA to compensate for chromatic dispersion. For this purpose, the embodiments of the present invention are not intended to be limited to a specific VIPA configuration. Instead, any of the different VIPA configurations discussed herein, or those disclosed in U.S. application Ser. No. 08/685,362, which is incorporated herein by reference, can be used in an apparatus to compensate for chromatic dispersion. For example, the VIPA may or may not have a radiation window, and the reflectances on the various surfaces of the VIPA are not intended to be limited to any specific examples.

The present invention relates to a VIPA dispersion compensator. The term "VIPA dispersion compensator" refers to an apparatus which uses a VIPA to produce chromatic dispersion, such as those described herein. For example, the apparatuses in FIGS. 13, 19, 32, 42, 44 and 48(A), among others, show a VIPA dispersion compensator.

The various embodiments of a VIPA described herein can also be referred to as a virtually imaged phased array (VIPA) generator.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a variable curvature mirror positioned to reflect light produced by a virtually imaged phased array (VIPA) generator back to the VIPA generator; and
   a rotation axis around which the mirror is rotated to change the curvature of the mirror where the output light is reflected.

2. An apparatus as in claim 1, wherein the curvature of the mirror changes along a direction parallel to an angular dispersion direction of the VIPA generator.

3. An apparatus as in claim 1, wherein the rotation axis is perpendicular to an angular dispersion direction of the VIPA generator.

4. An apparatus as in claim 2, wherein the rotation axis is perpendicular to the angular dispersion direction of the VIPA generator.

5. An apparatus as in claim 1, wherein the rotation axis is disposed on or within the mirror.

6. An apparatus as in claim 2, wherein the rotation axis is disposed on or within the mirror.

7. An apparatus as in claim 3, wherein the rotation axis is disposed on or within the mirror.

8. An apparatus as in claim 1, further comprising a translation path along which the rotation axis is movable to thereby provide both rotation and translation to change the curvature of the mirror where the output light is reflected.

9. An apparatus as in claim 2, further comprising a translation path along which the rotation axis is movable to thereby provide both rotation and translation to change the curvature of the mirror where the output light is reflected.

10. An apparatus as in claim 3, further comprising a translation path along which the rotation axis is movable to thereby provide both rotation and translation to change the curvature of the mirror where the output light is reflected.

11. An apparatus as in claim 1, wherein the curvature of the mirror varies from a flat portion to a convex portion.

12. An apparatus as in claim 2, wherein the curvature of the mirror varies from a flat portion to a convex portion.

13. An apparatus as in claim 3, wherein the curvature of the mirror varies from a flat portion to a convex portion.

14. An apparatus as in claim 5, wherein the curvature of the mirror varies from a flat portion to a convex portion.

15. An apparatus as in claim 8, wherein the curvature of the mirror varies from a flat portion to a convex portion.

16. An apparatus comprising:
   a virtually imaged phased array (VIPA) generator producing a light traveling from the VIPA generator;
   a variable curvature mirror positioned to reflect the light back to the VIPA generator; and
   a rotation axis around which the mirror is rotated to change the curvature of the mirror where the output light is reflected.

17. An apparatus as in claim 16, wherein the curvature of the mirror changes along a direction parallel to an angular dispersion direction of the VIPA generator.

18. An apparatus as in claim 16, wherein the rotation axis is perpendicular to an angular dispersion direction of the VIPA generator.

19. An apparatus as in claim 17, wherein the rotation axis is perpendicular to the angular dispersion direction of the VIPA generator.

20. An apparatus as in claim 16, wherein the rotation axis is disposed on or within the mirror.

21. An apparatus as in claim 17, wherein the rotation axis is disposed on or within the mirror.

22. An apparatus as in claim 18, wherein the rotation axis is disposed on or within the mirror.

23. An apparatus as in claim 16, further comprising a translation path along which the rotation axis is movable to thereby provide both rotation and translation to change the curvature of the mirror where the output light is reflected.

24. An apparatus as in claim 17, further comprising a translation path along which the rotation axis is movable to thereby provide both rotation and translation to change the curvature of the mirror where the output light is reflected.

25. An apparatus as in claim 18, further comprising a translation path along which the rotation axis is movable to thereby provide both rotation and translation to change the curvature of the mirror where the output light is reflected.

26. An apparatus as in claim 16, wherein the curvature of the mirror varies from a flat portion to a convex portion.

27. An apparatus as in claim 17, wherein the curvature of the mirror varies from a flat portion to a convex portion.

28. An apparatus as in claim 18, wherein the curvature of the mirror varies from a flat portion to a convex portion.

29. An apparatus as in claim 20, wherein the curvature of the mirror varies from a flat portion to a convex portion.

30. An apparatus as in claim 23, wherein the curvature of the mirror varies from a flat portion to a convex portion.

31. An apparatus as in claim 16, further comprising:
a lens directing the light traveling from the VIPA generator to the mirror so that the mirror reflects the light, the reflected light being directed by the lens back to the VIPA generator.

32. An apparatus as in claim 23, further comprising:
a lens directing the light traveling from the VIPA generator to the mirror so that the mirror reflects the light, the reflected light being directed by the lens back to the VIPA generator.

33. An apparatus comprising:
a virtually imaged phased array (VIPA) generator producing light;
a plurality of mirrors having different surface curvatures; and
a holder having a rotation axis and holding the plurality of mirrors equidistantly from the rotation axis, the holder being rotatable around the rotation axis to bring a different, respective mirror of the plurality of mirrors in position to reflect the light produced by a VIPA generator back to the VIPA generator.

34. An apparatus as in claim 33, wherein the plurality of mirrors are separate, non-contiguous mirrors.

35. An apparatus as in claim 33, wherein the plurality of mirrors are portions of a single mirror surface of continuously varying curvature.

36. An apparatus as in claim 33, further comprising:
a lens focusing the light produced by the VIPA generator to the respective mirror in position to reflect the light, and directing the reflected light back to the VIPA generator.

37. An apparatus comprising:
a plurality of fixed mirrors having different surface curvatures to reflect light; and
a rotating mirror rotatable about a rotation axis to reflect light produced by a virtually imaged phased array (VIPA) generator to a respective fixed mirror of the plurality of fixed mirrors, and to reflect the light reflected by the respective fixed mirror back to the VIPA generator.

38. An apparatus as in claim 37, wherein the plurality of fixed mirrors are separate, non-contiguous mirrors.

39. An apparatus as in claim 37, wherein the plurality of fixed mirrors are portions of a single mirror surface of continuously varying curvature.

40. An apparatus comprising:
a virtually imaged phased array (VIPA) generator producing light;
a plurality of fixed mirrors having different surface curvatures to reflect light; and
a rotating mirror rotatable about a rotation axis to reflect light produced by the VIPA generator to a respective fixed mirror of the plurality of fixed mirrors, and to reflect the light reflected by the respective fixed mirror back to the VIPA generator.

41. An apparatus as in claim 40, wherein the plurality of fixed mirrors are separate, non-contiguous mirrors.

42. An apparatus as in claim 40, wherein the plurality of fixed mirrors are portions of a single mirror surface of continuously varying curvature.

43. An apparatus as in claim 40, further comprising:
a lens directing the light produced by the VIPA generator to rotating mirror, and directing the light from the fixed mirror and reflected by the rotating mirror back to the VIPA generator.

44. An apparatus comprising:
a virtually imaged phased array (VIPA) generator producing light;
a plurality of fixed mirrors having different surface curvatures to reflect light; and
an off-axis parabolic mirror rotatable about a rotation axis to reflect light produced by the VIPA generator to a respective fixed mirror of the plurality of fixed mirrors, and to reflect the light reflected by the respective fixed mirror back to the VIPA generator.

45. An apparatus as in claim 44, wherein the plurality of fixed mirrors are separate, non-contiguous mirrors.

46. An apparatus as in claim 44, wherein the plurality of fixed mirrors are portions of a single mirror surface of continuously varying curvature.

* * * * *